US011157238B2

(12) United States Patent
Rhisheekesan et al.

(10) Patent No.: US 11,157,238 B2
(45) Date of Patent: Oct. 26, 2021

(54) USE OF A SINGLE INSTRUCTION SET ARCHITECTURE (ISA) INSTRUCTION FOR VECTOR NORMALIZATION

(71) Applicant: Intel Corporation, Santa Clara, CA (US)

(72) Inventors: Abhishek Rhisheekesan, Kottayam (IN); Supratim Pal, Bangalore (IN); Shashank Lakshminarayana, Bangalore (IN); Subramaniam Maiyuran, Gold River, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/685,561

(22) Filed: Nov. 15, 2019

(65) Prior Publication Data

US 2021/0149635 A1 May 20, 2021

(51) Int. Cl.
*G06F 7/552* (2006.01)
*G06F 9/30* (2018.01)

(52) U.S. Cl.
CPC .......... *G06F 7/5525* (2013.01); *G06F 9/3001* (2013.01)

(58) Field of Classification Search
CPC .... G06F 7/5525; G06F 9/3001; G06F 9/3887; G06T 1/20
USPC .......................................................... 345/502
See application file for complete search history.

(56) References Cited

U.S. PATENT DOCUMENTS

2012/0078987 A1* 3/2012 Nystad .................... G06F 7/483 708/207
2021/0149635 A1 5/2021 Rhisheekesan et al.

FOREIGN PATENT DOCUMENTS

DE 102020129756 A1 5/2021

* cited by examiner

*Primary Examiner* — Jennifer Mehmood
*Assistant Examiner* — Kim Thanh T Tran
(74) *Attorney, Agent, or Firm* — Jaffery Watson Mendonsa & Hamilton LLP

(57) ABSTRACT

Embodiments described herein are generally directed to an improved vector normalization instruction. An embodiment of a method includes responsive to receipt by a GPU of a single instruction specifying a vector normalization operation to be performed on V vectors: (i) generating V squared length values, N at a time, by a first processing unit, by, for each N sets of inputs, each representing multiple component vectors for N of the vectors, performing N parallel dot product operations on the N sets of inputs. Generating V sets of outputs representing multiple normalized component vectors of the V vectors, N at a time, by a second processing unit, by, for each N squared length values of the V squared length values, performing N parallel operations on the N squared length values, wherein each of the N parallel operations implement a combination of a reciprocal square root function and a vector scaling function.

20 Claims, 41 Drawing Sheets

FIG. 9A GRAPHICS PROCESSOR COMMAND FORMAT
900

| CLIENT 902 | OPCODE 904 | SUB-OPCODE 905 | DATA 906 | COMMAND SIZE 908 |

FIG. 9B GRAPHICS PROCESSOR COMMAND SEQUENCE
910

| FPU 2010 | Co-Processor 2020 |
|---|---|
| DP3 (SIMD2) - $S=A^2+B^2+C^2$ | |
| DP3 (SIMD2) - $S=A^2+B^2+C^2$ | RSQVS (SIMD2) |
| DP3 (SIMD2) - $S=A^2+B^2+C^2$ | RSQVS (SIMD2) |
| DP3 (SIMD2) - $S=A^2+B^2+C^2$ | RSQVS (SIMD2) |
| | RSQVS (SIMD2) |

USE OF A SINGLE INSTRUCTION SET ARCHITECTURE (ISA) INSTRUCTION FOR VECTOR NORMALIZATION

TECHNICAL FIELD

Embodiments described herein generally relate to the field of graphics processing units (GPUs) and graphics instruction set architectures (ISAs), and more particularly, to an improved vector normalization instruction that reduces the number of clock cycles for execution of vector normalization.

BACKGROUND

Graphics processing units (GPUs) use multiple types of instructions to process shader code. The need for vector normalization arises frequently in the context of three-dimensional (3D) games and other 3D graphics applications for processing scenarios including computation of direction vectors, surface normal computations, physics/collision, shadow depth and ambient depth computations, geometric transforms, lighting, reflection, normal mapping, bump mapping and the like. Depending on the graphics application programming interface (API), vector normalization can be represented by three operations (i.e., dot product, reciprocal square root and vector scaling in the Microsoft DirectX API) or by a single operation (i.e., a normalize operation in the OpenGL API). At the ISA level, vector normalization may be represented in seven instructions:

Dot product (SIMD8): MUL, MAD, MAD;

Reciprocal square root (SIMD8): MATH;

Vector scaling (SIMD8): MUL, MUL, MUL.

Static analysis of the top three pixel shaders (in terms of time consumed of graphics hardware) in industry standard and prominent benchmarks like Manhattan from Kishonti Informatics' GFXBench and 3DMark 11 from UL show 21% of OpenGL API instructions in Manhattan and 8%, 8%, 11% and 6% of Microsoft DirectX API instructions in 4 subtests of 3DMark 11 relate to vector normalization operations. As such, a reduction in the number of clock-cycles to execute vector normalization operations would have a significant positive impact on pixel shader performance as well as vertex shader, compute shader and potentially geometry shader, hull shader and domain shader.

BRIEF DESCRIPTION OF THE DRAWINGS

Embodiments described here are illustrated by way of example, and not by way of limitation, in the figures of the accompanying drawings in which like reference numerals refer to similar elements.

FIG. 20 demonstrates the throughput a vector normalization operation using DP3 and RSQVS instructions according to an embodiment.

DETAILED DESCRIPTION

Embodiments described herein are generally directed to an improved vector normalization instruction that reduces the number of clock cycles for execution of vector normalization.

According to one embodiment, which is described in further detail below with reference to FIGS. 14-30, an instruction (e.g., VNM), specifying a vector normalization operation is to be performed on V vectors, may be exposed via the ISA. Responsive to receipt of the VNM instruction by a graphics processing unit (GPU), V squared length values, each representing a squared length of one of the set of V vectors, N squared length values at a time, are generated, by a first processing unit of the GPU, by, for each N sets of inputs, each representing multiple component vectors for N of the set of V vectors and stored in respective registers of a first set of V/N registers, performing N parallel dot product operations on the N sets of inputs. V sets of outputs, each representing multiple normalized component vectors of one of the set of V vectors, N sets of outputs at a time, are generated, by a second processing unit of the GPU, by, for each N squared length values of the V squared length values, performing N parallel operations on the N squared length values, wherein each of the N parallel operations implement a combination of a reciprocal square root function and a vector scaling function.

System Overview

Figure 1:
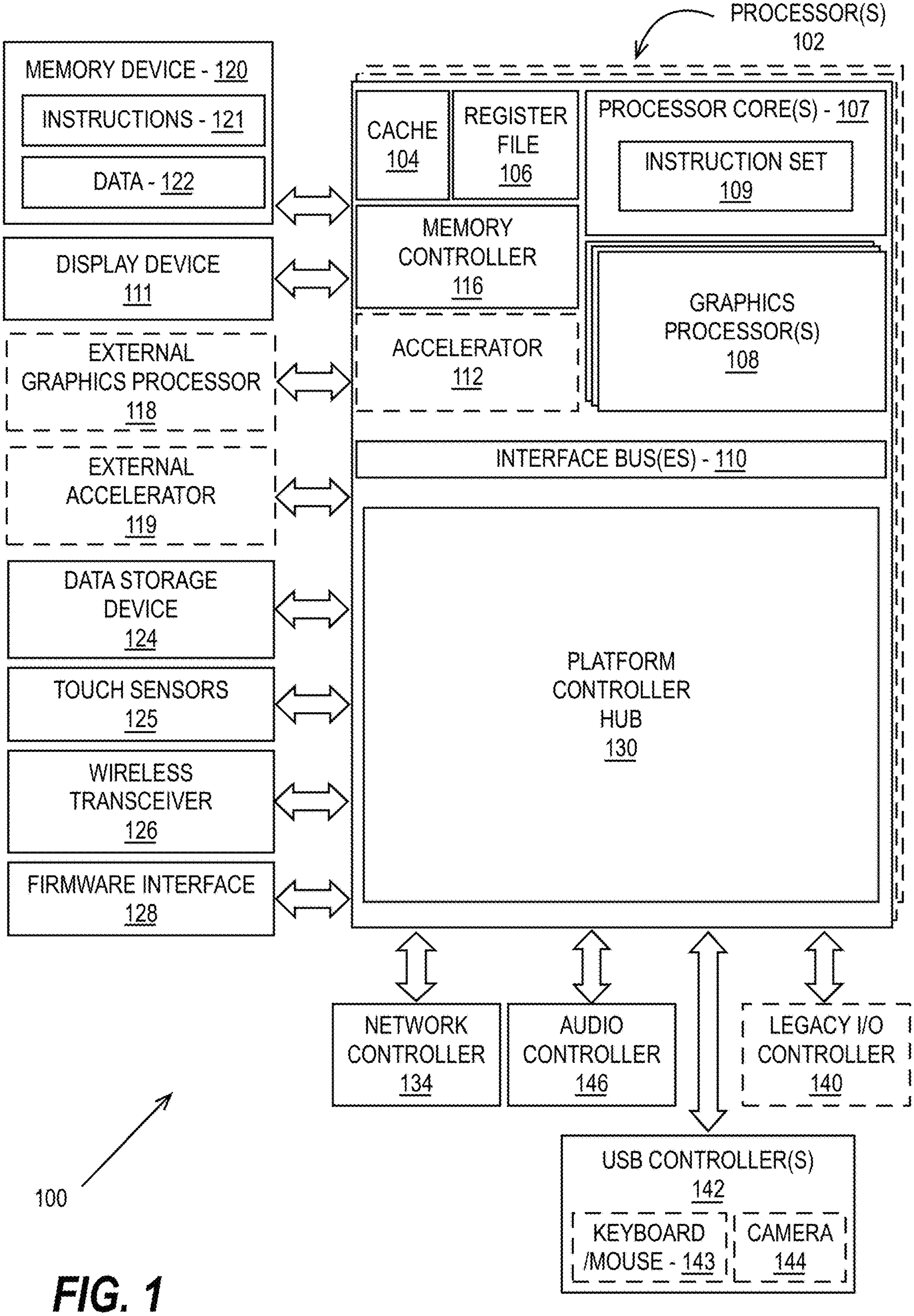
FIG. 1 is a block diagram of a processing system, according to an embodiment.

FIG. 1 is a block diagram of a processing system 100, according to an embodiment. System 100 may be used in a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices such as within Internet-of-things (IoT) devices with wired or wireless connectivity to a local or wide area network.

In one embodiment, system 100 can include, couple with, or be integrated within: a server-based gaming platform; a game console, including a game and media console; a mobile gaming console, a handheld game console, or an online game console. In some embodiments the system 100 is part of a mobile phone, smart phone, tablet computing device or mobile Internet-connected device such as a laptop with low internal storage capacity. Processing system 100 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, the processing system 100 includes or is part of a television or set top box device. In one embodiment, system 100 can include, couple with, or be integrated within a self-driving vehicle such as a bus, tractor trailer, car, motor or electric power cycle, plane or glider (or any combination thereof). The self-driving vehicle may use system 100 to process the environment sensed around the vehicle.

In some embodiments, the one or more processors 102 each include one or more processor cores 107 to process instructions which, when executed, perform operations for system or user software. In some embodiments, at least one of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). One or more processor cores 107 may process a different instruction set 109, which may include instructions to facilitate the emulation of other instruction sets. Processor core 107 may also include other processing devices, such as a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 can be additionally included in processor 102 and may include different types of registers for storing different types of data (e.g., integer registers, floating point registers, status registers, and an instruction pointer register). Some registers may be general-purpose registers, while other registers may be specific to the design of the processor 102.

In some embodiments, one or more processor(s) 102 are coupled with one or more interface bus(es) 110 to transmit communication signals such as address, data, or control signals between processor 102 and other components in the system 100. The interface bus 110, in one embodiment, can be a processor bus, such as a version of the Direct Media Interface (DMI) bus. However, processor busses are not limited to the DMI bus, and may include one or more Peripheral Component Interconnect buses (e.g., PCI, PCI express), memory busses, or other types of interface busses. In one embodiment the processor(s) 102 include an integrated memory controller 116 and a platform controller hub 130. The memory controller 116 facilitates communication between a memory device and other components of the system 100, while the platform controller hub (PCH) 130 provides connections to I/O devices via a local I/O bus.

The memory device 120 can be a dynamic random-access memory (DRAM) device, a static random-access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller 116 also couples with an optional external graphics processor 118, which may communicate with the one or more graphics processors 108 in processors 102 to perform graphics and media operations. In some embodiments, graphics, media, and or compute operations may be assisted by an accelerator 112 which is a coprocessor that can be configured to perform a specialized set of graphics, media, or compute operations. For example, in one embodiment the accelerator 112 is a matrix multiplication accelerator used to optimize machine learning or compute operations. In one embodiment the accelerator 112 is a ray-tracing accelerator that can be used to perform ray-tracing operations in concert with the graphics processor 108. In one embodiment, an external accelerator 119 may be used in place of or in concert with the accelerator 112.

In some embodiments a display device 111 can connect to the processor(s) 102. The display device 111 can be one or more of an internal display device, as in a mobile electronic device or a laptop device or an external display device attached via a display interface (e.g., DisplayPort, etc.). In one embodiment the display device 111 can be a head mounted display (HMD) such as a stereoscopic display device for use in virtual reality (VR) applications or augmented reality (AR) applications.

In some embodiments the platform controller hub 130 enables peripherals to connect to memory device 120 and processor 102 via a high-speed I/O bus. The I/O peripherals include, but are not limited to, an audio controller 146, a network controller 134, a firmware interface 128, a wireless transceiver 126, touch sensors 125, a data storage device 124 (e.g., non-volatile memory, volatile memory, hard disk drive, flash memory, NAND, 3D NAND, 3D XPoint, etc.). The data storage device 124 can connect via a storage interface (e.g., SATA) or via a peripheral bus, such as a Peripheral Component Interconnect bus (e.g., PCI, PCI express). The touch sensors 125 can include touch screen sensors, pressure sensors, or fingerprint sensors. The wireless transceiver 126 can be a Wi-Fi transceiver, a Bluetooth transceiver, or a mobile network transceiver such as a 3G, 4G, 5G, or Long-Term Evolution (LTE) transceiver. The firmware interface 128 enables communication with system firmware, and can be, for example, a unified extensible firmware interface (UEFI). The network controller 134 can enable a network connection to a wired network. In some embodiments, a high-performance network controller (not shown) couples with the interface bus 110. The audio controller 146, in one embodiment, is a multi-channel high definition audio controller. In one embodiment the system 100 includes an optional legacy I/O controller 140 for coupling legacy (e.g., Personal System 2 (PS/2)) devices to the system. The platform controller hub 130 can also connect to one or more Universal Serial Bus (USB) controllers 142 connect input devices, such as keyboard and mouse 143 combinations, a camera 144, or other USB input devices.

It will be appreciated that the system 100 shown is exemplary and not limiting, as other types of data processing systems that are differently configured may also be used. For example, an instance of the memory controller 116 and platform controller hub 130 may be integrated into a discreet external graphics processor, such as the external graphics processor 118. In one embodiment the platform controller hub 130 and/or memory controller 116 may be external to the one or more processor(s) 102. For example, the system 100 can include an external memory controller 116 and platform controller hub 130, which may be configured as a memory controller hub and peripheral controller hub within a system chipset that is in communication with the processor(s) 102.

For example, circuit boards ("sleds") can be used on which components such as CPUs, memory, and other components are placed are designed for increased thermal performance. In some examples, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in a rack, thereby enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

A data center can utilize a single network architecture ("fabric") that supports multiple other network architectures including Ethernet and Omni-Path. The sleds can be coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center may, in use, pool resources, such as memory, accelerators (e.g., GPUs, graphics accelerators, FPGAs, ASICs, neural network and/or artificial intelligence accelerators, etc.), and data storage drives that are physically disaggregated, and provide them to compute resources (e.g., processors) on an as needed basis, enabling the compute resources to access the pooled resources as if they were local.

A power supply or source can provide voltage and/or current to system 100 or any component or system described herein. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

FIGS. 2A-2D illustrate computing systems and graphics processors provided by embodiments described herein. The elements of FIGS. 2A-2D having the same reference numbers (or names) as the elements of any other figure herein can operate or function in any manner similar to that described elsewhere herein, but are not limited to such.

Figure 2A:
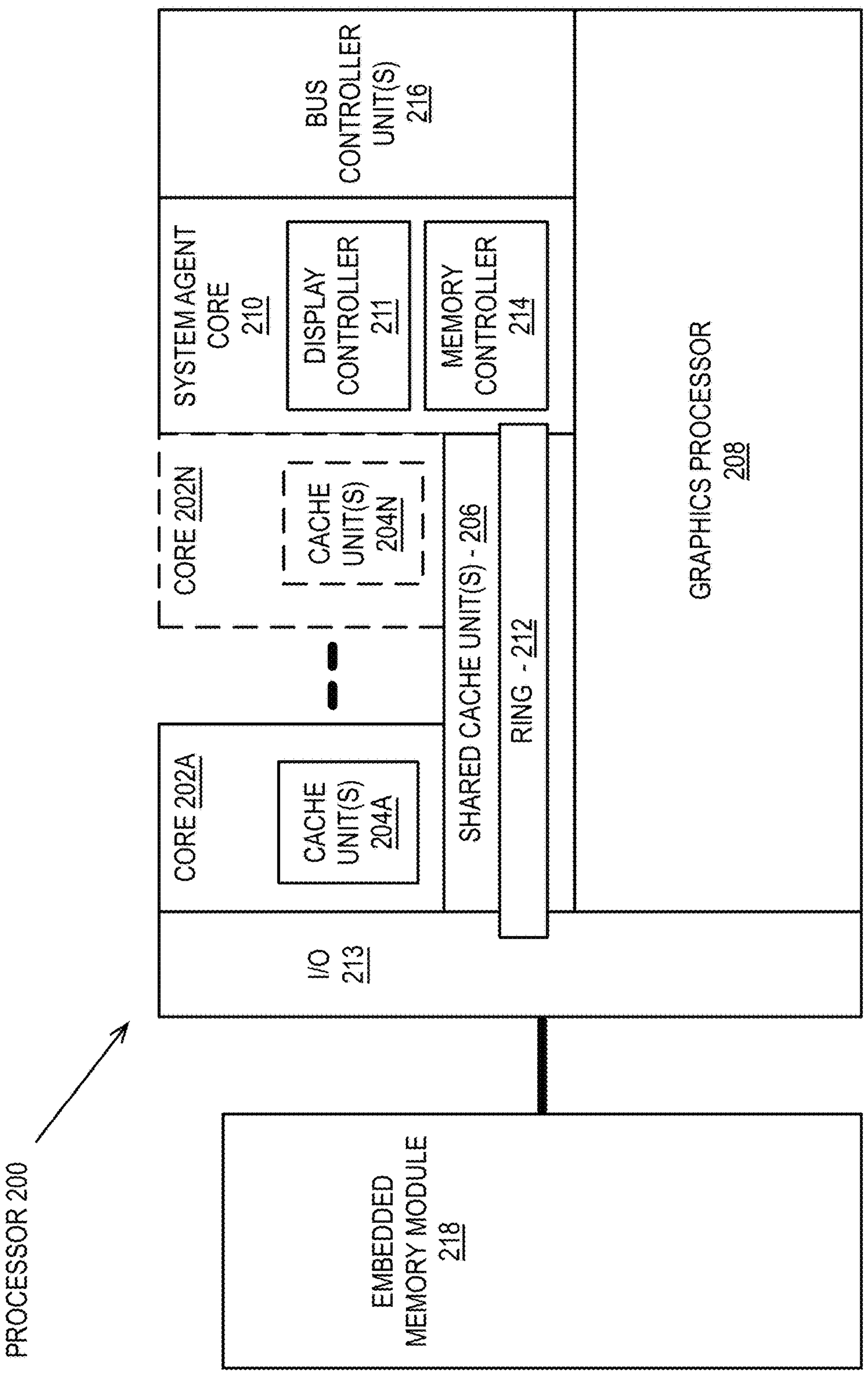
FIGS. 2A-2D illustrate computing systems and graphics processors, according to some embodiments.

FIG. 2A is a block diagram of an embodiment of a processor 200 having one or more processor cores 202A-202N, an integrated memory controller 214, and an integrated graphics processor 208. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206. The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more PCI or PCI express busses. System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, the system agent core 210 also includes a display controller 211 to drive graphics processor output to one or more coupled displays. In some embodiments, display controller 211 may also be a separate module coupled with the graphics processor via at least one interconnect, or may be integrated within the graphics processor 208.

In some embodiments, a ring-based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 can use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment, processor cores 202A-202N are heterogeneous in terms of microarchitecture, where one or more cores having a relatively higher power consumption couple with one or more power cores having a lower power consumption. In one embodiment, processor cores 202A-202N are heterogeneous in terms of computational capability. Additionally, processor 200 can be implemented on one or more chips or as an SoC integrated circuit having the illustrated components, in addition to other components.

Figure 2B:
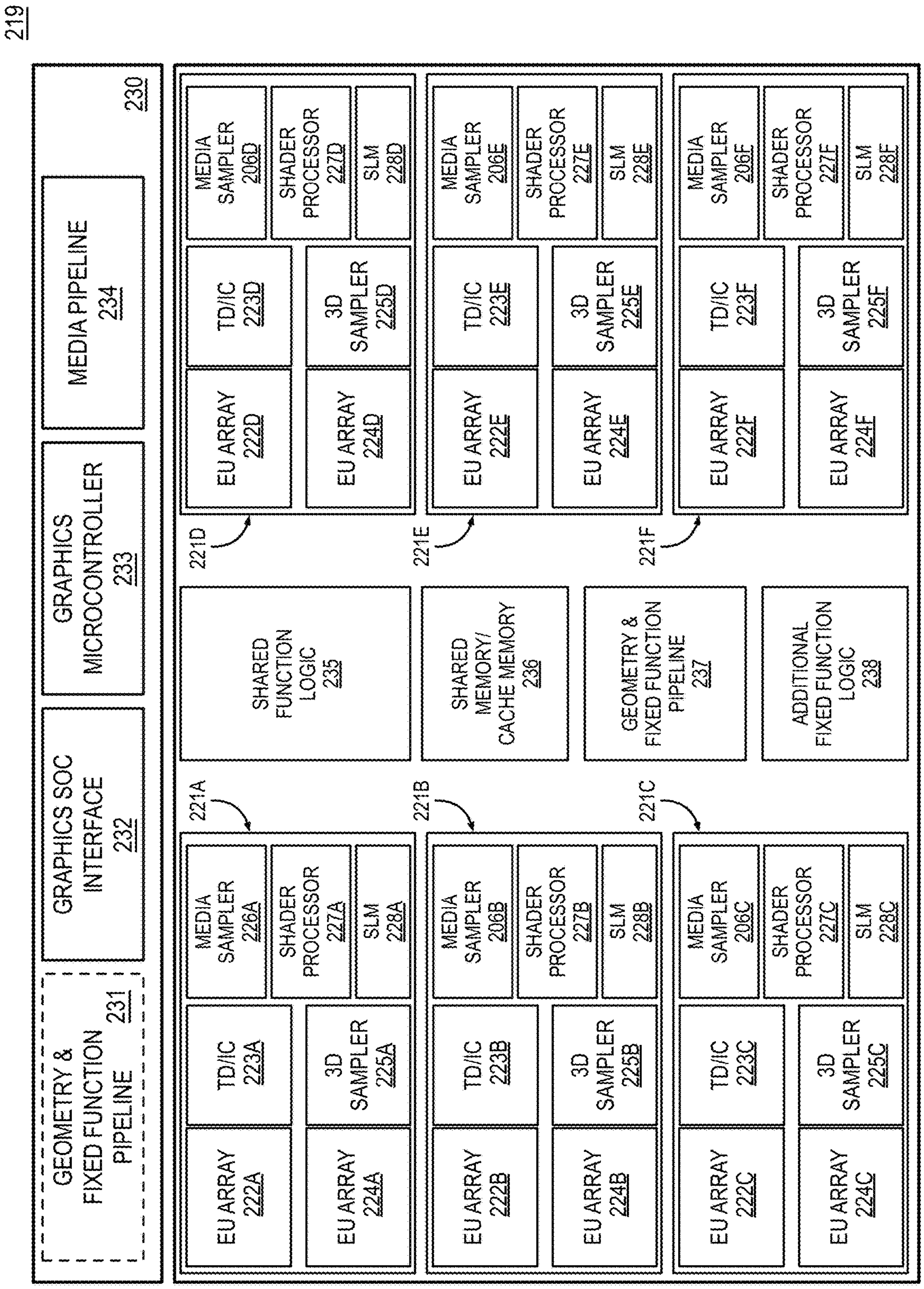

FIG. 2B is a block diagram of hardware logic of a graphics processor core 219, according to some embodiments described herein. Elements of FIG. 2B having the same reference numbers (or names) as the elements of any other figure herein can operate or function in any manner similar to that described elsewhere herein, but are not limited to such. The graphics processor core 219, sometimes referred to as a core slice, can be one or multiple graphics cores within a modular graphics processor. The graphics processor core 219 is exemplary of one graphics core slice, and a graphics processor as described herein may include multiple graphics core slices based on target power and performance envelopes. Each graphics processor core 219 can include a fixed function block 230 coupled with multiple sub-cores 221A-221F, also referred to as sub-slices, that include modular blocks of general-purpose and fixed function logic.

In some embodiments, the fixed function block 230 includes a geometry/fixed function pipeline 231 that can be shared by all sub-cores in the graphics processor core 219, for example, in lower performance and/or lower power graphics processor implementations. In various embodiments, the geometry/fixed function pipeline 231 includes a 3D fixed function pipeline (e.g., 3D pipeline 312 as in FIG. 3 and FIG. 4, described below) a video front-end unit, a thread spawner and thread dispatcher, and a unified return buffer manager, which manages unified return buffers (e.g., unified return buffer 418 in FIG. 4, as described below).

In one embodiment the fixed function block 230 also includes a graphics SoC interface 232, a graphics microcontroller 233, and a media pipeline 234. The graphics SoC interface 232 provides an interface between the graphics processor core 219 and other processor cores within a system on a chip integrated circuit. The graphics microcontroller 233 is a programmable sub-processor that is configurable to manage various functions of the graphics processor core 219, including thread dispatch, scheduling, and preemption. The media pipeline 234 (e.g., media pipeline 316 of FIG. 3 and FIG. 4) includes logic to facilitate the decoding, encoding, pre-processing, and/or post-processing of multimedia data, including image and video data. The media pipeline 234 implement media operations via requests to compute or sampling logic within the sub-cores 221-221F.

In one embodiment the SoC interface 232 enables the graphics processor core 219 to communicate with general-purpose application processor cores (e.g., CPUs) and/or other components within an SoC, including memory hierarchy elements such as a shared last level cache memory, the system RAM, and/or embedded on-chip or on-package DRAM. The SoC interface 232 can also enable communication with fixed function devices within the SoC, such as camera imaging pipelines, and enables the use of and/or implements global memory atomics that may be shared between the graphics processor core 219 and CPUs within the SoC. The SoC interface 232 can also implement power management controls for the graphics processor core 219 and enable an interface between a clock domain of the graphic core 219 and other clock domains within the SoC. In one embodiment the SoC interface 232 enables receipt of command buffers from a command streamer and global thread dispatcher that are configured to provide commands and instructions to each of one or more graphics cores within a graphics processor. The commands and instructions can be dispatched to the media pipeline 234, when media operations are to be performed, or a geometry and fixed function pipeline (e.g., geometry and fixed function pipeline 231, geometry and fixed function pipeline 237) when graphics processing operations are to be performed.

The graphics microcontroller 233 can be configured to perform various scheduling and management tasks for the graphics processor core 219. In one embodiment the graphics microcontroller 233 can perform graphics and/or compute workload scheduling on the various graphics parallel engines within execution unit (EU) arrays 222A-222F,

224A-224F within the sub-cores 221A-221F. In this scheduling model, host software executing on a CPU core of an SoC including the graphics processor core 219 can submit workloads one of multiple graphic processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 233 can also facilitate low-power or idle states for the graphics processor core 219, providing the graphics processor core 219 with the ability to save and restore registers within the graphics processor core 219 across low-power state transitions independently from the operating system and/or graphics driver software on the system.

The graphics processor core 219 may have greater than or fewer than the illustrated sub-cores 221A-221F, up to N modular sub-cores. For each set of N sub-cores, the graphics processor core 219 can also include shared function logic 235, shared and/or cache memory 236, a geometry/fixed function pipeline 237, as well as additional fixed function logic 238 to accelerate various graphics and compute processing operations. The shared function logic 235 can include logic units associated with the shared function logic 420 of FIG. 4 (e.g., sampler, math, and/or inter-thread communication logic) that can be shared by each N sub-cores within the graphics processor core 219. The shared and/or cache memory 236 can be a last-level cache for the set of N sub-cores 221A-221F within the graphics processor core 219, and can also serve as shared memory that is accessible by multiple sub-cores. The geometry/fixed function pipeline 237 can be included instead of the geometry/fixed function pipeline 231 within the fixed function block 230 and can include the same or similar logic units.

In one embodiment the graphics processor core 219 includes additional fixed function logic 238 that can include various fixed function acceleration logic for use by the graphics processor core 219. In one embodiment the additional fixed function logic 238 includes an additional geometry pipeline for use in position only shading. In position-only shading, two geometry pipelines exist, the full geometry pipeline within the geometry/fixed function pipeline 238, 231, and a cull pipeline, which is an additional geometry pipeline which may be included within the additional fixed function logic 238. In one embodiment the cull pipeline is a trimmed down version of the full geometry pipeline. The full pipeline and the cull pipeline can execute different instances of the same application, each instance having a separate context. Position only shading can hide long cull runs of discarded triangles, enabling shading to be completed earlier in some instances. For example and in one embodiment the cull pipeline logic within the additional fixed function logic 238 can execute position shaders in parallel with the main application and generally generates critical results faster than the full pipeline, as the cull pipeline fetches and shades only the position attribute of the vertices, without performing rasterization and rendering of the pixels to the frame buffer. The cull pipeline can use the generated critical results to compute visibility information for all the triangles without regard to whether those triangles are culled. The full pipeline (which in this instance may be referred to as a replay pipeline) can consume the visibility information to skip the culled triangles to shade only the visible triangles that are finally passed to the rasterization phase.

In one embodiment the additional fixed function logic 238 can also include machine-learning acceleration logic, such as fixed function matrix multiplication logic, for implementations including optimizations for machine learning training or inferencing.

Within each graphics sub-core 221A-221F includes a set of execution resources that may be used to perform graphics, media, and compute operations in response to requests by graphics pipeline, media pipeline, or shader programs. The graphics sub-cores 221A-221F include multiple EU arrays 222A-222F, 224A-224F, thread dispatch and inter-thread communication (TD/IC) logic 223A-223F, a 3D (e.g., texture) sampler 225A-225F, a media sampler 206A-206F, a shader processor 227A-227F, and shared local memory (SLM) 228A-228F. The EU arrays 222A-222F, 224A-224F each include multiple execution units, which are general-purpose graphics processing units capable of performing floating-point and integer/fixed-point logic operations in service of a graphics, media, or compute operation, including graphics, media, or compute shader programs. The TD/IC logic 223A-223F performs local thread dispatch and thread control operations for the execution units within a sub-core and facilitate communication between threads executing on the execution units of the sub-core. The 3D sampler 225A-225F can read texture or other 3D graphics related data into memory. The 3D sampler can read texture data differently based on a configured sample state and the texture format associated with a given texture. The media sampler 206A-206F can perform similar read operations based on the type and format associated with media data. In one embodiment, each graphics sub-core 221A-221F can alternately include a unified 3D and media sampler. Threads executing on the execution units within each of the sub-cores 221A-221F can make use of shared local memory 228A-228F within each sub-core, to enable threads executing within a thread group to execute using a common pool of on-chip memory.

Figure 2C:
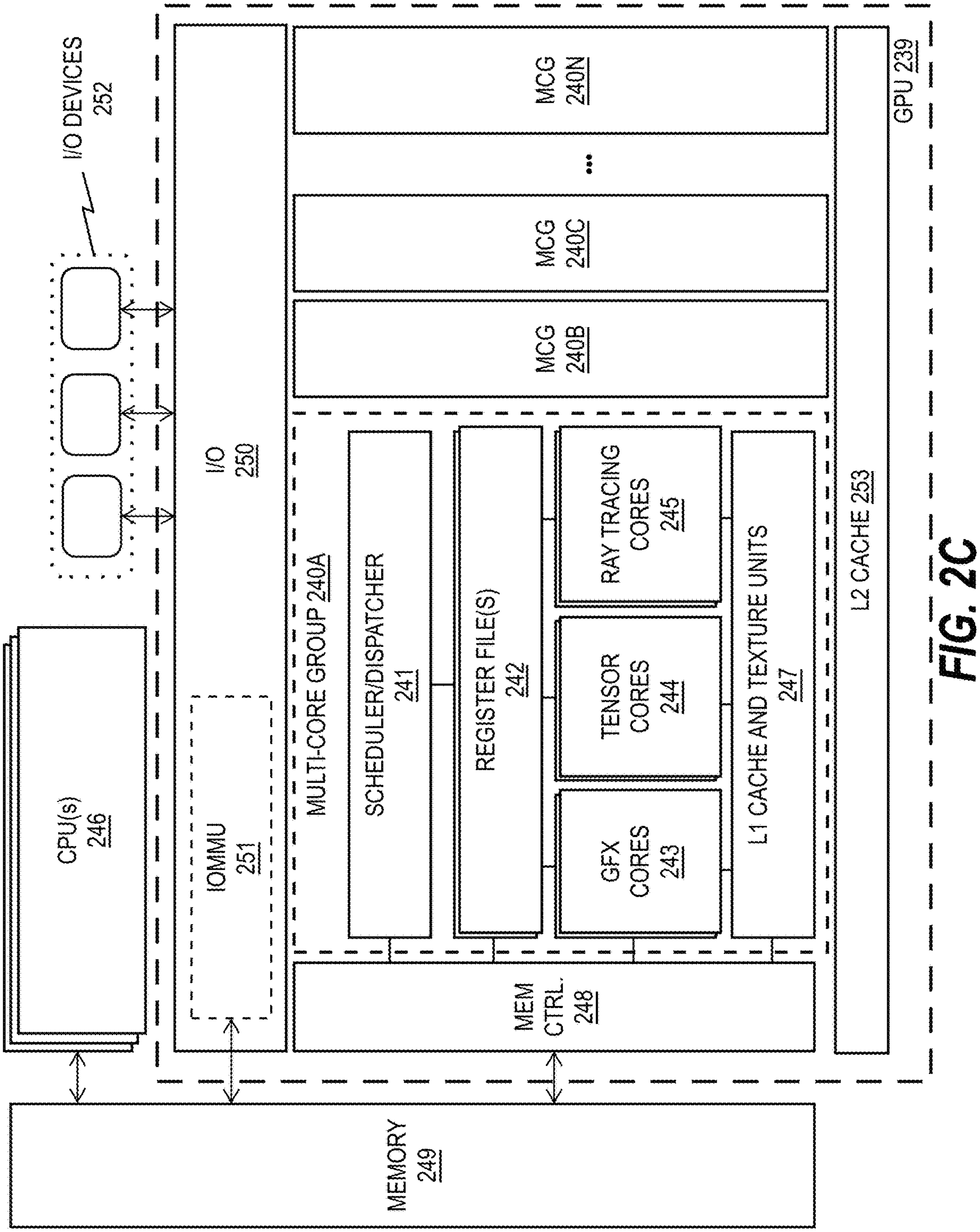

FIG. 2C illustrates a graphics processing unit (GPU) 239 that includes dedicated sets of graphics processing resources arranged into multi-core groups 240A-240N. While the details of only a single multi-core group 240A are provided, it will be appreciated that the other multi-core groups 240B-240N may be equipped with the same or similar sets of graphics processing resources.

As illustrated, a multi-core group 240A may include a set of graphics cores 243, a set of tensor cores 244, and a set of ray tracing cores 245. A scheduler/dispatcher 241 schedules and dispatches the graphics threads for execution on the various cores 243, 244, 245. A set of register files 242 store operand values used by the cores 243, 244, 245 when executing the graphics threads. These may include, for example, integer registers for storing integer values, floating point registers for storing floating point values, vector registers for storing packed data elements (integer and/or floating point data elements) and tile registers for storing tensor/matrix values. In one embodiment, the tile registers are implemented as combined sets of vector registers.

One or more combined level 1 (L1) caches and shared memory units 247 store graphics data such as texture data, vertex data, pixel data, ray data, bounding volume data, etc., locally within each multi-core group 240A. One or more texture units 247 can also be used to perform texturing operations, such as texture mapping and sampling. A Level 2 (L2) cache 253 shared by all or a subset of the multi-core groups 240A-240N stores graphics data and/or instructions for multiple concurrent graphics threads. As illustrated, the L2 cache 253 may be shared across a plurality of multi-core groups 240A-240N. One or more memory controllers 248 couple the GPU 239 to a memory 249 which may be a system memory (e.g., DRAM) and/or a dedicated graphics memory (e.g., GDDR6 memory).

Input/output (I/O) circuitry 250 couples the GPU 239 to one or more I/O devices 252 such as digital signal processors (DSPs), network controllers, or user input devices. An on-chip interconnect may be used to couple the I/O devices 252 to the GPU 239 and memory 249. One or more I/O memory management units (IOMMUs) 251 of the I/O circuitry 250 couple the I/O devices 252 directly to the system memory 249. In one embodiment, the IOMMU 251 manages multiple sets of page tables to map virtual addresses to physical addresses in system memory 249. In this embodiment, the I/O devices 252, CPU(s) 246, and GPU(s) 239 may share the same virtual address space.

In one implementation, the IOMMU 251 supports virtualization. In this case, it may manage a first set of page tables to map guest/graphics virtual addresses to guest/graphics physical addresses and a second set of page tables to map the guest/graphics physical addresses to system/host physical addresses (e.g., within system memory 249). The base addresses of each of the first and second sets of page tables may be stored in control registers and swapped out on a context switch (e.g., so that the new context is provided with access to the relevant set of page tables). While not illustrated in FIG. 2C, each of the cores 243, 244, 245 and/or multi-core groups 240A-240N may include translation lookaside buffers (TLBs) to cache guest virtual to guest physical translations, guest physical to host physical translations, and guest virtual to host physical translations.

In one embodiment, the CPUs 246, GPUs 239, and I/O devices 252 are integrated on a single semiconductor chip and/or chip package. The illustrated memory 249 may be integrated on the same chip or may be coupled to the memory controllers 248 via an off-chip interface. In one implementation, the memory 249 comprises GDDR6 memory which shares the same virtual address space as other physical system-level memories, although the underlying principles are not limited to this specific implementation.

In one embodiment, the tensor cores 244 include a plurality of execution units specifically designed to perform matrix operations, which are the fundamental compute operation used to perform deep learning operations. For example, simultaneous matrix multiplication operations may be used for neural network training and inferencing. The tensor cores 244 may perform matrix processing using a variety of operand precisions including single precision floating-point (e.g., 32 bits), half-precision floating point (e.g., 16 bits), integer words (16 bits), bytes (8 bits), and half-bytes (4 bits). In one embodiment, a neural network implementation extracts features of each rendered scene, potentially combining details from multiple frames, to construct a high-quality final image.

In deep learning implementations, parallel matrix multiplication work may be scheduled for execution on the tensor cores 244. The training of neural networks, in particular, requires a significant number of matrix dot product operations. In order to process an inner-product formulation of an N×N×N matrix multiply, the tensor cores 244 may include at least N dot-product processing elements. Before the matrix multiply begins, one entire matrix is loaded into tile registers and at least one column of a second matrix is loaded each cycle for N cycles. Each cycle, there are N dot products that are processed.

Matrix elements may be stored at different precisions depending on the particular implementation, including 16-bit words, 8-bit bytes (e.g., INT8) and 4-bit half-bytes (e.g., INT4). Different precision modes may be specified for the tensor cores 244 to ensure that the most efficient precision is used for different workloads (e.g., such as inferencing workloads which can tolerate quantization to bytes and half-bytes).

In one embodiment, the ray tracing cores 245 accelerate ray tracing operations for both real-time ray tracing and non-real-time ray tracing implementations. In particular, the ray tracing cores 245 include ray traversal/intersection circuitry for performing ray traversal using bounding volume hierarchies (BVHs) and identifying intersections between rays and primitives enclosed within the BVH volumes. The ray tracing cores 245 may also include circuitry for performing depth testing and culling (e.g., using a Z buffer or similar arrangement). In one implementation, the ray tracing cores 245 perform traversal and intersection operations in concert with the image denoising techniques described herein, at least a portion of which may be executed on the tensor cores 244. For example, in one embodiment, the tensor cores 244 implement a deep learning neural network to perform denoising of frames generated by the ray tracing cores 245. However, the CPU(s) 246, graphics cores 243, and/or ray tracing cores 245 may also implement all or a portion of the denoising and/or deep learning algorithms.

In addition, as described above, a distributed approach to denoising may be employed in which the GPU 239 is in a computing device coupled to other computing devices over a network or high speed interconnect. In this embodiment, the interconnected computing devices share neural network learning/training data to improve the speed with which the overall system learns to perform denoising for different types of image frames and/or different graphics applications.

In one embodiment, the ray tracing cores 245 process all BVH traversal and ray-primitive intersections, saving the graphics cores 243 from being overloaded with thousands of instructions per ray. In one embodiment, each ray tracing core 245 includes a first set of specialized circuitry for performing bounding box tests (e.g., for traversal operations) and a second set of specialized circuitry for performing the ray-triangle intersection tests (e.g., intersecting rays which have been traversed). Thus, in one embodiment, the multi-core group 240A can simply launch a ray probe, and the ray tracing cores 245 independently perform ray traversal and intersection and return hit data (e.g., a hit, no hit, multiple hits, etc.) to the thread context. The other cores 243, 244 are freed to perform other graphics or compute work while the ray tracing cores 245 perform the traversal and intersection operations.

In one embodiment, each ray tracing core 245 includes a traversal unit to perform BVH testing operations and an intersection unit which performs ray-primitive intersection tests. The intersection unit generates a "hit", "no hit", or "multiple hit" response, which it provides to the appropriate thread. During the traversal and intersection operations, the execution resources of the other cores (e.g., graphics cores 243 and tensor cores 244) are freed to perform other forms of graphics work.

In one particular embodiment described below, a hybrid rasterization/ray tracing approach is used in which work is distributed between the graphics cores 243 and ray tracing cores 245.

In one embodiment, the ray tracing cores 245 (and/or other cores 243, 244) include hardware support for a ray tracing instruction set such as Microsoft's DirectX Ray Tracing (DXR) which includes a DispatchRays command, as well as ray-generation, closest-hit, any-hit, and miss shaders, which enable the assignment of unique sets of shaders and textures for each object. Another ray tracing platform which may be supported by the ray tracing cores 245, graphics cores 243 and tensor cores 244 is Vulkan 1.1.85. Note, however, that the underlying principles are not limited to any particular ray tracing ISA.

In general, the various cores 245, 244, 243 may support a ray tracing instruction set that includes instructions/functions for ray generation, closest hit, any hit, ray-primitive intersection, per-primitive and hierarchical bounding box construction, miss, visit, and exceptions. More specifically, one embodiment includes ray tracing instructions to perform the following functions:

Ray Generation—Ray generation instructions may be executed for each pixel, sample, or other user-defined work assignment.

Closest Hit—A closest hit instruction may be executed to locate the closest intersection point of a ray with primitives within a scene.

Any Hit—An any hit instruction identifies multiple intersections between a ray and primitives within a scene, potentially to identify a new closest intersection point.

Intersection—An intersection instruction performs a ray-primitive intersection test and outputs a result.

Per-primitive Bounding box Construction—This instruction builds a bounding box around a given primitive or group of primitives (e.g., when building a new BVH or other acceleration data structure).

Miss—Indicates that a ray misses all geometry within a scene, or specified region of a scene.

Visit—Indicates the children volumes a ray will traverse.

Exceptions—Includes various types of exception handlers (e.g., invoked for various error conditions).

Figure 2D:
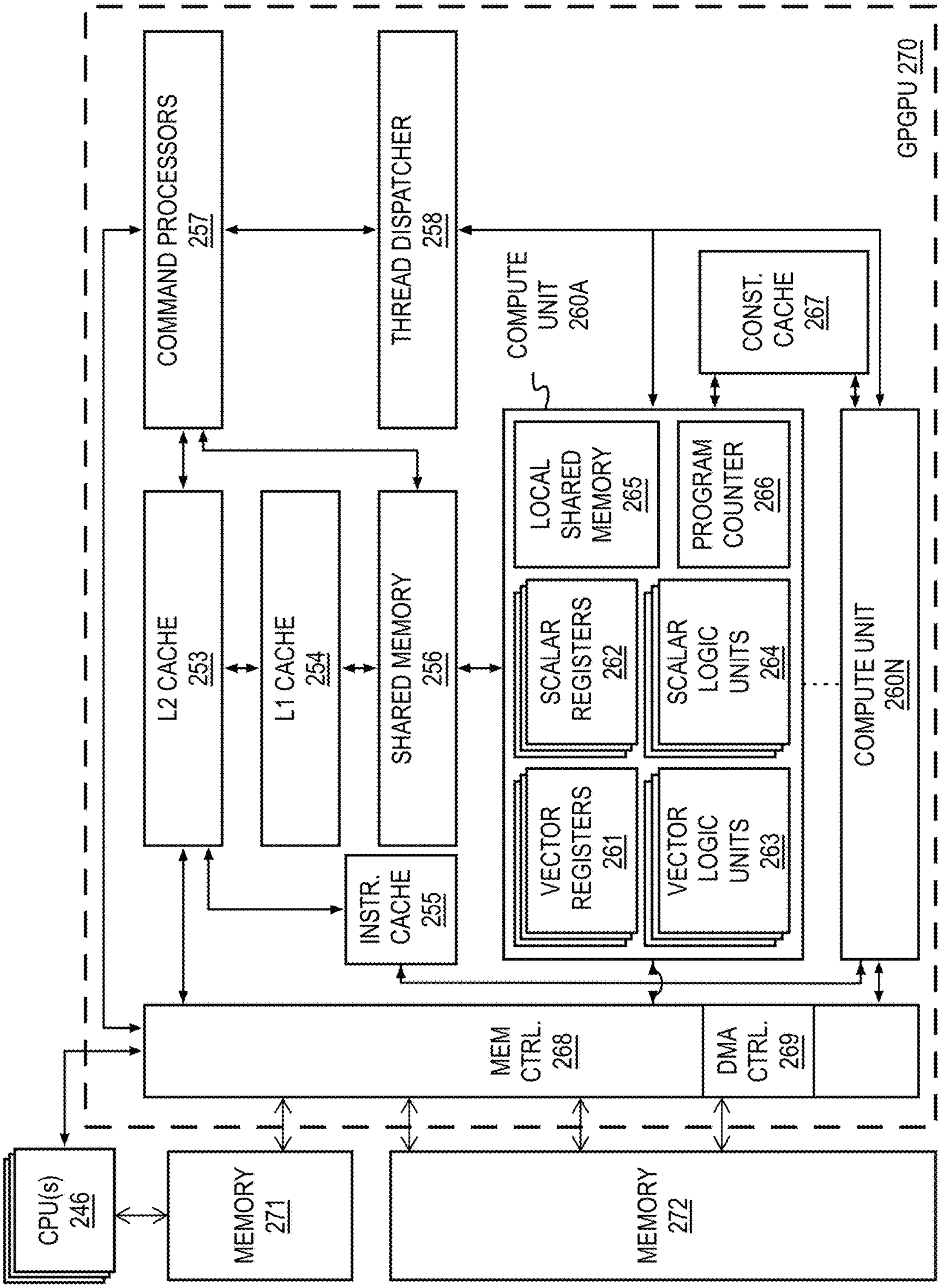

FIG. 2D is a block diagram of general purpose graphics processing unit (GPGPU) 270 that can be configured as a graphics processor and/or compute accelerator, according to embodiments described herein. The GPGPU 270 can interconnect with host processors (e.g., one or more CPU(s) 246) and memory 271, 272 via one or more system and/or memory busses. In one embodiment the memory 271 is system memory that may be shared with the one or more CPU(s) 246, while memory 272 is device memory that is dedicated to the GPGPU 270. In one embodiment, components within the GPGPU 270 and device memory 272 may be mapped into memory addresses that are accessible to the one or more CPU(s) 246. Access to memory 271 and 272 may be facilitated via a memory controller 268. In one embodiment the memory controller 268 includes an internal direct memory access (DMA) controller 269 or can include logic to perform operations that would otherwise be performed by a DMA controller.

The GPGPU 270 includes multiple cache memories, including an L2 cache 253, L1 cache 254, an instruction cache 255, and shared memory 256, at least a portion of which may also be partitioned as a cache memory. The GPGPU 270 also includes multiple compute units 260A-260N. Each compute unit 260A-260N includes a set of vector registers 261, scalar registers 262, vector logic units 263, and scalar logic units 264. The compute units 260A-260N can also include local shared memory 265 and a program counter 266. The compute units 260A-260N can couple with a constant cache 267, which can be used to store constant data, which is data that will not change during the run of kernel or shader program that executes on the GPGPU 270. In one embodiment the constant cache 267 is a scalar data cache and cached data can be fetched directly into the scalar registers 262.

During operation, the one or more CPU(s) 246 can write commands into registers or memory in the GPGPU 270 that has been mapped into an accessible address space. The command processors 257 can read the commands from registers or memory and determine how those commands will be processed within the GPGPU 270. A thread dispatcher 258 can then be used to dispatch threads to the compute units 260A-260N to perform those commands. Each compute unit 260A-260N can execute threads independently of the other compute units. In addition, each compute unit 260A-260N can be independently configured for conditional computation and can conditionally output the results of computation to memory. The command processors 257 can interrupt the one or more CPU(s) 246 when the submitted commands are complete.

Figure 3A:
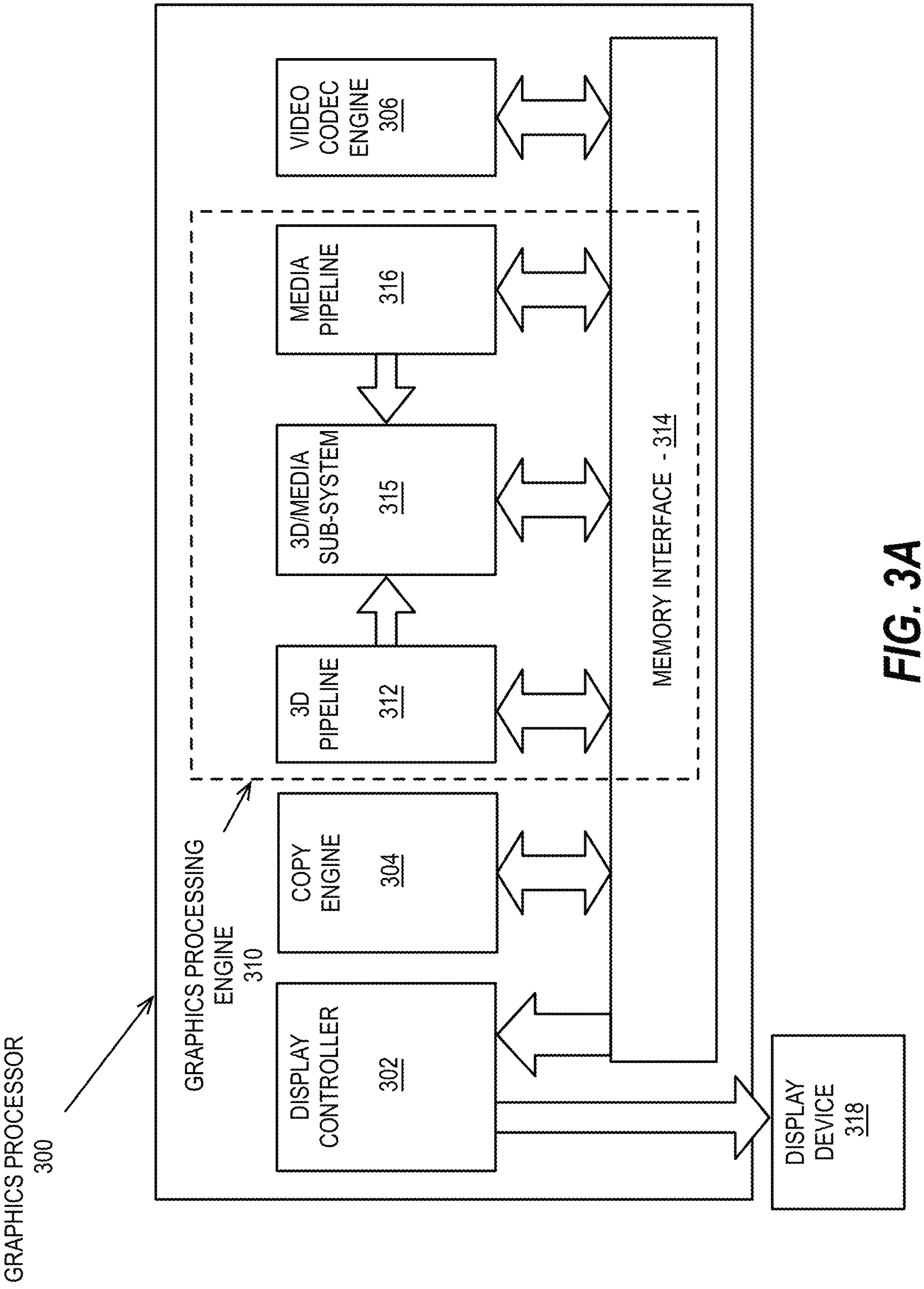
FIGS. 3A-3C illustrate block diagrams of additional graphics processor and compute accelerator architectures, according to some embodiments.
Figure 3B:
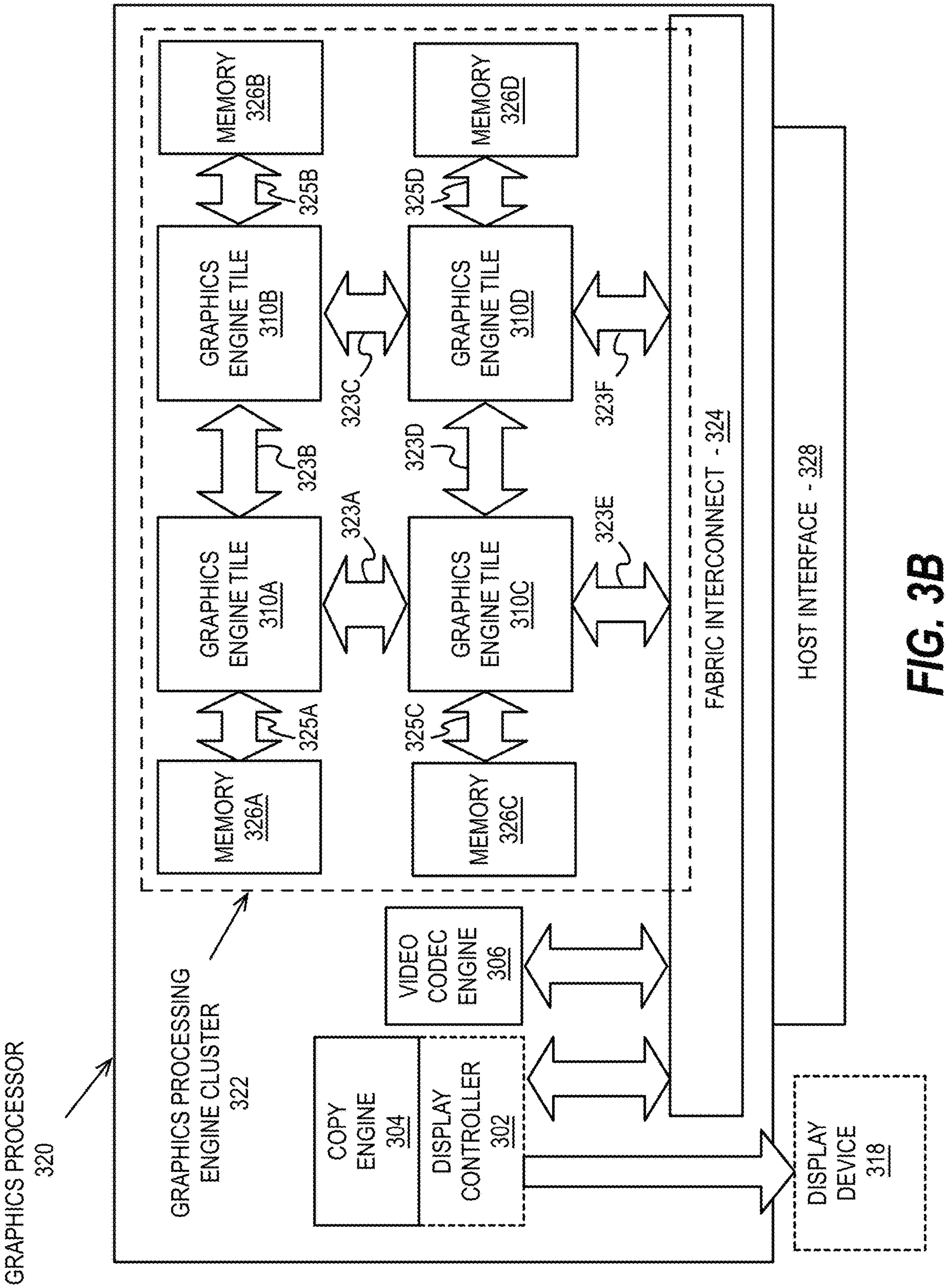
Figure 3C:
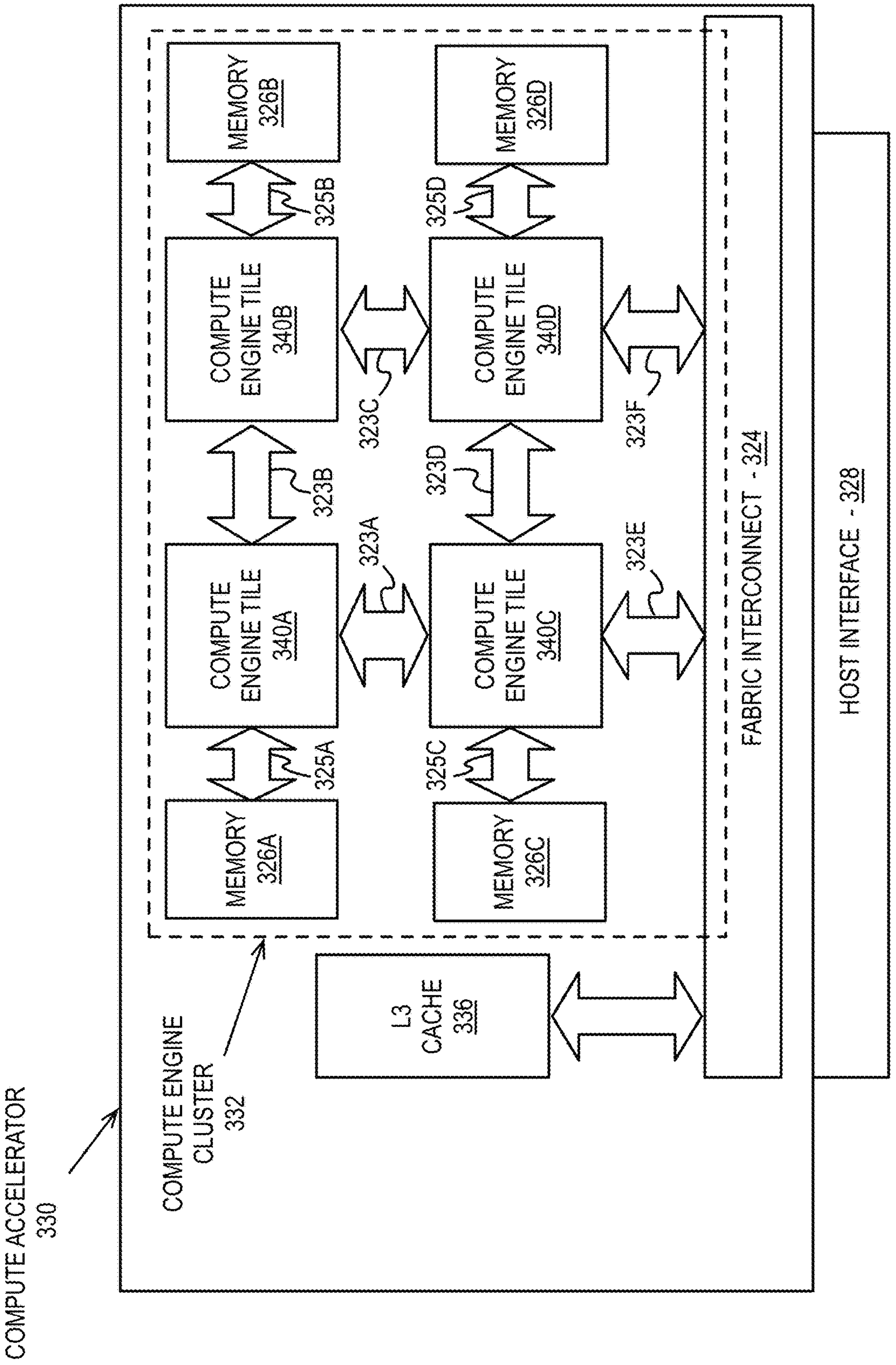

FIGS. 3A-3C illustrate block diagrams of additional graphics processor and compute accelerator architectures provided by embodiments described herein. The elements of FIGS. 3A-3C having the same reference numbers (or names) as the elements of any other figure herein can operate or function in any manner similar to that described elsewhere herein, but are not limited to such.

FIG. 3A is a block diagram of a graphics processor 300, which may be a discrete graphics processing unit, or may be a graphics processor integrated with a plurality of processing cores, or other semiconductor devices such as, but not limited to, memory devices or network interfaces. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 318. Display controller 302 includes hardware for one or more overlay planes for the display and composition of multiple layers of video or user interface elements. The display device 318 can be an internal or external display device. In one embodiment the display device 318 is a head mounted display device, such as a virtual reality (VR) display device or an augmented reality (AR) display device. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, H.265/HEVC, Alliance for Open Media (AOMedia) VP8, VP9, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

FIG. 3B illustrates a graphics processor 320 having a tiled architecture, according to embodiments described herein. In one embodiment the graphics processor 320 includes a graphics processing engine cluster 322 having multiple instances of the graphics processing engine 310 of FIG. 3A within a graphics engine tile 310A-310D. Each graphics engine tile 310A-310D can be interconnected via a set of tile interconnects 323A-323F. Each graphics engine tile 310A-310D can also be connected to a memory module or memory device 326A-326D via memory interconnects 325A-325D. The memory devices 326A-326D can use any graphics memory technology. For example, the memory devices 326A-326D may be graphics double data rate (GDDR) memory. The memory devices 326A-326D, in one embodiment, are high-bandwidth memory (HBM) modules that can be on-die with their respective graphics engine tile 310A-310D. In one embodiment the memory devices 326A-326D are stacked memory devices that can be stacked on top of their respective graphics engine tile 310A-310D. In one embodiment, each graphics engine tile 310A-310D and associated memory 326A-326D reside on separate chiplets, which are bonded to a base die or base substrate, as described on further detail in FIGS. 11B-11D.

The graphics processing engine cluster 322 can connect with an on-chip or on-package fabric interconnect 324. The fabric interconnect 324 can enable communication between graphics engine tiles 310A-310D and components such as the video codec 306 and one or more copy engines 304. The copy engines 304 can be used to move data out of, into, and between the memory devices 326A-326D and memory that is external to the graphics processor 320 (e.g., system memory). The fabric interconnect 324 can also be used to interconnect the graphics engine tiles 310A-310D. The graphics processor 320 may optionally include a display controller 302 to enable a connection with an external display device 318. The graphics processor may also be configured as a graphics or compute accelerator. In the accelerator configuration, the display controller 302 and display device 318 may be omitted.

The graphics processor 320 can connect to a host system via a host interface 328. The host interface 328 can enable communication between the graphics processor 320, system memory, and/or other system components. The host interface 328 can be, for example a PCI express bus or another type of host system interface.

FIG. 3C illustrates a compute accelerator 330, according to embodiments described herein. The compute accelerator 330 can include architectural similarities with the graphics processor 320 of FIG. 3B and is optimized for compute acceleration. A compute engine cluster 332 can include a set of compute engine tiles 340A-340D that include execution logic that is optimized for parallel or vector-based general-purpose compute operations. In some embodiments, the compute engine tiles 340A-340D do not include fixed function graphics processing logic, although in one embodiment one or more of the compute engine tiles 340A-340D can include logic to perform media acceleration. The compute engine tiles 340A-340D can connect to memory 326A-326D via memory interconnects 325A-325D. The memory 326A-326D and memory interconnects 325A-325D may be similar technology as in graphics processor 320, or can be different. The graphics compute engine tiles 340A-340D can also be interconnected via a set of tile interconnects 323A-323F and may be connected with and/or interconnected by a fabric interconnect 324. In one embodiment the compute accelerator 330 includes a large L3 cache 336 that can be configured as a device-wide cache. The compute accelerator 330 can also connect to a host processor and memory via a host interface 328 in a similar manner as the graphics processor 320 of FIG. 3B.

Graphics Processing Engine

Figure 4:
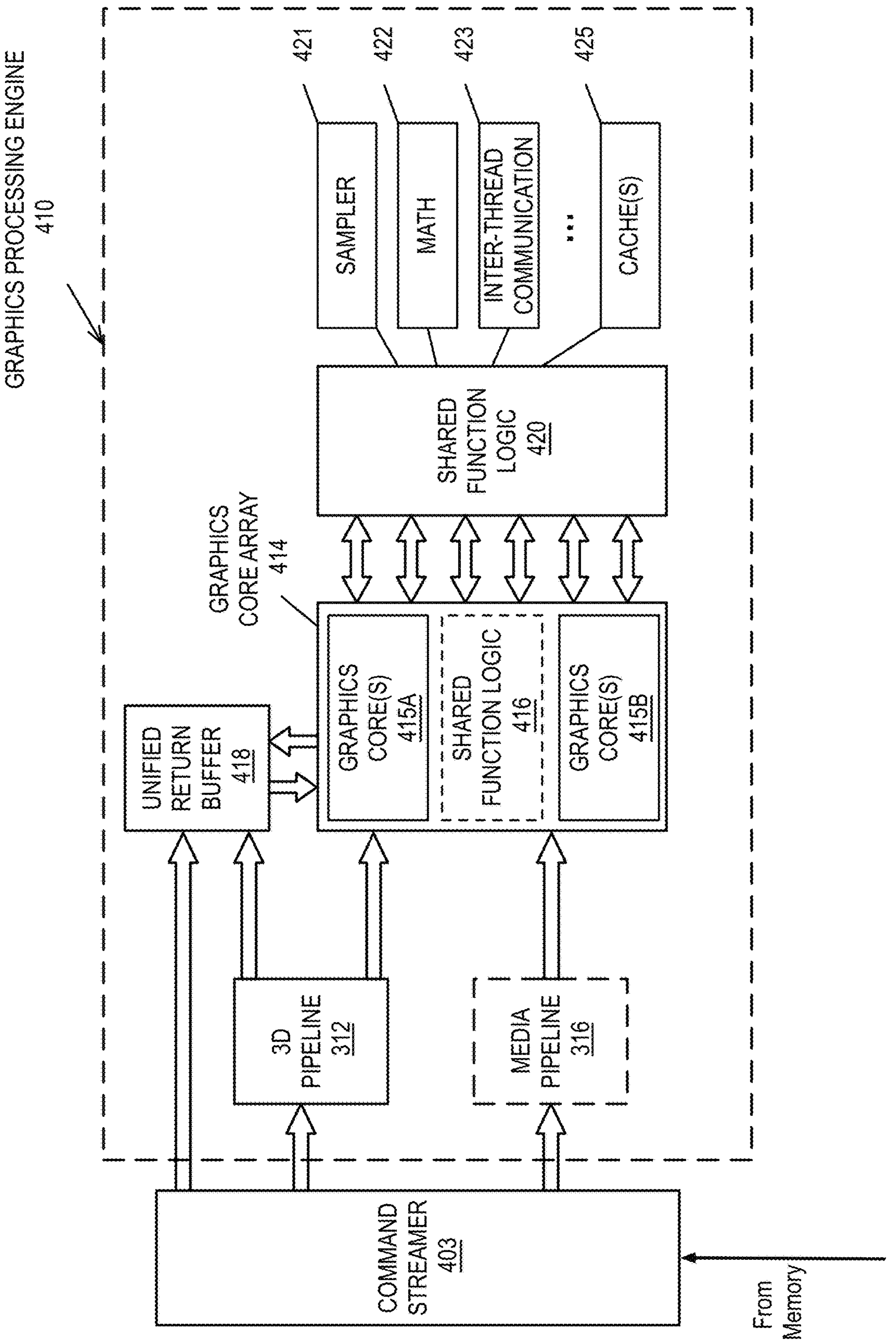
FIG. 4 is a block diagram of a graphics processing engine of a graphics processor, according to some embodiments.

FIG. 4 is a block diagram of a graphics processing engine 410 of a graphics processor in accordance with some embodiments. In one embodiment, the graphics processing engine (GPE) 410 is a version of the GPE 310 shown in FIG. 3A, and may also represent a graphics engine tile 310A-310D of FIG. 3B. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3A are illustrated. The media pipeline 316 is optional in some embodiments of the GPE 410 and may not be explicitly included within the GPE 410. For example, and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414. In one embodiment the graphics core array 414 include one or more blocks of graphics cores (e.g., graphics core(s) 415A, graphics core(s) 415B), each block including one or more graphics cores. Each graphics core includes a set of graphics execution resources that includes general-purpose and graphics specific execution logic to perform graphics and compute operations, as well as fixed function texture processing and/or machine learning and artificial intelligence acceleration logic.

In various embodiments the 3D pipeline 312 can include fixed function and programmable logic to process one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources for use in processing these shader programs. Multi-purpose execution logic (e.g., execution units) within the graphics core(s) 415A-414B of the graphic core array 414 includes support for various 3D API shader languages and can execute multiple simultaneous execution threads associated with multiple shaders.

In some embodiments, the graphics core array 414 includes execution logic to perform media functions, such as video and/or image processing. In one embodiment, the execution units include general-purpose logic that is programmable to perform parallel general-purpose computational operations, in addition to graphics processing operations. The general-purpose logic can perform processing operations in parallel or in conjunction with general-purpose logic within the processor core(s) 107 of FIG. 1 or core 202A-202N as in FIG. 2A.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420.

A shared function is implemented at least in a case where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies across embodiments. In some embodiments, specific shared functions within the shared function logic 420 that are used extensively by the graphics core array 414 may be included within shared function logic 416 within the graphics core array 414. In various embodiments, the shared function logic 416 within the graphics core array 414 can include some or all logic within the shared function logic 420. In one embodiment, all logic elements within the shared function logic 420 may be duplicated within the shared function logic 416 of the graphics core array 414. In one embodiment the shared function logic 420 is excluded in favor of the shared function logic 416 within the graphics core array 414.

Execution Units

Figure 5A:
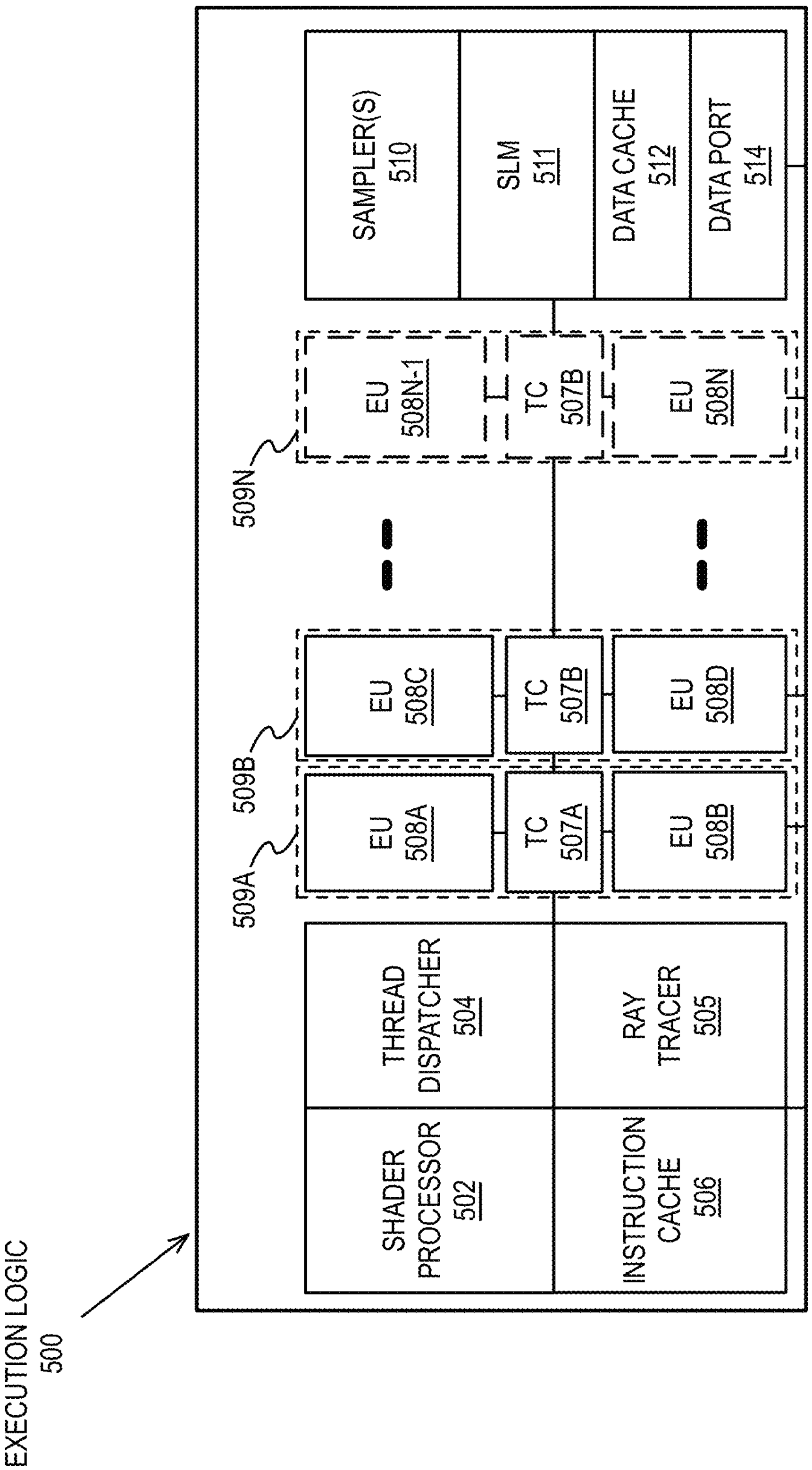
FIGS. 5A-5B illustrate thread execution logic including an array of processing elements employed in a graphics processor core, according to some embodiments.
Figure 5B:
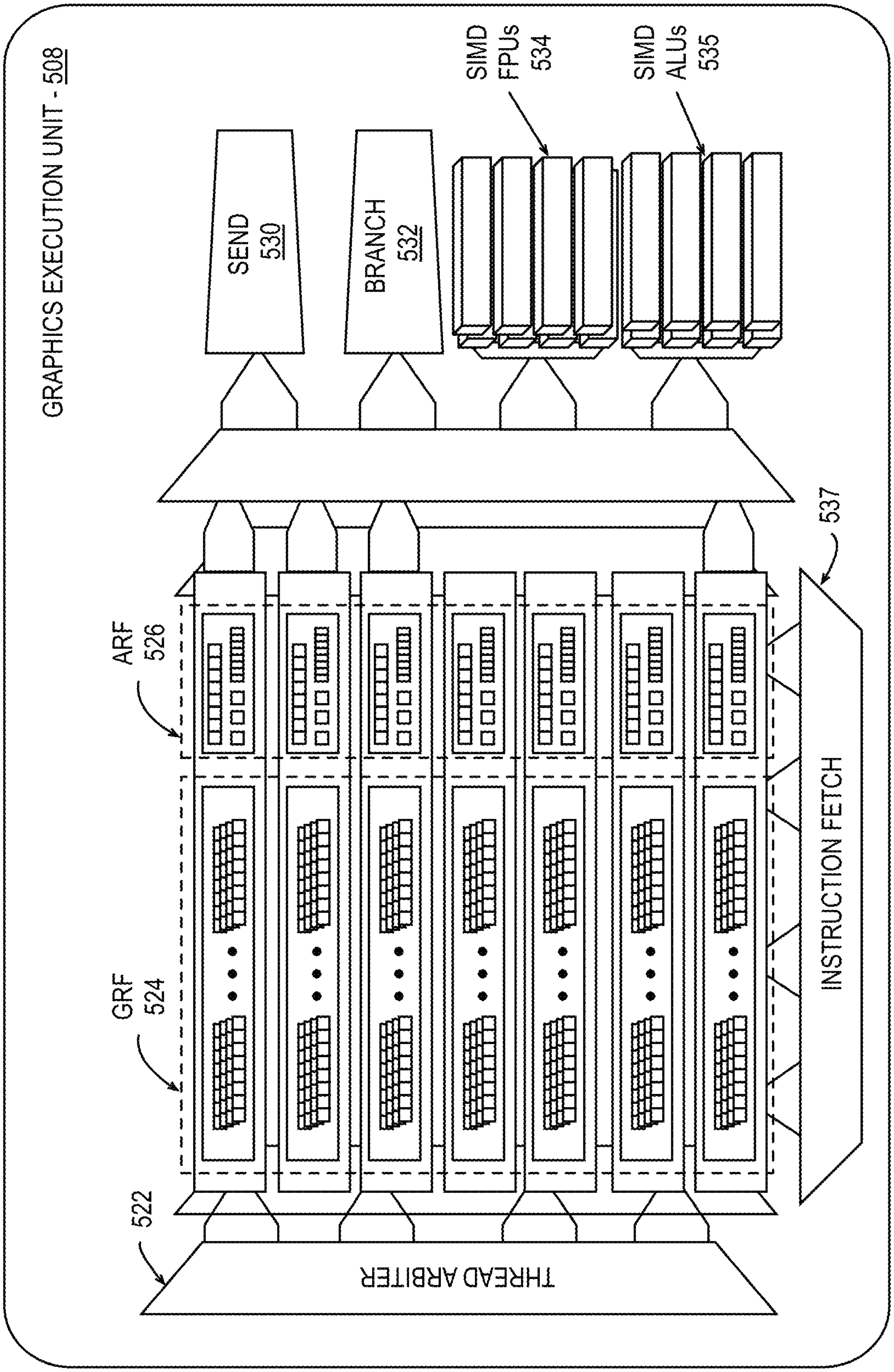

FIGS. 5A-5B illustrate thread execution logic 500 including an array of processing elements employed in a graphics processor core according to embodiments described herein. Elements of FIGS. 5A-5B having the same reference numbers (or names) as the elements of any other figure herein can operate or function in any manner similar to that described elsewhere herein, but are not limited to such. FIG. 5A-5B illustrates an overview of thread execution logic 500, which may be representative of hardware logic illustrated with each sub-core 221A-221F of FIG. 2B. FIG. 5A is representative of an execution unit within a general-purpose graphics processor, while FIG. 5B is representative of an execution unit that may be used within a compute accelerator.

As illustrated in FIG. 5A, in some embodiments thread execution logic 500 includes a shader processor 502, a thread dispatcher 504, instruction cache 506, a scalable execution unit array including a plurality of execution units 508A-508N, a sampler 510, shared local memory 511, a data cache 512, and a data port 514. In one embodiment the scalable execution unit array can dynamically scale by enabling or disabling one or more execution units (e.g., any of execution units 508A, 508B, 508C, 508D, through 508N-1 and 508N) based on the computational requirements of a workload. In one embodiment the included components are interconnected via an interconnect fabric that links to each of the components. In some embodiments, thread execution logic 500 includes one or more connections to memory, such as system memory or cache memory, through one or more of instruction cache 506, data port 514, sampler 510, and execution units 508A-508N. In some embodiments, each execution unit (e.g. 508A) is a stand-alone programmable general-purpose computational unit that is capable of executing multiple simultaneous hardware threads while processing multiple data elements in parallel for each thread. In various embodiments, the array of execution units 508A-508N is scalable to include any number individual execution units.

In some embodiments, the execution units 508A-508N are primarily used to execute shader programs. A shader processor 502 can process the various shader programs and dispatch execution threads associated with the shader programs via a thread dispatcher 504. In one embodiment the thread dispatcher includes logic to arbitrate thread initiation requests from the graphics and media pipelines and instantiate the requested threads on one or more execution unit in the execution units 508A-508N. For example, a geometry pipeline can dispatch vertex, tessellation, or geometry shaders to the thread execution logic for processing. In some embodiments, thread dispatcher 504 can also process runtime thread spawning requests from the executing shader programs.

In some embodiments, the execution units 508A-508N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 508A-508N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 508A-508N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader. Various embodiments can apply to use execution by use of Single Instruction Multiple Thread (SIMT) as an alternate to use of SIMD or in addition to use of SIMD. Reference to a SIMD core or operation can apply also to SIMT or apply to SIMD in combination with SIMT.

Each execution unit in execution units 508A-508N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 508A-508N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 54-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

In one embodiment one or more execution units can be combined into a fused execution unit 509A-509N having thread control logic (507A-507N) that is common to the fused EUs. Multiple EUs can be fused into an EU group. Each EU in the fused EU group can be configured to execute a separate SIMD hardware thread. The number of EUs in a fused EU group can vary according to embodiments. Additionally, various SIMD widths can be performed per-EU, including but not limited to SIMD8, SIMD16, and SIMD32. Each fused graphics execution unit 509A-509N includes at least two execution units. For example, fused execution unit 509A includes a first EU 508A, second EU 508B, and thread control logic 507A that is common to the first EU 508A and the second EU 508B. The thread control logic 507A controls threads executed on the fused graphics execution unit 509A, allowing each EU within the fused execution units 509A-509N to execute using a common instruction pointer register.

One or more internal instruction caches (e.g., 506) are included in the thread execution logic 500 to cache thread instructions for the execution units. In some embodiments, one or more data caches (e.g., 512) are included to cache thread data during thread execution. Threads executing on the execution logic 500 can also store explicitly managed data in the shared local memory 511. In some embodiments, a sampler 510 is included to provide texture sampling for 3D operations and media sampling for media operations. In some embodiments, sampler 510 includes specialized texture or media sampling functionality to process texture or media data during the sampling process before providing the sampled data to an execution unit.

During execution, the graphics and media pipelines send thread initiation requests to thread execution logic 500 via thread spawning and dispatch logic. Once a group of geometric objects has been processed and rasterized into pixel data, pixel processor logic (e.g., pixel shader logic, fragment shader logic, etc.) within the shader processor 502 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 502 then executes an application programming interface (API)-supplied pixel or fragment shader program. To execute the shader program, the shader processor 502 dispatches threads to an execution unit (e.g., 508A) via thread dispatcher 504. In some embodiments, shader processor 502 uses texture sampling logic in the sampler 510 to access texture data in texture maps stored in memory. Arithmetic operations on the texture data and the input geometry data compute pixel color data for each geometric fragment, or discards one or more pixels from further processing.

In some embodiments, the data port 514 provides a memory access mechanism for the thread execution logic 500 to output processed data to memory for further processing on a graphics processor output pipeline. In some embodiments, the data port 514 includes or couples to one or more cache memories (e.g., data cache 512) to cache data for memory access via the data port.

In one embodiment, the execution logic 500 can also include a ray tracer 505 that can provide ray tracing acceleration functionality. The ray tracer 505 can support a ray tracing instruction set that includes instructions/functions for ray generation. The ray tracing instruction set can be similar to or different from the ray-tracing instruction set supported by the ray tracing cores 245 in FIG. 2C.

FIG. 5B illustrates exemplary internal details of an execution unit 508, according to embodiments. A graphics execution unit 508 can include an instruction fetch unit 537, a general register file array (GRF) 524, an architectural register file array (ARF) 526, a thread arbiter 522, a send unit 530, a branch unit 532, a set of SIMD floating point units (FPUs) 534, and in one embodiment a set of dedicated integer SIMD ALUs 535. The GRF 524 and ARF 526 includes the set of general register files and architecture register files associated with each simultaneous hardware thread that may be active in the graphics execution unit 508. In one embodiment, per thread architectural state is maintained in the ARF 526, while data used during thread execution is stored in the GRF 524. The execution state of each thread, including the instruction pointers for each thread, can be held in thread-specific registers in the ARF 526.

In one embodiment the graphics execution unit 508 has an architecture that is a combination of Simultaneous Multi-Threading (SMT) and fine-grained Interleaved Multi-Threading (IMT). The architecture has a modular configuration that can be fine-tuned at design time based on a target number of simultaneous threads and number of registers per execution unit, where execution unit resources are divided across logic used to execute multiple simultaneous threads. The number of logical threads that may be executed by the graphics execution unit 508 is not limited to the number of hardware threads, and multiple logical threads can be assigned to each hardware thread.

In one embodiment, the graphics execution unit 508 can co-issue multiple instructions, which may each be different instructions. The thread arbiter 522 of the graphics execution unit thread 508 can dispatch the instructions to one of the send unit 530, branch unit 532, or SIMD FPU(s) 534 for execution. Each execution thread can access 128 general-purpose registers within the GRF 524, where each register can store 32 bytes, accessible as a SIMD 8-element vector of 32-bit data elements. In one embodiment, each execution unit thread has access to 4 Kbytes within the GRF 524, although embodiments are not so limited, and greater or fewer register resources may be provided in other embodiments. In one embodiment the graphics execution unit 508 is partitioned into seven hardware threads that can independently perform computational operations, although the number of threads per execution unit can also vary according to embodiments. For example, in one embodiment up to 16 hardware threads are supported. In an embodiment in which seven threads may access 4 Kbytes, the GRF 524 can store a total of 28 Kbytes. Where 16 threads may access 4Kbytes, the GRF 524 can store a total of 64Kbytes. Flexible addressing modes can permit registers to be addressed together to build effectively wider registers or to represent strided rectangular block data structures.

In one embodiment, memory operations, sampler operations, and other longer-latency system communications are dispatched via "send" instructions that are executed by the message passing send unit 530. In one embodiment, branch instructions are dispatched to a dedicated branch unit 532 to facilitate SIMD divergence and eventual convergence.

In one embodiment the graphics execution unit 508 includes one or more SIMD floating point units (FPU(s)) 534 to perform floating-point operations. In one embodiment, the FPU(s) 534 also support integer computation. In one embodiment the FPU(s) 534 can SIMD execute up to M number of 32-bit floating-point (or integer) operations, or SIMD execute up to 2M 16-bit integer or 16-bit floating-point operations. In one embodiment, at least one of the FPU(s) provides extended math capability to support high-throughput transcendental math functions and double precision 54-bit floating-point. In some embodiments, a set of 8-bit integer SIMD ALUs 535 are also present, and may be specifically optimized to perform operations associated with machine learning computations.

In one embodiment, arrays of multiple instances of the graphics execution unit 508 can be instantiated in a graphics sub-core grouping (e.g., a sub-slice). For scalability, product architects can choose the exact number of execution units per sub-core grouping. In one embodiment the execution unit 508 can execute instructions across a plurality of execution channels. In a further embodiment, each thread executed on the graphics execution unit 508 is executed on a different channel.

Figure 6:
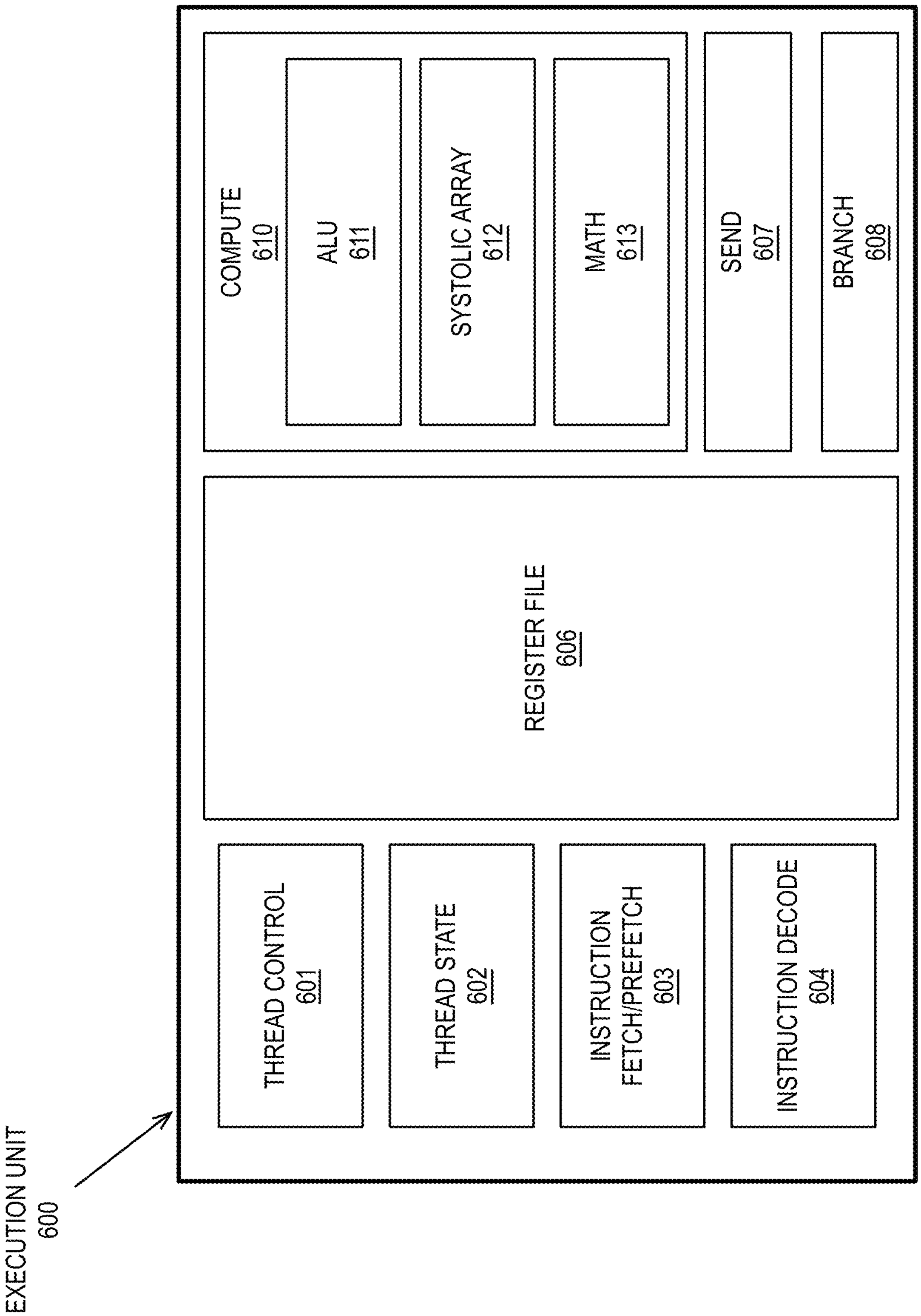
FIG. 6 illustrates an additional execution unit, according to an embodiment.

FIG. 6 illustrates an additional execution unit 600, according to an embodiment. The execution unit 600 may be a compute-optimized execution unit for use in, for example, a compute engine tile 340A-340D as in FIG. 3C, but is not limited as such. Variants of the execution unit 600 may also be used in a graphics engine tile 310A-310D as in FIG. 3B. In one embodiment, the execution unit 600 includes a thread control unit 601, a thread state unit 602, an instruction fetch/prefetch unit 603, and an instruction decode unit 604. The execution unit 600 additionally includes a register file 606 that stores registers that can be assigned to hardware threads within the execution unit. The execution unit 600 additionally includes a send unit 607 and a branch unit 608. In one embodiment, the send unit 607 and branch unit 608 can operate similarly as the send unit 530 and a branch unit 532 of the graphics execution unit 508 of FIG. 5B.

The execution unit 600 also includes a compute unit 610 that includes multiple different types of functional units. In one embodiment the compute unit 610 includes an ALU unit 611 that includes an array of arithmetic logic units. The ALU unit 611 can be configured to perform 64-bit, 32-bit, and 16-bit integer and floating point operations. Integer and floating point operations may be performed simultaneously. The compute unit 610 can also include a systolic array 612, and a math unit 613. The systolic array 612 includes a W wide and D deep network of data processing units that can be used to perform vector or other data-parallel operations in a systolic manner. In one embodiment the systolic array 612 can be configured to perform matrix operations, such as matrix dot product operations. In one embodiment the systolic array 612 support 16-bit floating point operations, as well as 8-bit and 4-bit integer operations. In one embodiment the systolic array 612 can be configured to accelerate machine learning operations. In such embodiments, the systolic array 612 can be configured with support for the bfloat 16-bit floating point format. In one embodiment, a math unit 613 can be included to perform a specific subset of mathematical operations in an efficient and lower-power manner than then ALU unit 611. The math unit 613 can include a variant of math logic that may be found in shared function logic of a graphics processing engine provided by other embodiments (e.g., math logic 422 of the shared function logic 420 of FIG. 4). In one embodiment the math unit 613 can be configured to perform 32-bit and 64-bit floating point operations.

The thread control unit 601 includes logic to control the execution of threads within the execution unit. The thread control unit 601 can include thread arbitration logic to start, stop, and preempt execution of threads within the execution unit 600. The thread state unit 602 can be used to store thread state for threads assigned to execute on the execution unit 600. Storing the thread state within the execution unit 600 enables the rapid pre-emption of threads when those threads become blocked or idle. The instruction fetch/prefetch unit 603 can fetch instructions from an instruction cache of higher level execution logic (e.g., instruction cache 506 as in FIG. 5A). The instruction fetch/prefetch unit 603 can also issue prefetch requests for instructions to be loaded into the instruction cache based on an analysis of currently executing threads. The instruction decode unit 604 can be used to decode instructions to be executed by the compute units. In one embodiment, the instruction decode unit 604 can be used as a secondary decoder to decode complex instructions into constituent micro-operations.

The execution unit 600 additionally includes a register file 606 that can be used by hardware threads executing on the execution unit 600. Registers in the register file 606 can be divided across the logic used to execute multiple simultaneous threads within the compute unit 610 of the execution unit 600. The number of logical threads that may be executed by the graphics execution unit 600 is not limited to the number of hardware threads, and multiple logical threads can be assigned to each hardware thread. The size of the register file 606 can vary across embodiments based on the number of supported hardware threads. In one embodiment, register renaming may be used to dynamically allocate registers to hardware threads.

Figure 7:
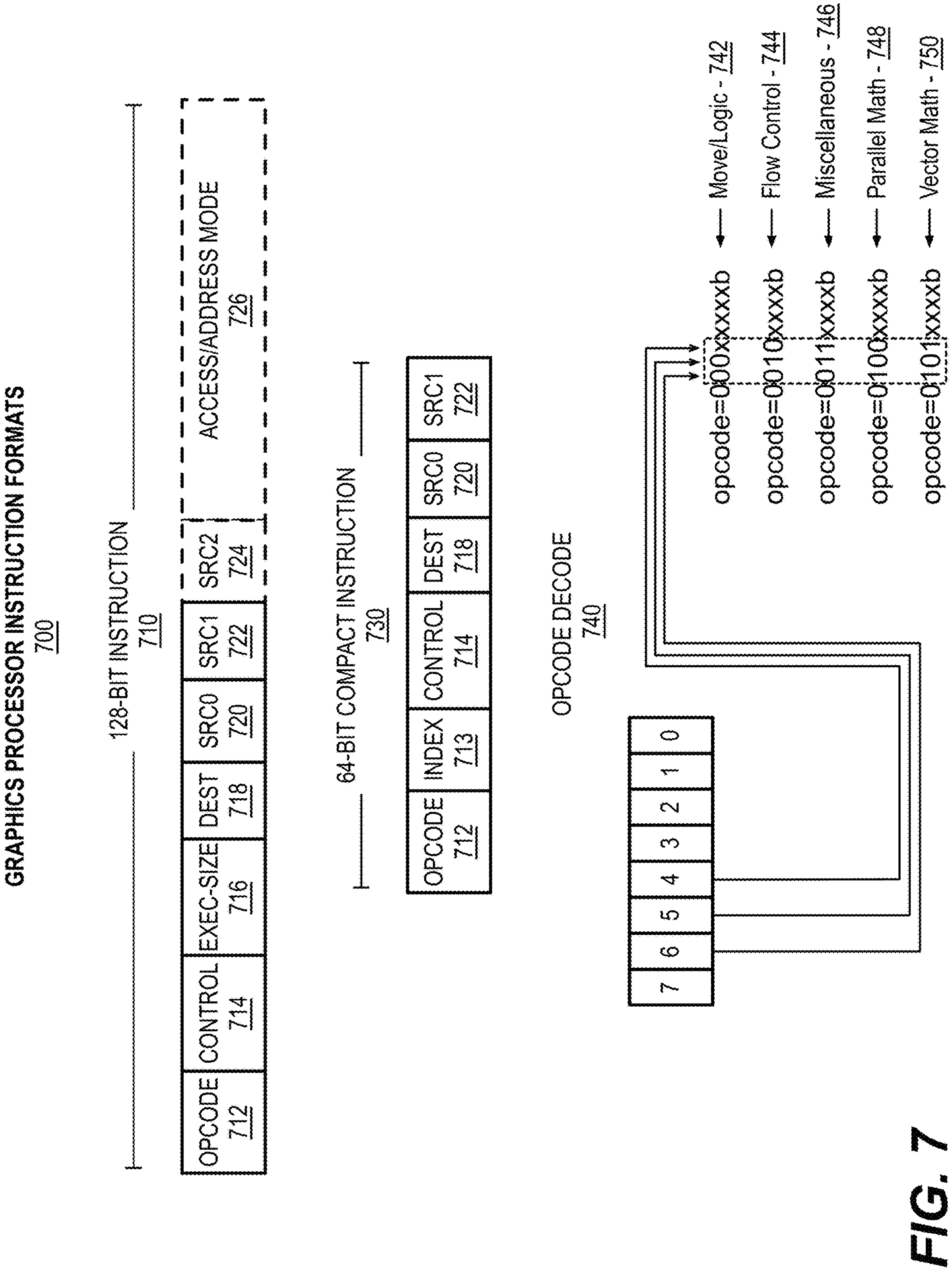
FIG. 7 is a block diagram illustrating graphics processor instruction formats, according to some embodiments.

FIG. 7 is a block diagram illustrating graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710. Other sizes and formats of instruction can be used.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments, instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands. The illustrated opcode decode 740, in one embodiment, can be used to determine which portion of an execution unit will be used to execute a decoded instruction. For example, some instructions may be designated as systolic instructions that will be performed by a systolic array. Other instructions, such as ray-tracing instructions (not shown) can be routed to a ray-tracing core or ray-tracing logic within a slice or partition of execution logic.

Graphics Pipeline

Figure 8:
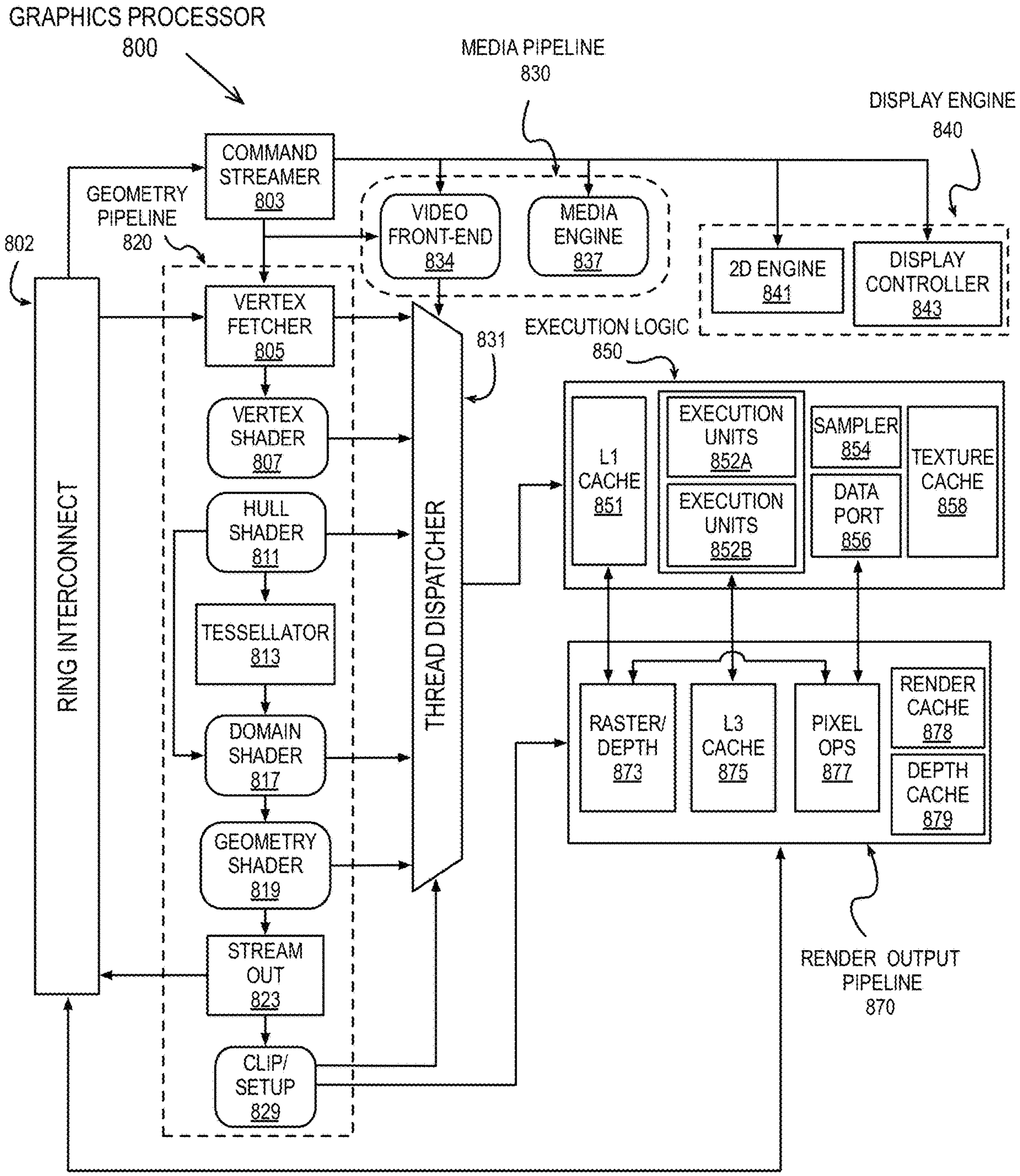
FIG. 8 is a block diagram of another embodiment of a graphics processor.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a geometry pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of the geometry pipeline 820 or the media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, geometry pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to geometry pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated logic units (e.g., L1 cache 851, sampler 854, texture cache 858, etc.) interconnect via a data port 856 to perform memory access and communicate with render output pipeline components of the processor. In some embodiments, sampler 854, caches 851, 858 and execution units 852A-852B each have separate memory access paths. In one embodiment the texture cache 858 can also be configured as a sampler cache.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front-end 834. In some embodiments, video front-end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, the geometry pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 9A:
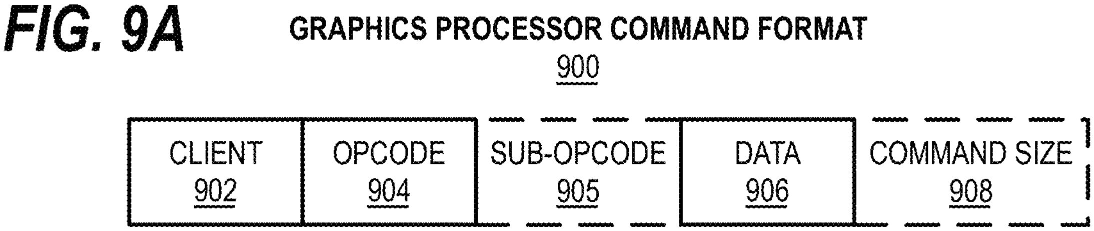
FIG. 9A is a block diagram illustrating a graphics processor command format, according to some embodiments.
Figure 9B:
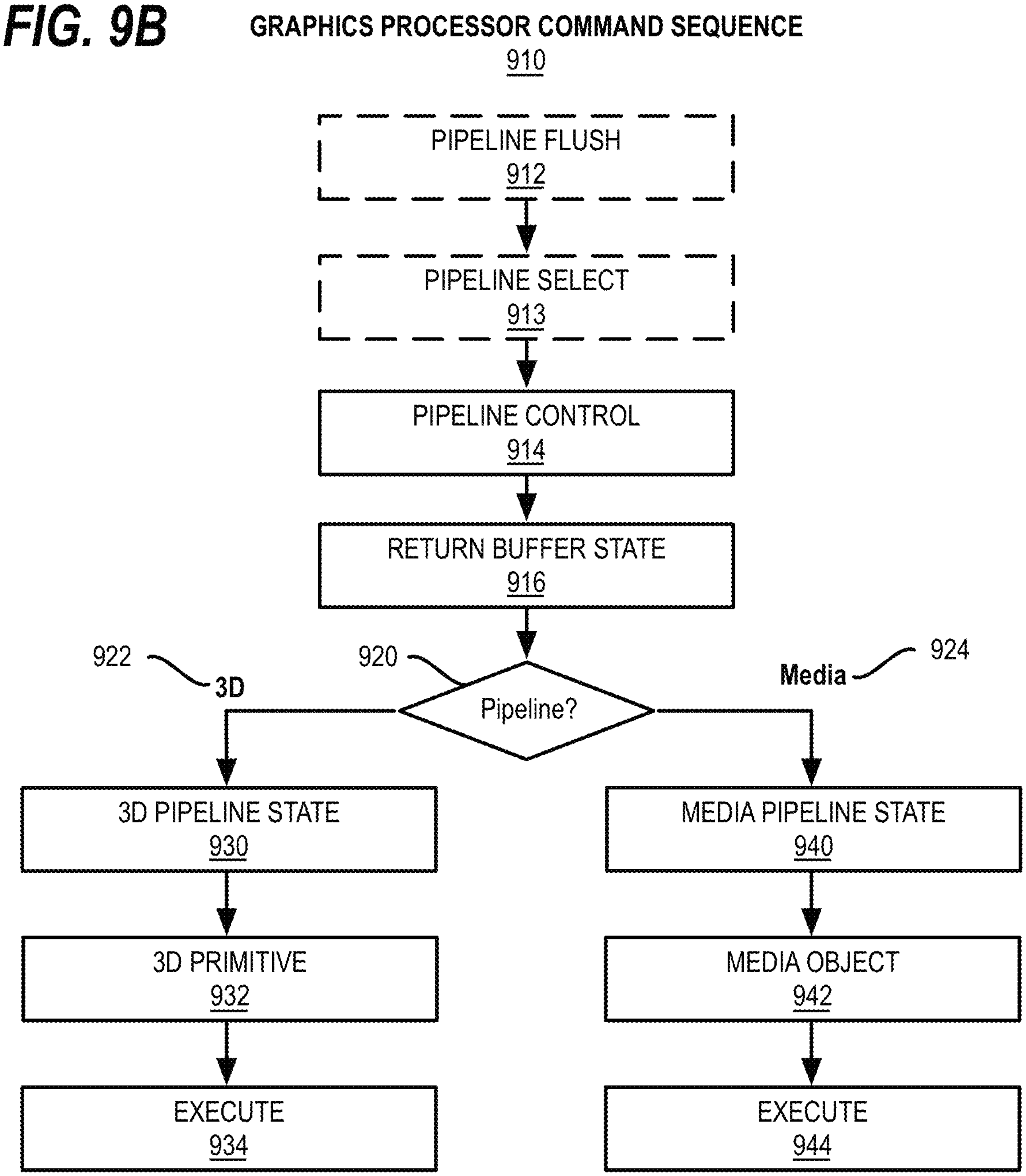
FIG. 9B is a block diagram illustrating a graphics processor command sequence, according to an embodiment.

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a client 902, a command operation code (opcode) 904, and data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments, commands are aligned via multiples of a double word. Other command formats can be used.

The flow diagram in FIG. 9B illustrates an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
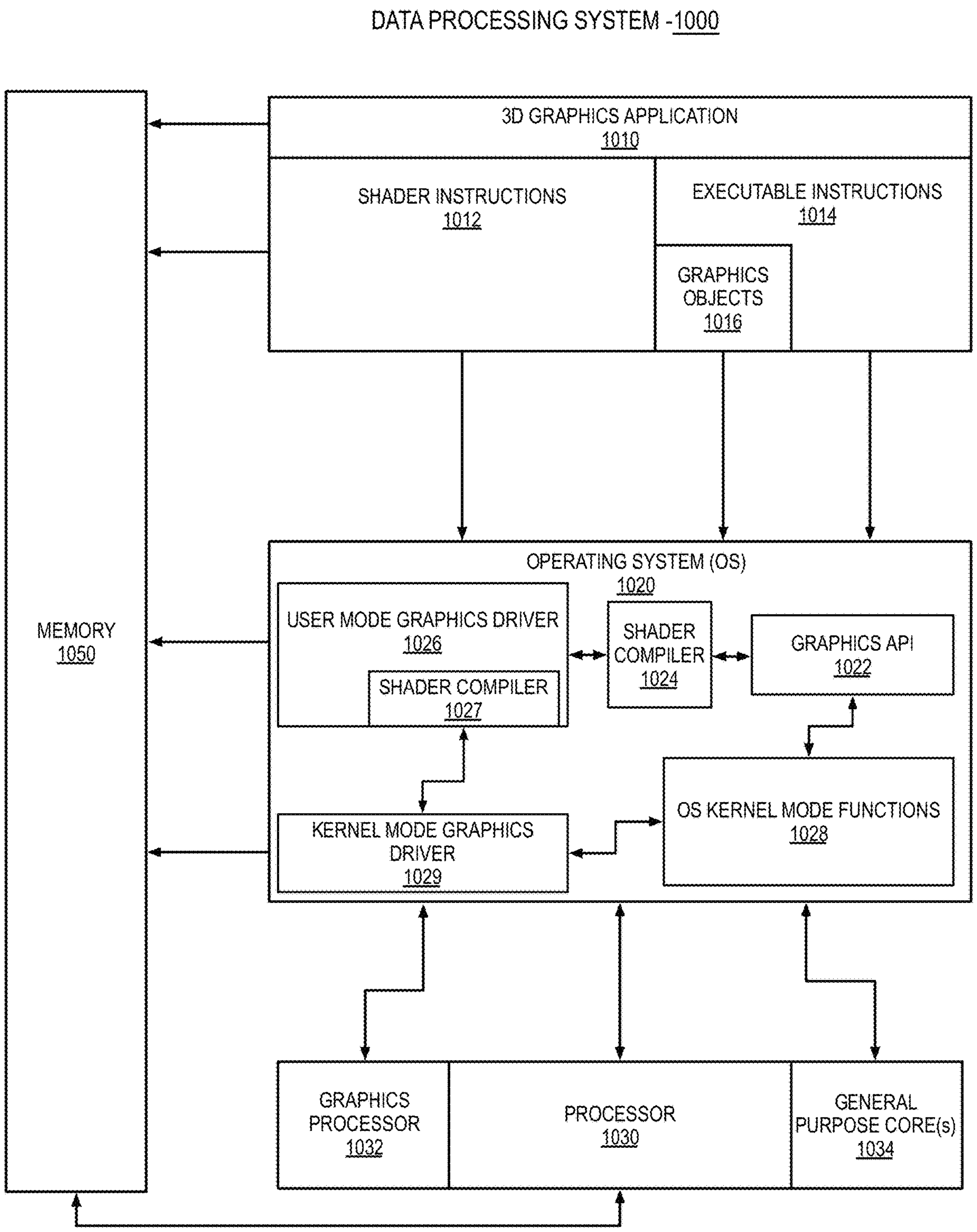
FIG. 10 illustrates an exemplary graphics software architecture for a data processing system, according to some embodiments.

FIG. 10 illustrates an exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High-Level Shader Language (HLSL) of Direct3D, the OpenGL Shader Language (GLSL), and so forth. The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11A:
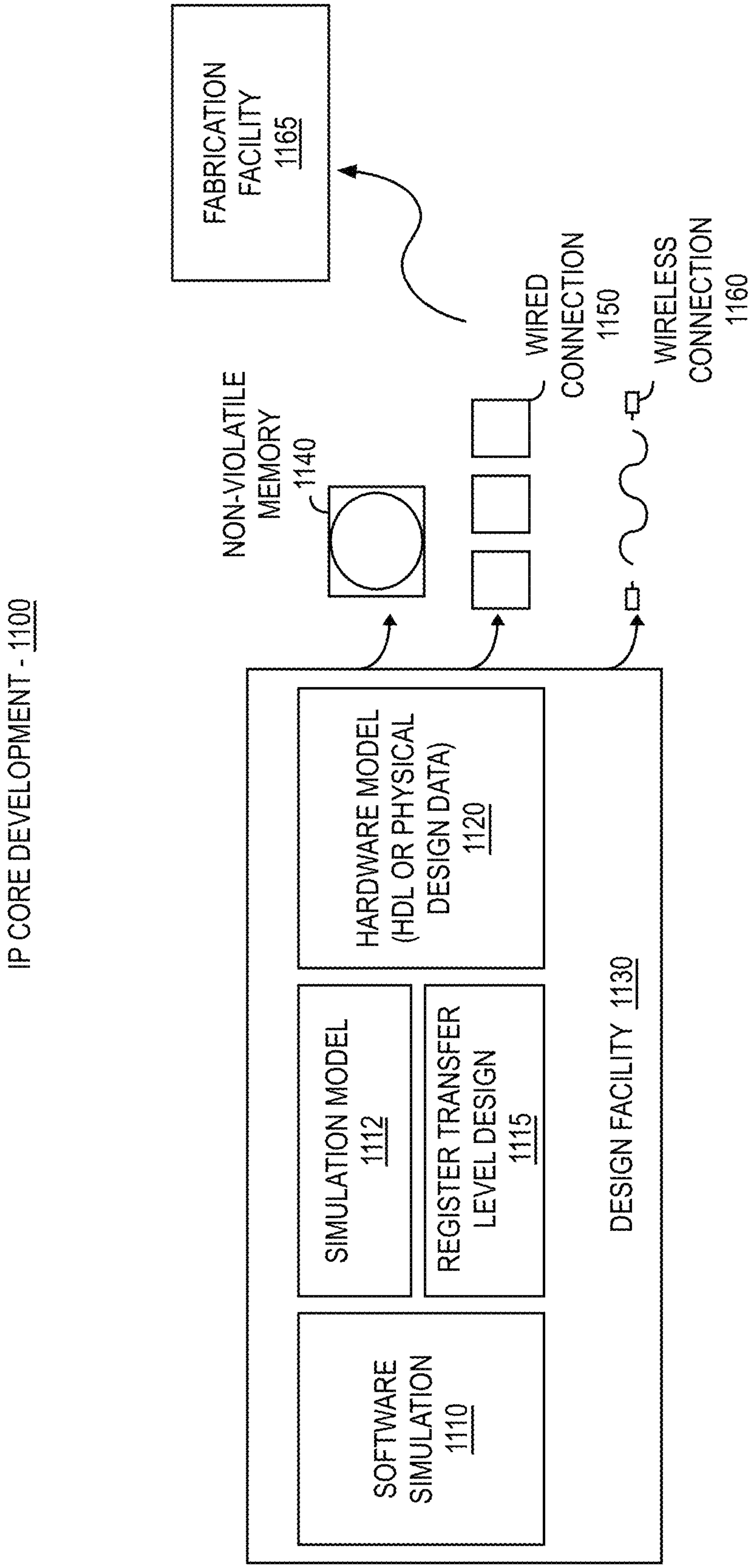
FIG. 11A is a block diagram illustrating an IP core development system that may be used to manufacture an integrated circuit to perform operations, according to an embodiment.

FIG. 11A is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high-level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 11B:
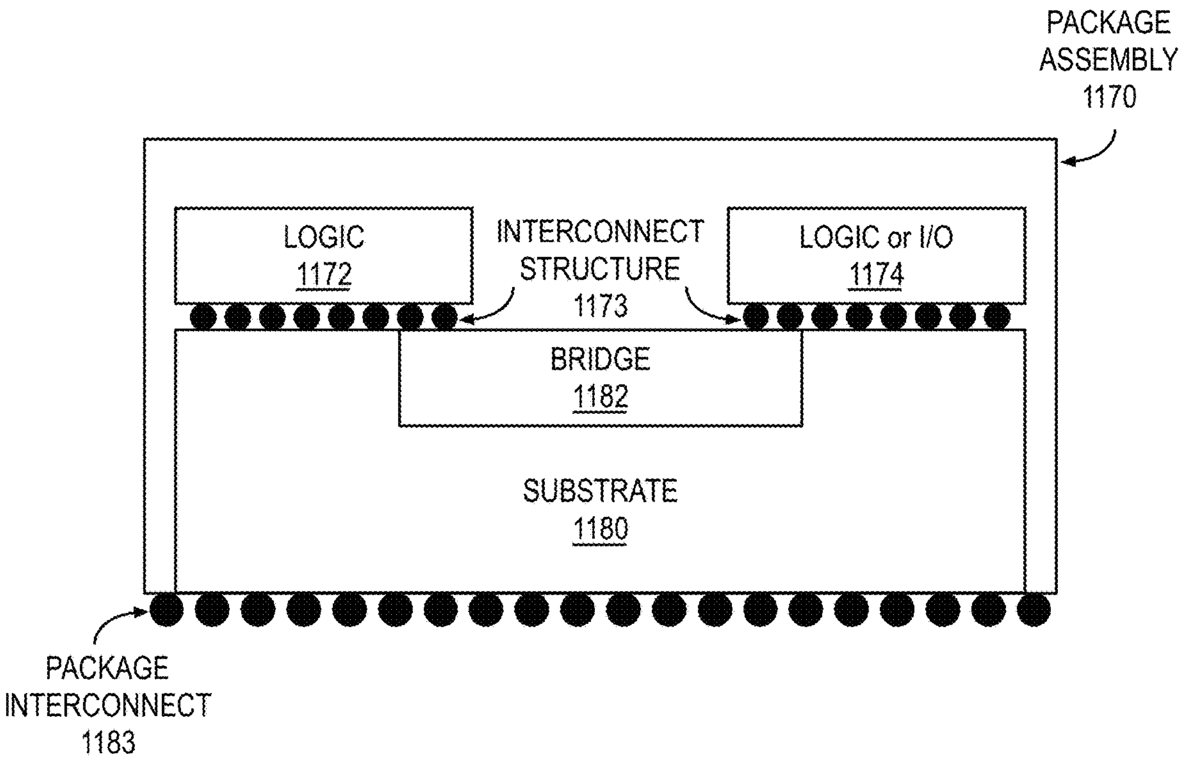
FIG. 11B illustrates a cross-section side view of an integrated circuit package assembly, according to some embodiments.

FIG. 11B illustrates a cross-section side view of an integrated circuit package assembly 1170, according to some embodiments described herein. The integrated circuit package assembly 1170 illustrates an implementation of one or more processor or accelerator devices as described herein. The package assembly 1170 includes multiple units of hardware logic 1172, 1174 connected to a substrate 1180. The logic 1172, 1174 may be implemented at least partly in configurable logic or fixed-functionality logic hardware, and can include one or more portions of any of the processor core(s), graphics processor(s), or other accelerator devices described herein. Each unit of logic 1172, 1174 can be implemented within a semiconductor die and coupled with the substrate 1180 via an interconnect structure 1173. The interconnect structure 1173 may be configured to route electrical signals between the logic 1172, 1174 and the substrate 1180, and can include interconnects such as, but not limited to bumps or pillars. In some embodiments, the interconnect structure 1173 may be configured to route electrical signals such as, for example, input/output (I/O) signals and/or power or ground signals associated with the operation of the logic 1172, 1174. In some embodiments, the substrate 1180 is an epoxy-based laminate substrate. The substrate 1180 may include other suitable types of substrates in other embodiments. The package assembly 1170 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, the units of logic 1172, 1174 are electrically coupled with a bridge 1182 that is configured to route electrical signals between the logic 1172, 1174. The bridge 1182 may be a dense interconnect structure that provides a route for electrical signals. The bridge 1182 may include a bridge substrate composed of glass or a suitable semiconductor material. Electrical routing features can be formed on the bridge substrate to provide a chip-to-chip connection between the logic 1172, 1174.

Although two units of logic 1172, 1174 and a bridge 1182 are illustrated, embodiments described herein may include more or fewer logic units on one or more dies. The one or more dies may be connected by zero or more bridges, as the bridge 1182 may be excluded when the logic is included on a single die. Alternatively, multiple dies or units of logic can be connected by one or more bridges. Additionally, multiple logic units, dies, and bridges can be connected together in other possible configurations, including three-dimensional configurations.

Figure 11C:
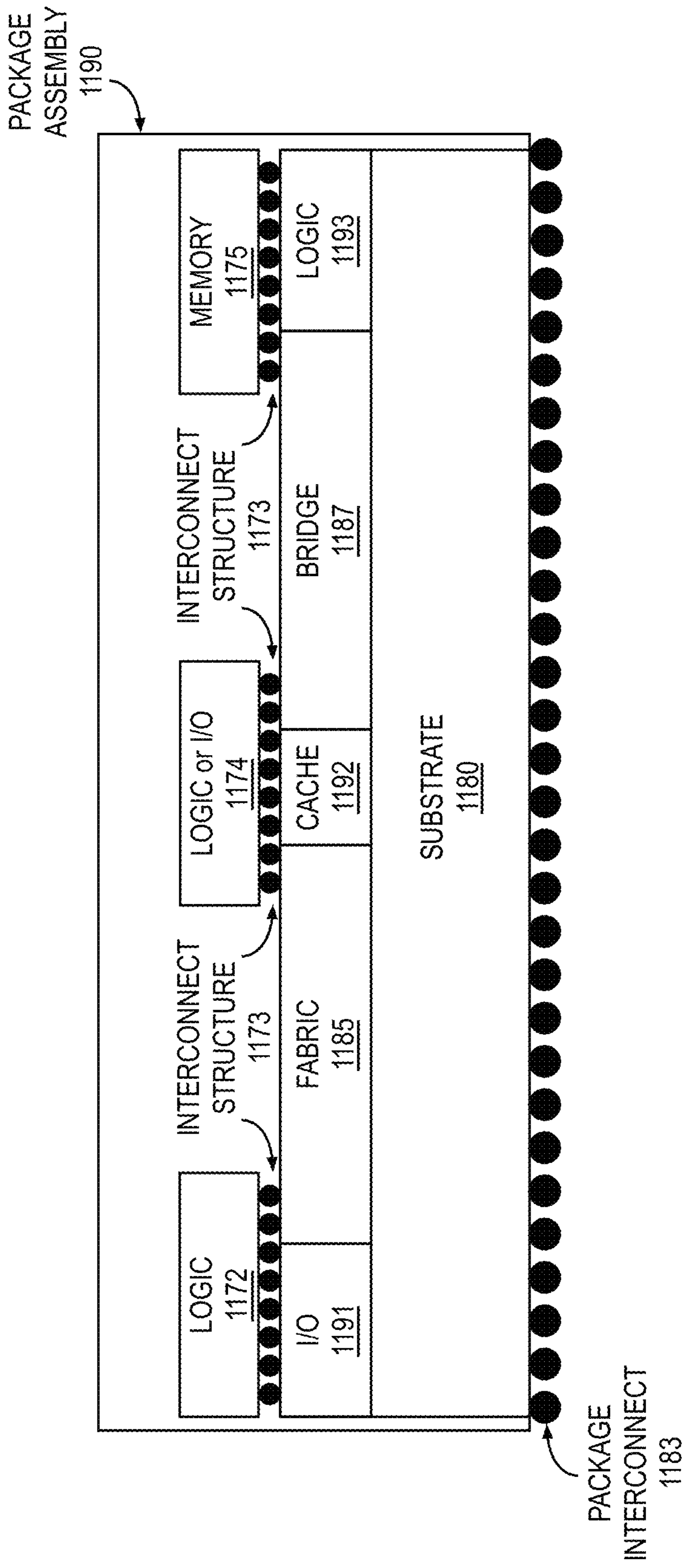
FIG. 11C illustrates a package assembly that includes multiple units of hardware logic chiplets connected to a substrate, according to an embodiment.

FIG. 11C illustrates a package assembly 1190 that includes multiple units of hardware logic chiplets connected to a substrate 1180 (e.g., base die). A graphics processing unit, parallel processor, and/or compute accelerator as described herein can be composed from diverse silicon chiplets that are separately manufactured. In this context, a chiplet is an at least partially packaged integrated circuit that includes distinct units of logic that can be assembled with other chiplets into a larger package. A diverse set of chiplets with different IP core logic can be assembled into a single device. In addition, the chiplets can be integrated into a base die or base chiplet using active interposer technology. The concepts described herein enable the interconnection and communication between the different forms of IP within the GPU. IP cores can be manufactured using different process technologies and composed during manufacturing, which avoids the complexity of converging multiple IPs, especially on a large SoC with several flavors IPs, to the same manufacturing process. Enabling the use of multiple process technologies improves the time to market and provides a cost-effective way to create multiple product SKUs. Additionally, the disaggregated IPs are more amenable to being power gated independently, components that are not in use on a given workload can be powered off, reducing overall power consumption.

The hardware logic chiplets can include special purpose hardware logic chiplets 1172, logic or I/O chiplets 1174, and/or memory chiplets 1175. The hardware logic chiplets 1172 and logic or I/O chiplets 1174 may be implemented at least partly in configurable logic or fixed-functionality logic hardware and can include one or more portions of any of the processor core(s), graphics processor(s), parallel processors, or other accelerator devices described herein. The memory chiplets 1175 can be DRAM (e.g., GDDR, HBM) memory or cache (SRAM) memory.

Each chiplet can be fabricated as separate semiconductor die and coupled with the substrate 1180 via an interconnect structure 1173. The interconnect structure 1173 may be configured to route electrical signals between the various chiplets and logic within the substrate 1180. The interconnect structure 1173 can include interconnects such as, but not limited to bumps or pillars. In some embodiments, the interconnect structure 1173 may be configured to route electrical signals such as, for example, input/output (I/O) signals and/or power or ground signals associated with the operation of the logic, I/O and memory chiplets.

In some embodiments, the substrate 1180 is an epoxy-based laminate substrate. The substrate 1180 may include other suitable types of substrates in other embodiments. The package assembly 1190 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, a logic or I/O chiplet 1174 and a memory chiplet 1175 can be electrically coupled via a bridge 1187 that is configured to route electrical signals between the logic or I/O chiplet 1174 and a memory chiplet 1175. The bridge 1187 may be a dense interconnect structure that provides a route for electrical signals. The bridge 1187 may include a bridge substrate composed of glass or a suitable semiconductor material. Electrical routing features can be formed on the bridge substrate to provide a chip-to-chip connection between the logic or I/O chiplet 1174 and a memory chiplet 1175. The bridge 1187 may also be referred to as a silicon bridge or an interconnect bridge. For example, the bridge 1187, in some embodiments, is an Embedded Multi-die Interconnect Bridge (EMIB). In some embodiments, the bridge 1187 may simply be a direct connection from one chiplet to another chiplet.

The substrate 1180 can include hardware components for I/O 1191, cache memory 1192, and other hardware logic 1193. A fabric 1185 can be embedded in the substrate 1180 to enable communication between the various logic chiplets and the logic 1191, 1193 within the substrate 1180. In one embodiment, the I/O 1191, fabric 1185, cache, bridge, and other hardware logic 1193 can be integrated into a base die that is layered on top of the substrate 1180.

In various embodiments a package assembly 1190 can include fewer or greater number of components and chiplets that are interconnected by a fabric 1185 or one or more bridges 1187. The chiplets within the package assembly 1190 may be arranged in a 3D or 2.5D arrangement. In general, bridge structures 1187 may be used to facilitate a point to point interconnect between, for example, logic or I/O chiplets and memory chiplets. The fabric 1185 can be used to interconnect the various logic and/or I/O chiplets (e.g., chiplets 1172, 1174, 1191, 1193). with other logic and/or I/O chiplets. In one embodiment, the cache memory 1192 within the substrate can act as a global cache for the package assembly 1190, part of a distributed global cache, or as a dedicated cache for the fabric 1185.

Figure 11D:
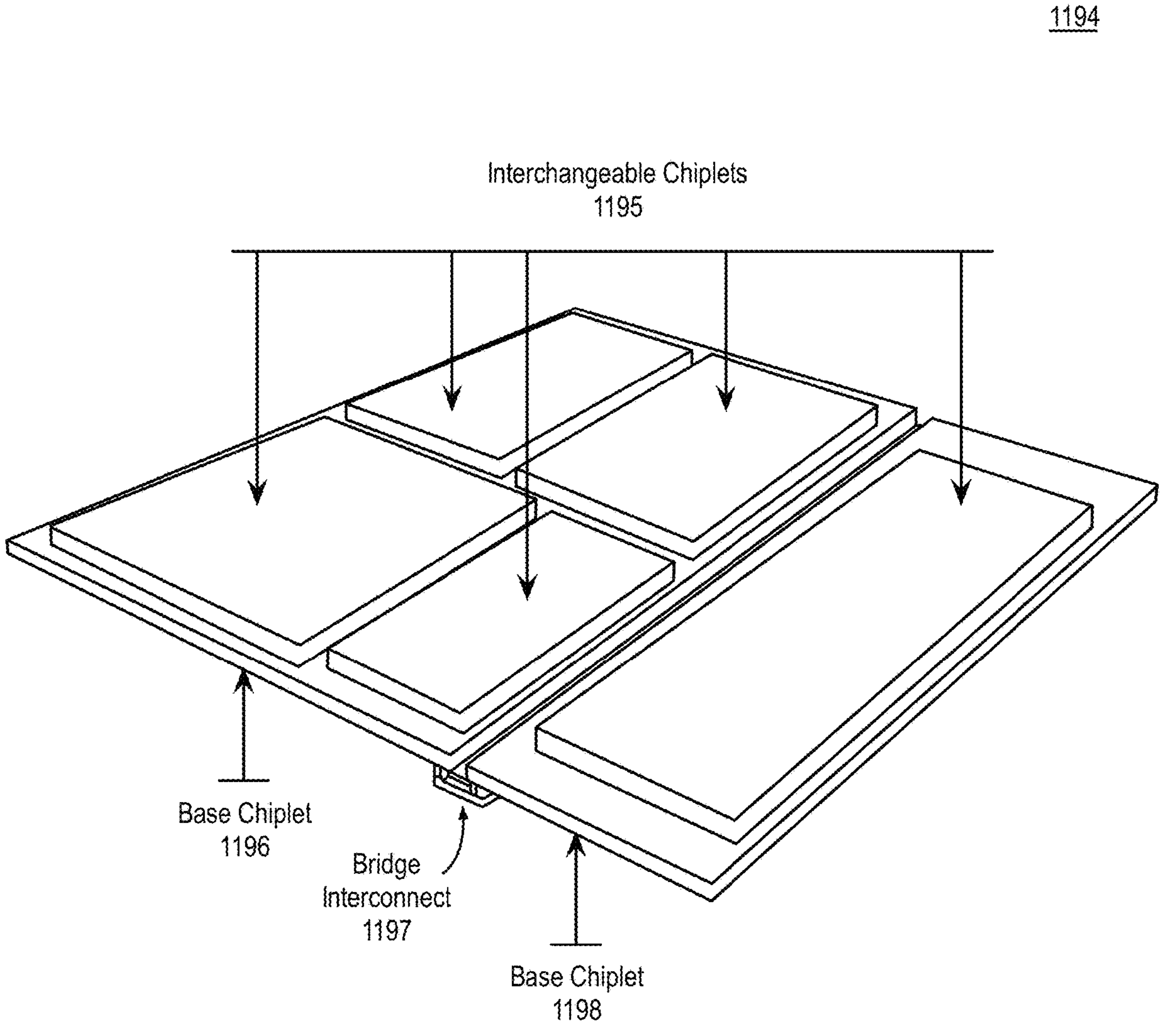
FIG. 11D illustrates a package assembly including interchangeable chiplets, according to an embodiment.

FIG. 11D illustrates a package assembly 1194 including interchangeable chiplets 1195, according to an embodiment. The interchangeable chiplets 1195 can be assembled into standardized slots on one or more base chiplets 1196, 1198. The base chiplets 1196, 1198 can be coupled via a bridge interconnect 1197, which can be similar to the other bridge interconnects described herein and may be, for example, an EMIB. Memory chiplets can also be connected to logic or I/O chiplets via a bridge interconnect. I/O and logic chiplets can communicate via an interconnect fabric. The base chiplets can each support one or more slots in a standardized format for one of logic or I/O or memory/cache.

In one embodiment, SRAM and power delivery circuits can be fabricated into one or more of the base chiplets 1196, 1198, which can be fabricated using a different process technology relative to the interchangeable chiplets 1195 that are stacked on top of the base chiplets. For example, the base chiplets 1196, 1198 can be fabricated using a larger process technology, while the interchangeable chiplets can be manufactured using a smaller process technology. One or more of the interchangeable chiplets 1195 may be memory (e.g., DRAM) chiplets. Different memory densities can be selected for the package assembly 1194 based on the power, and/or performance targeted for the product that uses the package assembly 1194. Additionally, logic chiplets with a different number of type of functional units can be selected at time of assembly based on the power, and/or performance targeted for the product. Additionally, chiplets containing IP logic cores of differing types can be inserted into the interchangeable chiplet slots, enabling hybrid processor designs that can mix and match different technology IP blocks.

Exemplary System on a Chip Integrated Circuit

Figure 12:
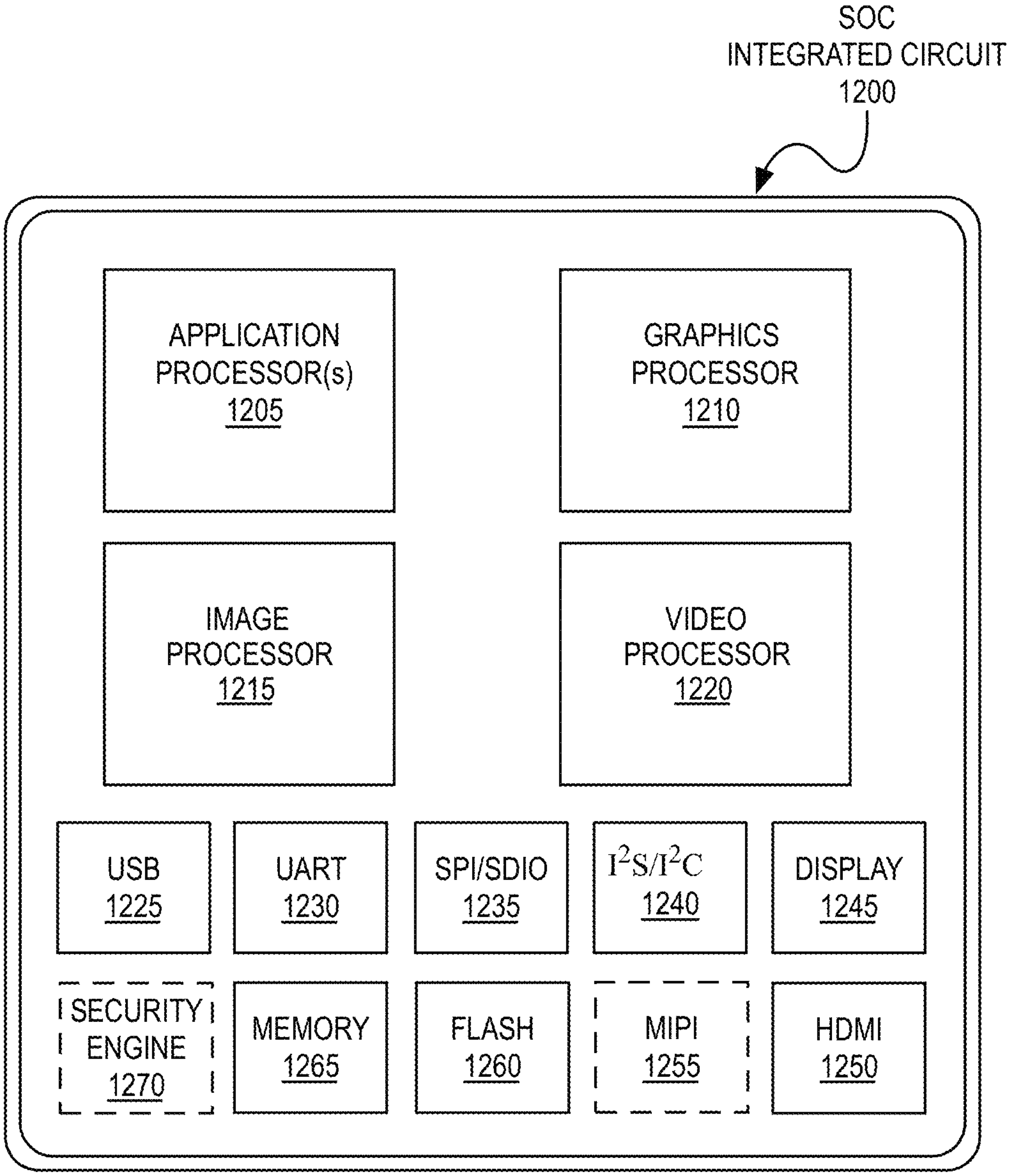
FIG. 12 is a block diagram illustrating an exemplary system on a chip integrated circuit that may be fabricated using one or more IP cores, according to an embodiment.

FIGS. 12-13 illustrate exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an $I^2S/I^2C$ controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Figure 13A:
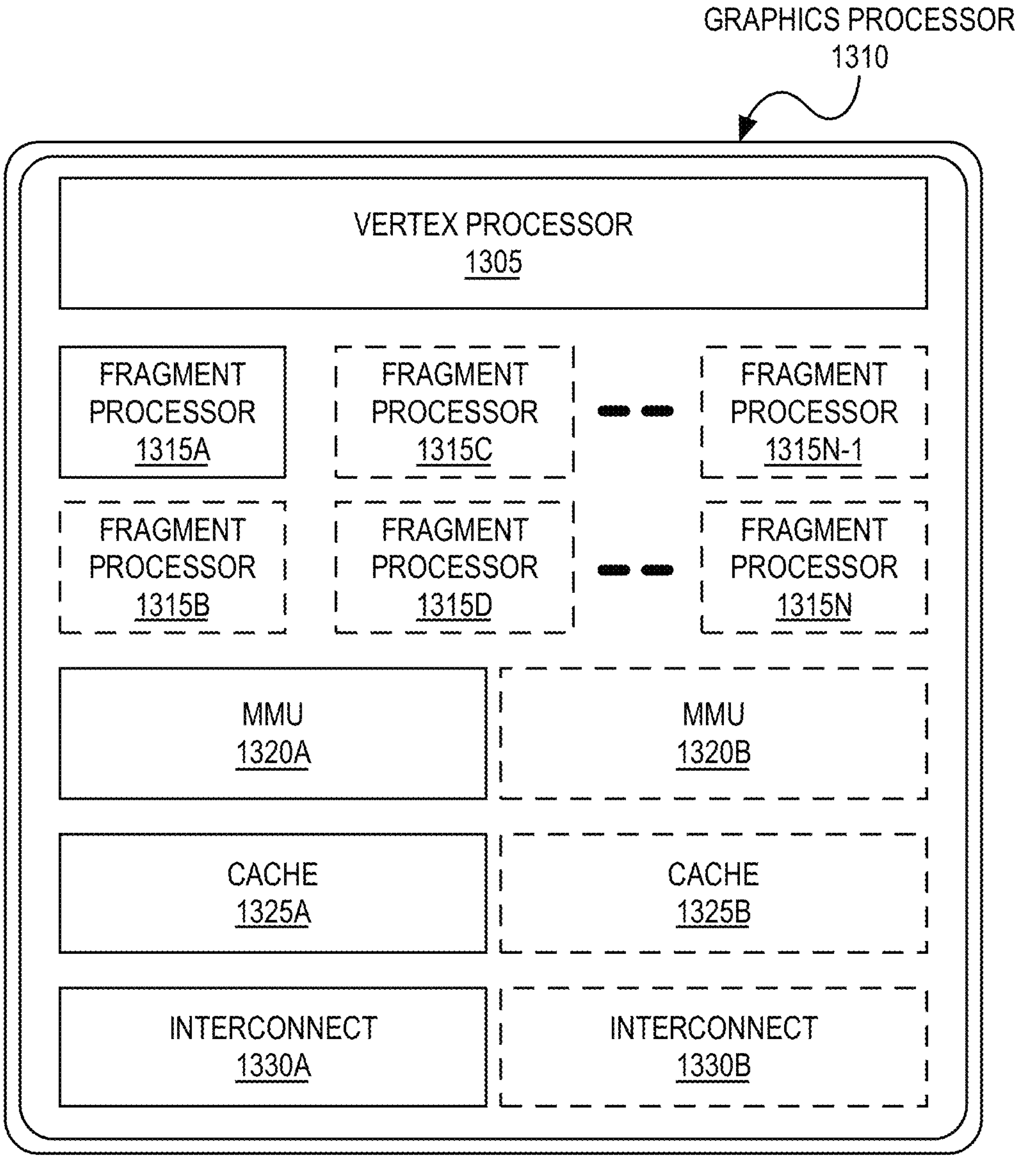
FIGS. 13A-13B are block diagrams illustrating exemplary graphics processors for use within an SoC, according to some embodiments.
Figure 13B:
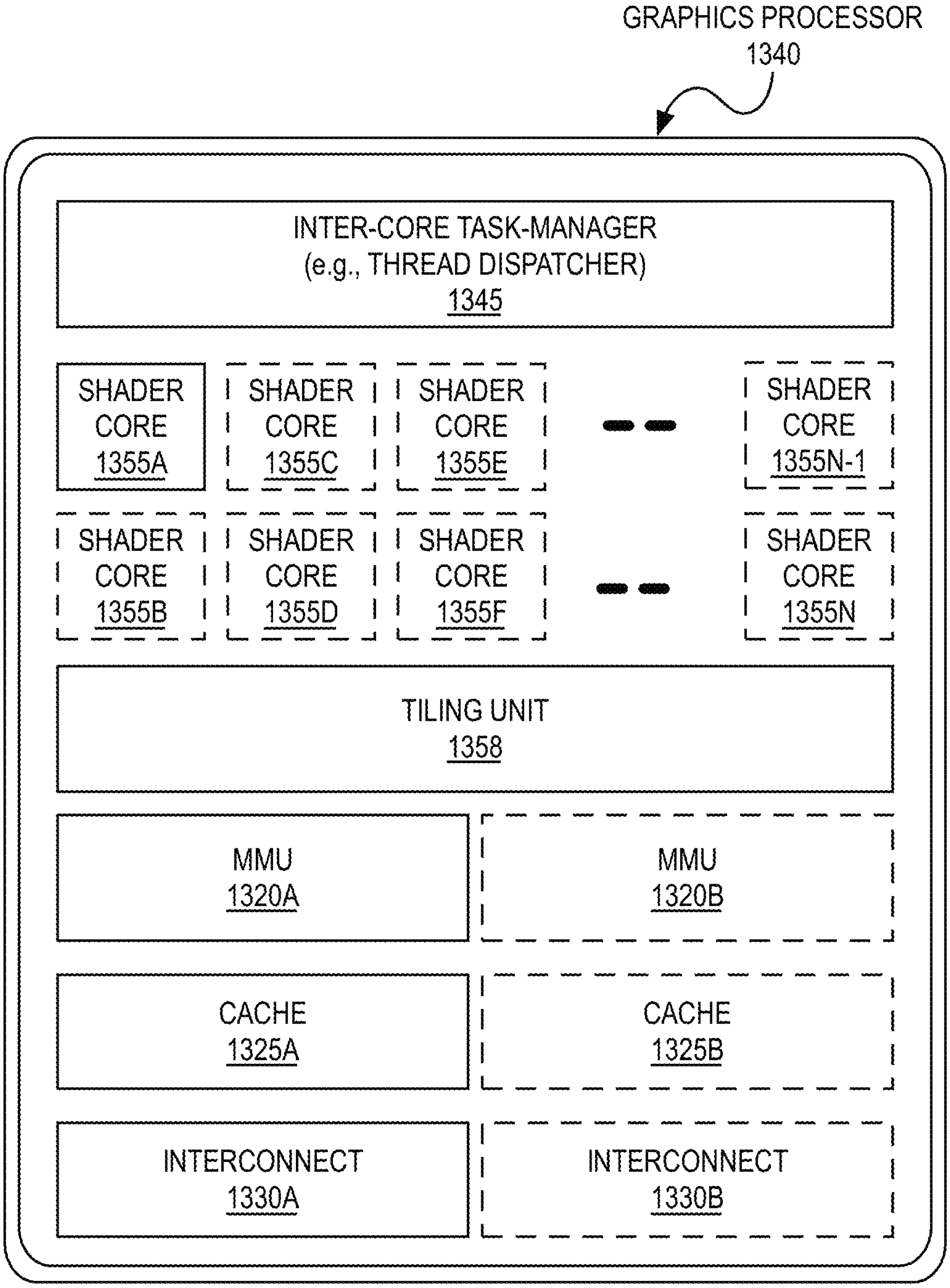

FIGS. 13A-13B are block diagrams illustrating exemplary graphics processors for use within an SoC, according to embodiments described herein. FIG. 13A illustrates an exemplary graphics processor 1310 of a system on a chip integrated circuit that may be fabricated using one or more IP cores, according to an embodiment. FIG. 13B illustrates an additional exemplary graphics processor 1340 of a system on a chip integrated circuit that may be fabricated using one or more IP cores, according to an embodiment. Graphics processor 1310 of FIG. 13A is an example of a low power graphics processor core. Graphics processor 1340 of FIG. 13B is an example of a higher performance graphics processor core. Each of the graphics processors 1310, 1340 can be variants of the graphics processor 1210 of FIG. 12.

As shown in FIG. 13A, graphics processor 1310 includes a vertex processor 1305 and one or more fragment processor(s) 1315A-1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for the graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

As shown FIG. 13B, graphics processor 1340 includes the one or more MMU(s) 1320A-1320B, cache(s) 1325A-1325B, and circuit interconnect(s) 1330A-1330B of the graphics processor 1310 of FIG. 13A. Graphics processor 1340 includes one or more shader core(s) 1355A-1355N (e.g., 1455A, 1355B, 1355C, 1355D, 1355E, 1355F, through 1355N-1, and 1355N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1340 includes an inter-core task manager 1345, which acts as a thread dispatcher to dispatch execution threads to one or more shader cores 1355A-1355N and a tiling unit 1358 to accelerate tiling operations for tile-based rendering, in which rendering operations for a scene are subdivided in image space, for example to exploit local spatial coherence within a scene or to optimize use of internal caches.

An Instruction for Performing a Vector Normalization Operation

Rather than requiring multiple types of ISA instructions to perform a vector normalization operation, in embodiments described herein, a new vector normalization instruction is proposed to be introduced as a new ISA instruction (e.g., VNM <First Input Register> <First Output Register>). In this manner, the various operations into which the VNM instruction is decomposed or otherwise represented internally by the graphics hardware and execution of same can be optimized as described further below.

Figure 14:
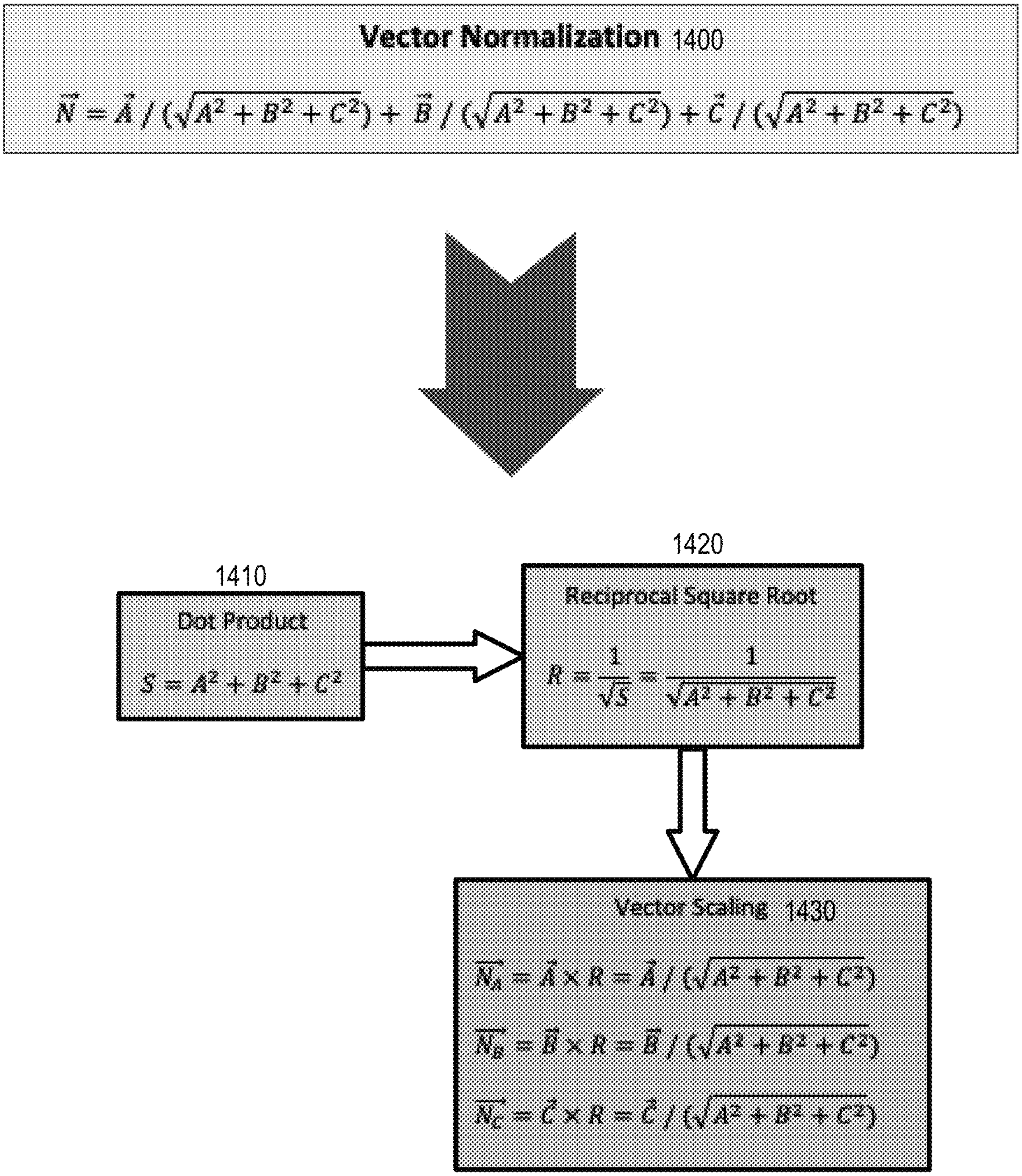
FIG. 14 conceptually illustrates the three steps involved in performing a vector normalization operation.

FIG. 14 conceptually illustrates the three steps involved in performing a vector normalization operation 1400. The normalized vector $\vec{N}$ of a vector $\vec{V}$ is a vector in the same direction, but with norm (length) 1. Assuming V is a three-component vector, having component vectors $\vec{A}$, $\vec{B}$ and $\vec{C}$, where $\vec{A}$, $\vec{B}$, and $\vec{C}$ are orthogonal component vectors in x, y, and z directions, and $\vec{V}=\vec{A}+\vec{B}+\vec{C}$, then $\vec{N}$ can be expressed as:

$$\vec{N}=\vec{A}/(\sqrt{A^2+B^2+C^2})+\vec{B}/((\sqrt{A^2+B^2+C^2}))+\vec{C}/((\sqrt{A^2+B^2+C^2})$$

As illustrated in FIG. 14, the three steps for performing a vector normalization operation include (i) performing a dot product (1410) of the component vectors, (ii) performing a reciprocal square root (1420) of the sum of dot products of the component vectors and (iii) vector scaling (1430)—multiplication of the component vectors with the reciprocal square root calculated in step (ii).

As described further below with reference to FIG. 16, one current hardware implementation for calculating S (i.e., the square of the vector length) involves using an 8-wide Single Instruction Multiple Data (SIMD) multiply instruction (e.g., SIMD8 MUL) to calculate $D=A^2$ and two SIMD8 multiply add instructions (i.e., SIMD8 MAD) to calculate $E=D+B^2$ and then, $S=E+C^2$.

Shader Unit

Figure 15:
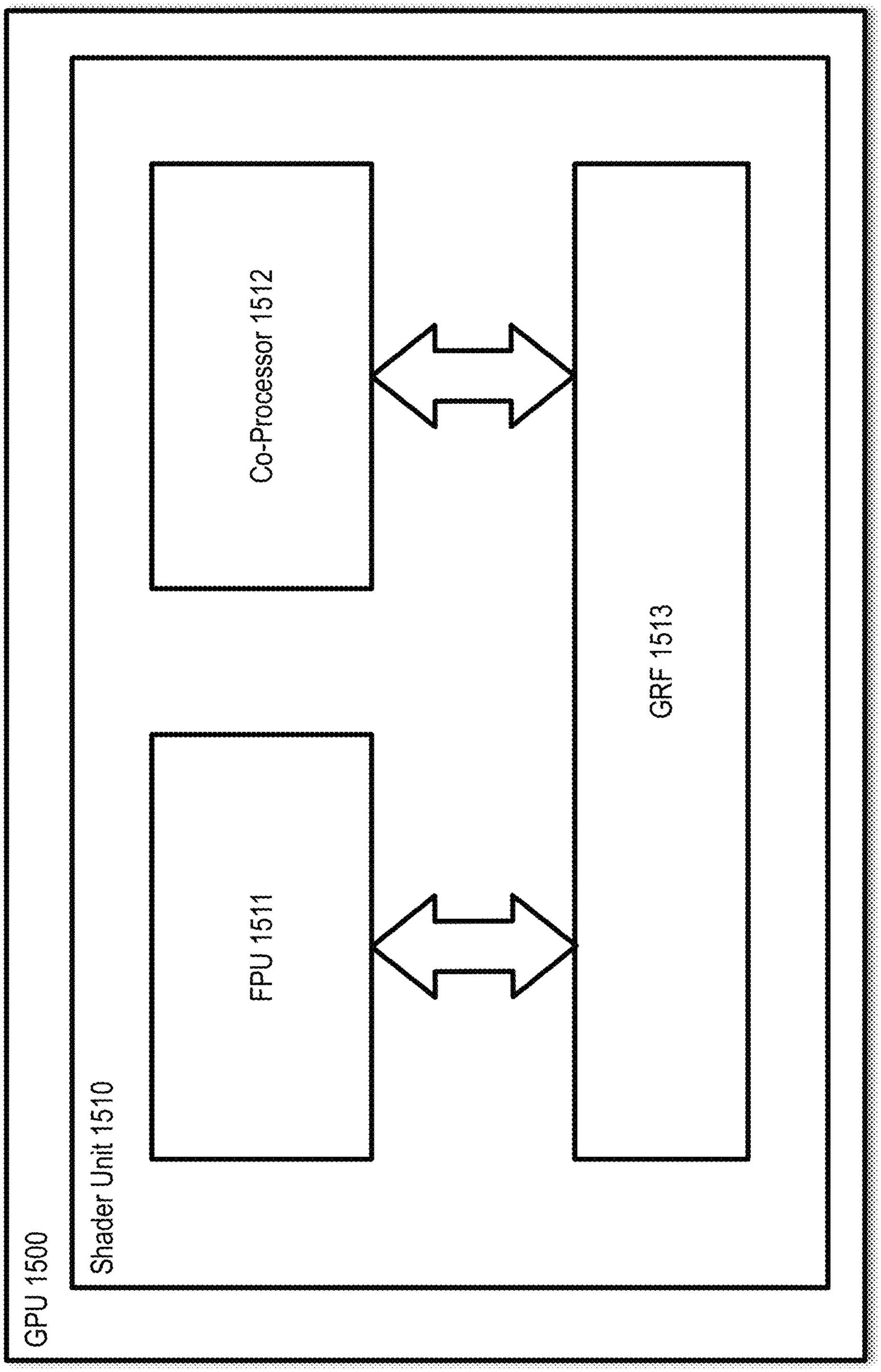
FIG. 15 is a block diagram illustrating a high-level and simplified view of a shader unit of a GPU according to an embodiment.

FIG. 15 is a block diagram illustrating a high-level and simplified view of a shader unit 1510 of a GPU 1500 according to an embodiment. In the context of various examples described herein, shader units (also referred to herein as execution units or EUs), such as shader unit 1510, in the GPU 1500 are implemented as multi-threaded SIMD processor units. Typically, each of the shader units include, among other shader unit function, at least two processing units (e.g., a floating point unit (FPU) 1511 Arithmetic Logic Unit (ALU) and a co-processor 1512) to execute extended mathematical operations (such as, transcendental operations like sine, cosine, square root, reciprocal square root, inverse/reciprocal, base 2 logarithm, base 2 exponent, power, and the like), a thread arbiter unit (not shown) and a general register file (GRF) 1513 per each thread. According to one embodiment, the FPU 1511 is a SIMD8 FPU and the co-processor 1512 is a SIMD2 execution unit.

Figure 16:
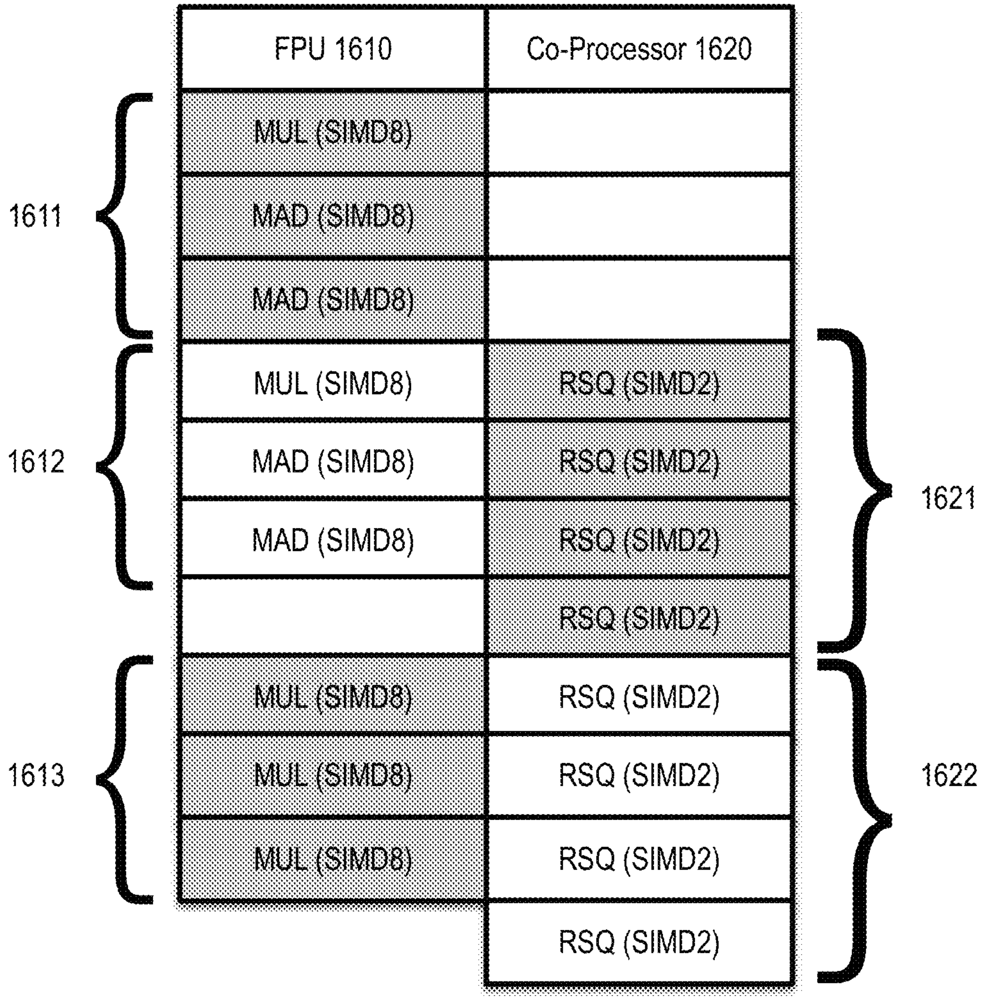
FIG. 16 demonstrates the throughput of a vector normalization operation using MUL, MAD and RSQ instructions.

FIG. 16 demonstrates the throughput of a vector normalization operation using MUL, MAD and RSQ instructions. Existing GPUs use multiple instructions to process shader code. For example, as noted above, vector normalization, which is frequently used in a number of 3D games and graphics applications for various scenarios, is represented in graphics APIs by one or more operations, but is translated by a compiler into a series of instructions supported by the ISA representing an abstract model of the underlying computer architecture. Herein, for purposes of evaluating the performance improvement of the new proposed single ISA vector normalization instruction, throughput in terms of instructions per clock (IPC) will be compared to an ISA in which vector normalization is represented in the following seven instructions:

Dot product (SIMD8): MUL, MAD, MAD;
Reciprocal square root (SIMD8): MATH;
Vector scaling (SIMD8): MUL, MUL, MUL.

In the context of the present example, a SIMD8 FPU 1610 and a SIMD2 co-processor 1620 are shown side-by-side executing the above seven instructions to perform a vector normalization operation on eight vectors with each block representing one clock cycle. In this example, the gray colored blocks are associated with one thread and the unfilled blocks are associated with another thread. A 3-component SIMD8 dot product operation 1611 for a first thread is represented by a SIMD8 MUL, a SIMD8 MAD, and a SIMD8 MAD executed on the FPU 1610. Once the results (the eight squared vector lengths) of the dot product operation 1611 are available, a 3-component SIMD8 reciprocal square root MATH/RSQRT (or RSQ) operation 1621, represented by four back-to-back SIMD2 RSQ operations, is executed on the co-processor 1620 to get SIMD8 throughput. Once the results of the MATH/RSQRT operation 1621 are available, they are used by a vector scaling operation 1613 performed on the FPU 1610, by executing three SIMD8 MUL operations. While the MATH/RSQRT operation 1621 is being performed by co-processor 1620, a 3-component SIMD8 dot product operation 1612, for another thread to compute squared vector lengths for the next eight vectors to be normalized, can be launched in parallel on the FPU 1610. Similarly, while the vector scaling operation 1613 is being executed on the FPU 1610, another set of RSQ instructions (from the other thread) can be launched on the co-processor 1620 in parallel to perform a MATH/RSQRT operation 1622 on the results from the corresponding dot product operation 1612.

Based on the foregoing, the FPU 1610 takes six clocks and the co-processor 1620 takes 4 clocks to compute a SIMD8 vector normalization operation. So, from a throughput perspective, the FPU 1610 is the limiter as it takes more clocks. Hence, the throughput (or IPC) of the above-described vector normalization operation implementation is one SIMD8 vector normalization instruction in six clocks or an IPC of 0.167.

Optimized Computation of $S=A^2+B^2+C^2$

According to one embodiment, computation of S (square of vector length) is improved by implementation of a 3-component dot product S, as part of the new vector normalization instruction. In this context, since vector normalization is being considered as a single instruction, three multipliers can be used in parallel and then a three-input adder can be used for summing up the results of the three multiplications. In view of area and power considerations, as described further below with reference to FIGS. 19 and 20, in one embodiment, this 3-component dot product operation (DP3) is performed as a SIMD2 operation in the execution pipeline of the GPU hardware and repeated four times to achieve SIMD8 results in contrast to the implementation described above using one SIMD8 MUL and two SIMD8 MAD operations. In one embodiment, the SIMD2 DP3 operations are performed using a particular register layout from which the two-sets of input component vectors of the two vectors to be processed in parallel are read and to which two outputs (the respective squared vector lengths) are output as described further below with reference to FIG. 17.

Depending upon the particular implementation, further optimization can be achieved for the multipliers since the multiplication is limited to a squaring operation. See, e.g., the specialized squaring unit described in section 2.2 of in *High-Speed Inverse Square Roots by Michael J. Schulte et al. in ARITH '99 Proceedings of the* 14*th IEEE Symposium on Computer Arithmetic.*

Register Layout

Figure 17:
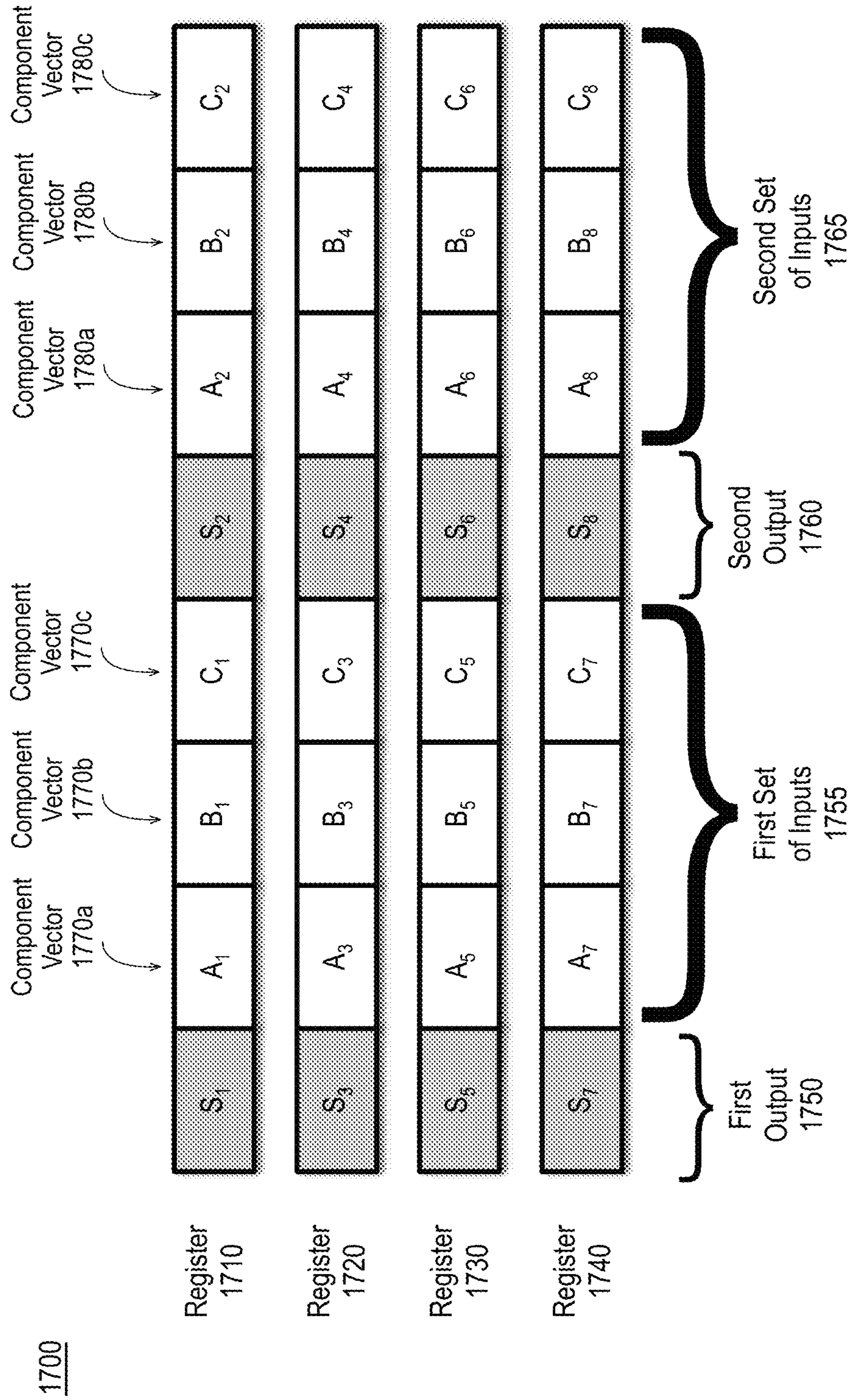
FIG. 17 illustrates a register layout for storing two sets of inputs and two outputs for a SIMD2 DP3 operation in four registers to accomplish a SIMD8 DP3 operation according to an embodiment.

FIG. 17 illustrates a register layout 1700 for storing two sets of inputs 1755 and 1765 and two outputs 1750 and 1760 for a SIMD2 DP3 operation in four registers 1710, 1720, 1730 and 1740 to accomplish a SIMD8 DP3 operation according to an embodiment. In the context of the present example, at least one novel feature is the use of registers 1710, 1720, 1730 and 1740 to store inputs for respective SIMD2 DP3 operations as well as outputs to store results of the respective SIMD2 DP3 operations.

According to an embodiment, S (the squared vector length) can be computed as a 3-component dot product SIMD2 instruction on a SIMD8 FPU unit by repeating the operation four times as described further below with reference to FIG. 20, with register layout 1700. In the context of the present example, each register 1710, 1720, 1730 and 1740 can contain two sets of inputs (i.e., the first set of inputs 1755 and the second set of inputs 1765) representing respective component vectors 1770*a-c* and 1780*a-c* of two different vectors to compute the 3-component dot product (DP3) $S=A^2+B^2+C^2$. For example, a 256-bit register can contain two sets (SIMD2) of 32-bit floating point A, B, C component vector values, which will occupy 192 bits of the 256-bit register. The remaining 64 bits are initially unutilized while taking the input to compute S using DP3 operation, but may be used to store the outputs (i.e., first output 1750 and second output 1760) of the DP3 operation.

In the context of the present example, four such 256-bit registers (e.g., registers 1710, 1720, 1730 and 1740) can be used as input for four SIMD2 DP3 instructions. The result of the operation S can be written to the same 256-bit register in the 64-bit portion as a SIMD2 value (e.g., two sets of 32-bit floating point values representing the first output 1750 and the second output 1760), which was not utilized while receiving the inputs to the DP3 operation. As such, the 64-bit portions (e.g., the first output 1750 and the second output 1760) of the four 256-bit registers can be used to store the output of four SIMD2 DP3 operations, which are used to compute a SIMD8 S.

While in the context of the current example, specific register sizes and input and output sizes are specified to provide a concrete example of a particular implementation that supports vector normalization of eight vectors at a time, those skilled in the art will appreciate the sizes can be increased or decreased to accommodate additional more or fewer vectors and/or lesser precision requirements. Similarly, more or fewer sets of inputs, outputs and registers may be used and the ordering and positioning of the data in the registers may be other than that illustrated. For example, a SIMD16 vector normalization operation can be supported by using eight registers and performing eight back-to-back SIMD2 DP3 instructions, by using four registers (containing four sets of component vector inputs) and performing four back-to-back SIMD4 DP3 instructions or by using two registers (containing eight sets of component vector inputs) and performing two back-to-back SIMD8 DP3 instructions.

Figure 18:
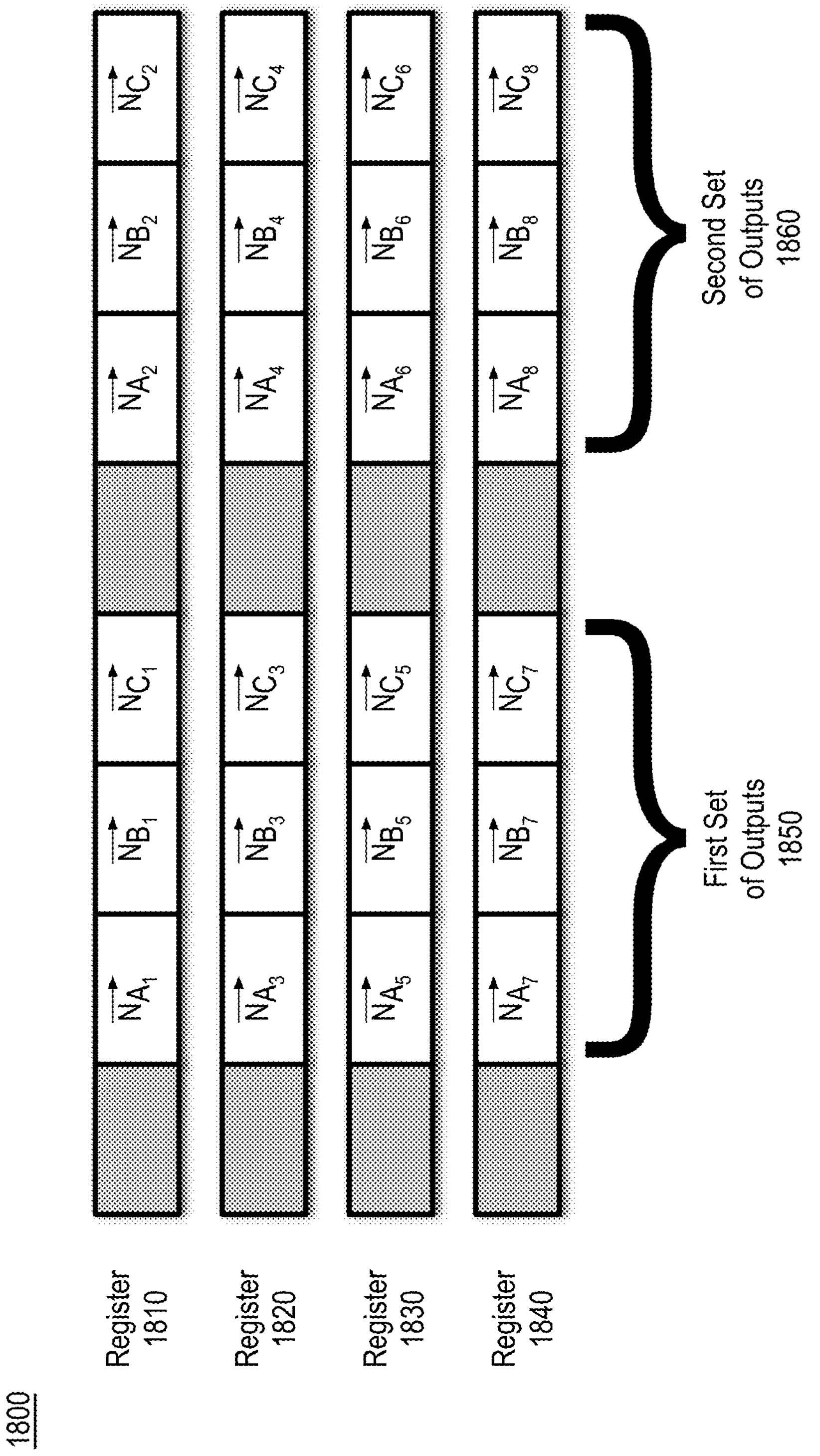
FIG. 18 illustrates a register layout for storing two sets of outputs for a SIMD2 RSQVS operation in four registers to accomplish a SIMD8 RSQVS operation according to an embodiment.

FIG. 18 illustrates a register layout 1800 for storing two sets of outputs 1850 and 1860 for a SIMD2 RSQVS operation in four registers 1810, 1820, 1830 and 1840 to accomplish a SIMD8 RSQVS operation according to an embodiment. As described further below, in one embodiment, a reciprocal square root function and a vector scaling function can be combined into a single SIMD2 reciprocal square root and vector scaling (RSQVS) instruction. Furthermore, a traditional reciprocal square root implementation may be used or an optimized reciprocal square root computation may be used as described with reference to FIGS. 21A-30.

As described in further detail below, in one embodiment, the RSQVS operation (also referred to herein as $R\overrightarrow{N_A}\overrightarrow{N_B}\overrightarrow{N_C}$) can be computed as an optimized combined SIMD2 instruction, representing a combination of a reciprocal square root function and a vector scaling function on a SIMD2 processing unit (e.g., a SIMD2 co-processor) by repeating the operation four times using a particular data organization convention for input component vectors A, B, and C and output squared vector length S. For example, input component vectors A, B, and C and output squared vector length S may be organized in accordance with the register layout 1700 described above with reference to FIG. 17.

In the context of the present example, it is assumed input component vectors A, B, and C and output squared vector length S are available for each of eight vectors as input to four SIMD2 $R\overrightarrow{N_A}\overrightarrow{N_B}\overrightarrow{N_C}$ (RSQVS) operations to form a SIMD8 $R\overrightarrow{N_A}\overrightarrow{N_B}\overrightarrow{N_C}$ (RSQVS) operation. The data organization may be as described with respect to FIG. 17 or an alternative data organization.

In the context of the present example, the first set of outputs 1850 and the second set of outputs 1860 (each comprising a sets of 32-bit floating point values of normalized component vectors $\overrightarrow{N_A}$, $\overrightarrow{N_B}$, $\overrightarrow{N_C}$) resulting from the four SIMD2 RSQVS operations can be written as SIMD2 $\overrightarrow{N_A}\overrightarrow{N_B}\overrightarrow{N_C}$ to four respective output registers 1810, 1820, 1830 and 1840. In this manner, register 1810 contains normalized component vectors a first set of component vectors (e.g., the first set of inputs 1755 of FIG. 17) and a second set of component vectors (e.g., the second set of inputs 1765 of FIG. 17) for two of the eight vectors and registers 1820, 1830 and 1840 contain the normalized component vectors of the other six vectors. In one embodiment, registers 1810, 1820, 1830 and 1840 are 256-bit registers with 96 bits being used to store the first set of outputs 1850, 96 bits being used to store the second set of outputs 1860 and the remaining 64 bits being unused.

Figure 19:
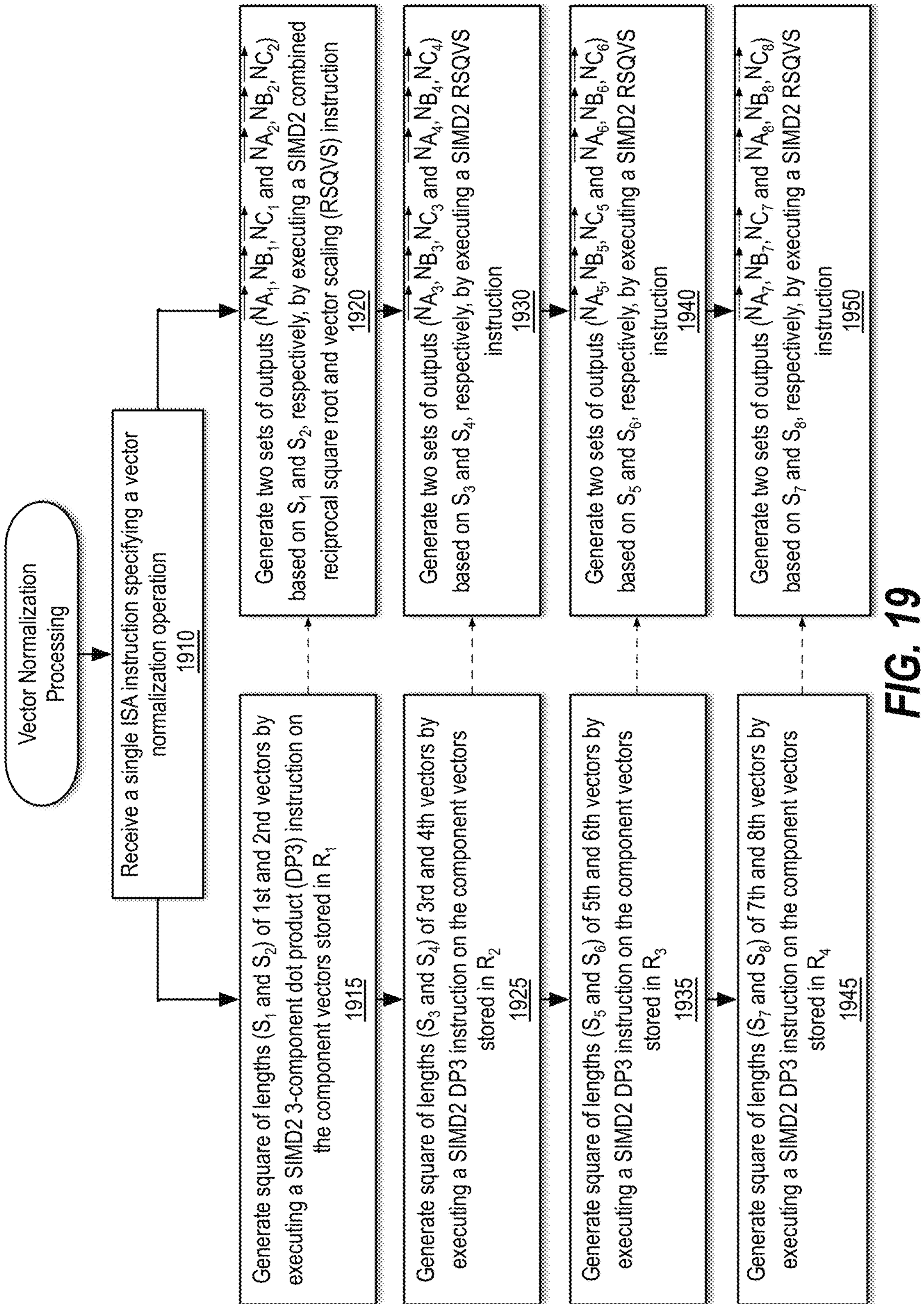
FIG. 19 is a flow diagram illustrating vector normalization processing according to the an embodiment.

FIG. 19 is a flow diagram illustrating vector normalization processing according to an embodiment. In the context of the present example, it is assumed a vector normalization instruction is available in the ISA at issue. At block 1910, a single vector normalization instruction specifying a vector normalization operation is received by a GPU. According to one embodiment, an execution unit (e.g., execution unit (EU) 600 of FIG. 6) in the GPU maintains the context of multiple threads. Each thread may request for instructions from an instruction fetch unit and receive them. The thread controller (e.g., thread control 601) in the EU schedules among threads based on the priority policy chosen. Once a thread is selected by the scheduler the instructions from that thread are sent to the FPU and co-processor for execution.

In one embodiment, the vector normalization operation is a SIMD8 vector normalization operation that performs vector normalization on eight vectors, the component vectors of which may be stored in one or more registers of the general register file (e.g., general register file 153). For example, assuming the vectors each have three components, prior to initiating the vector normalization processing, two sets of component vectors A, B and C for two respective vectors of the eight vectors may be stored in each of four registers as described above with reference to FIG. 17.

In the context of the present example, responsive to receipt of the single vector normalization instruction, GPU hardware issues four 3-component SIMD2 dot product (DP3) instructions to a first processing unit (e.g., a SIMD8 FPU) of the GPU and four RSQVS instructions (representing a combined reciprocal square root function and vector scaling function) to a second processing unit (e.g., a SIMD2 co-processor) of the GPU.

At block 1915, squared lengths ($S_1$ and $S_2$) of a first and second vector of the eight vectors are generated by executing a SIMD2 DP3 instruction on the respective component vectors stored in the first input register. In one embodiment, the single vector normalization instruction may specify the first (e.g., $R_1$) of multiple (e.g., four) input registers (e.g., $R_1$, $R_2$, $R_3$ and $R_4$) and the first (e.g., $R_5$) of multiple (e.g., four) output registers (e.g., $R_5$, $R_6$, $R_7$ and $R_8$) that are to be used by the vector normalization instruction and the hardware may automatically increment the input register as it completes respective DP3 instructions and automatically increment the output register as it completes respective RSQVS instructions.

According to one embodiment, execution of the first SIMD2 DP3 instruction in block 1915 involves (i) reading component vectors (e.g., component vectors 1770*a-c*) of a first vector of the eight vectors from a first input register (e.g., register 1710), calculating the square of the length of the first vector ($S_1=A_1^2+B_1^2+C_1^2$), and storing the result ($S_1$) as a first output (e.g., first output 1750) into the same register (e.g., register 1710) from which the component vectors were read; and (ii) reading component vectors (e.g., component vectors 1780*a-c*) of a second vector of the eight vectors from the first input register (e.g., register 1710), calculating the square of the length of the second vector ($S_2=A_2^2+B_2^2+C_2^2$), and storing the result ($S_2$) as a second output (e.g., second output 1760) into the same register (e.g., register 1710) from which the component vectors were read.

At block 1920, based on the squared lengths ($S_1$ and $S_2$) generated in block 1915 and the two sets of component vectors in the first input register, two sets of outputs (e.g., the first set of outputs 1850 and the second set of outputs 1860) in the form of normalized component vectors $\overrightarrow{N_{A_1}}$, $\overrightarrow{N_{B_1}}$, $\overrightarrow{N_{C_1}}$ and $\overrightarrow{N_{A_2}}$, $\overrightarrow{N_{B_2}}$, $\overrightarrow{N_{C_2}}$) are generated and stored to the first output register (e.g., register 1810) by executing a SIMD2 combined reciprocal square root and vector scaling (RSQVS) instruction that implements a combination of a reciprocal square root function and a vector scaling function. According to one embodiment the reciprocal square root function is optimized as described below with reference to FIGS. 21A-30. Alternatively, a traditional reciprocal square root implementation may be used.

At block 1925, squared lengths ($S_3$ and $S_4$) of a third and fourth vector of the eight vectors are generated by executing a SIMD2 DP3 instruction on the respective component vectors stored in the second input register. According to one embodiment, execution of this second SIMD2 DP3 instruction in block 1925 involves (i) reading component vectors (e.g., component vectors 1770*a-c*) of a third vector of the eight vectors from a second input register (e.g., register 1720), calculating the square of the length of the third vector ($S_3=A_3^2+B_3^2+C_3^2$), and storing the result ($S_3$) as a first output (e.g., first output 1750) into the same register (e.g., register 1720) from which the component vectors were read; and (ii) reading component vectors (e.g., component vectors 1780*a-c*) of a fourth vector of the eight vectors from the second input register (e.g., register 1720), calculating the square of the length of the fourth vector ($S_4=A_4^2+B_4^2+C_4^2$), and storing the result ($S_4$) as a second output (e.g., second output 1760) into the same register (e.g., register 1720) from which the component vectors were read.

At block 1930, based on the squared lengths ($S_3$ and $S_4$) generated in block 1925 and the two sets of component vectors in the second input register, two sets of outputs (e.g., the first set of outputs 1850 and the second set of outputs 1860) in the form of normalized component vectors $\overrightarrow{N_{A_3}}$, $\overrightarrow{N_{B_3}}$, $\overrightarrow{N_{C_3}}$ and $\overrightarrow{N_{A_4}}$, $\overrightarrow{N_{B_4}}$, $\overrightarrow{N_{C_4}}$) are generated and stored to the second output register (e.g., register 1820) by executing a second SIMD2 RSQVS instruction.

At block 1935, squared lengths ($S_5$ and $S_6$) of a fifth and sixth vector of the eight vectors are generated by executing a SIMD2 DP3 instruction on the respective component vectors stored in the third input register. According to one embodiment, execution of this third SIMD2 DP3 instruction in block 1935 involves (i) reading component vectors (e.g., component vectors 1770*a-c*) of a fifth vector of the eight vectors from a third input register (e.g., register 1730), calculating the square of the length of the fifth vector ($S_5=A_5^2+B_5^2+C_5^2$), and storing the result ($S_5$) as a first output (e.g., first output 1750) into the same register (e.g., register 1730) from which the component vectors were read; and (ii) reading component vectors (e.g., component vectors 1780*a-c*) of a sixth vector of the eight vectors from the third input register (e.g., register 1730), calculating the square of the length of the sixth vector ($S_6=A_6^2+B_6^2+C_6^2$), and storing the result ($S_6$) as a second output (e.g., second output 1760) into the same register (e.g., register 1730) from which the component vectors were read.

At block 1940, based on the squared lengths ($S_5$ and $S_6$) generated in block 1935 and the two sets of component vectors in the second input register, two sets of outputs (e.g., the first set of outputs 1850 and the second set of outputs 1860) in the form of normalized component vectors $\overrightarrow{N_{A_5}}$, $\overrightarrow{N_{B_5}}$, $\overrightarrow{N_{C_5}}$, and $\overrightarrow{N_{A_6}}$, $\overrightarrow{N_{B_6}}$, $\overrightarrow{N_{C_6}}$) are generated and stored to the third output register (e.g., register 1830) by executing a third SIMD2 RSQVS instruction.

At block 1945, squared lengths ($S_7$ and $S_8$) of a seventh and eighth vector of the eight vectors are generated by executing a SIMD2 DP3 instruction on the fourth input register. According to one embodiment, execution of this fourth SIMD2 DP3 instruction in block 1935 involves (i) reading component vectors (e.g., component vectors 1770*a-c*) of a seventh vector of the eight vectors from a fourth input register (e.g., register 1740), calculating the square of the length of the seventh vector ($S_7$=++0), and storing the result ($S_7$) as a first output (e.g., first output 1750) into the same register (e.g., register 1740) from which the component vectors were read; and (ii) reading component vectors (e.g., component vectors 1780*a-c*) of a eighth vector of the eight vectors from the fourth input register (e.g., register 1740), calculating the square of the length of the eighth vector ($S_8=A_8^2+B_8^2+C_8^2$), and storing the result ($S_8$) as a second output (e.g., second output 1760) into the same register (e.g., register 1740) from which the component vectors were read.

At block 1950, based on the squared lengths ($S_7$ and $S_8$) generated in block 1945 and the two sets of component vectors in the fourth input register, two sets of outputs (e.g., the first set of outputs 1850 and the second set of outputs 1860) in the form of normalized component vectors $\overrightarrow{N_{A_7}}$, $\overrightarrow{N_{B_7}}$, $\overrightarrow{N_{C_7}}$, and $\overrightarrow{N_{A_8}}$, $\overrightarrow{N_{B_8}}$, $\overrightarrow{N_{C_8}}$) are generated and stored to the fourth output register (e.g., register 1840) by executing a fourth SIMD2 RSQVS instruction. At this point, processing is complete and all twenty-four normalized component vectors are available in the four output registers.

While in the context of the present example, the vector normalization instruction is assumed to operate on eight vectors taken two at a time and make use of four input registers and four output registers, in alternative embodiments, the number of vectors V on which the vector normalization operation operates, the number N of the V vectors that are processed in parallel and the number V/N of input and output registers can be other numbers. For example, holding constant the register sizes and component vector sizes, sixteen vectors can be processed two at a time by executing eight SIMD2 DP3 instructions and eight SIMD2 RSQVS instructions and using eight input registers and eight output registers. Similarly, while in the context of various examples described herein, register sizes of 256 bits and component vector sizes of 32 bits are assumed, in alternative embodiments one or both of these sizes may be larger or smaller. For example, assuming register sizes of 512 bits, and eight 3-component vectors each represented in 32 bits can be processed four at a time by executing two SIMD4 DP3 instructions and two SIMD4 RSQVS instructions and using two input registers and two output registers.

FIG. 20 demonstrates the throughput a vector normalization operation using DP3 and RSQVS instructions according to an embodiment. In the context of the present example, a SIMD2 FPU 2010 and a SIMD2 co-processor 2020 are shown side-by-side executing two instructions to perform a vector normalization operation on eight vectors with each block representing one clock cycle.

Four 3-component SIMD2 dot product operations (DP3) are executed on the FPU 2010 to produce the respective squared lengths of the eight vectors. As the squared lengths are available on which the respective four SIMD2 RSQVS instructions are dependent, they can be executed on the co-processor 2020.

Based on the foregoing, the FPU 2010 takes 4 clocks to effectively compute a SIMD8 DP3 operation and the co-processor 2020 takes 4 clocks to compute a SIMD8 RSQVS operation. So, from a throughput perspective, both the FPU 2020 and the co-processor are equal limiters as both take an equal number of clocks. Hence the throughput (or IPC) of the proposed implementation of the new VNM (Vector Normalization) instruction is 1 SIMD8 VNM instruction/4 clocks or an IPC of 0.25. As such, the IPC improvement of the new single VNM instruction over the above-described existing implementation of vector normalization is 50%. In terms of execution clock reduction, the new VNM instruction reduces the number of clocks by 2 from 6 clocks to 4 clocks, which represents a 33.33% execution clock reduction (2/6*100=33.33%) as compared to the above-described seven instruction implementation of vector normalization.

Register file bandwidth of the new VNM instruction involves 8 read operations of registers from the register file as compared to 3 read operations and 2 register reuses in the context of the above-described seven instruction implementation. As such, overall there is no change in register file bandwidth between the two implementations.

Optimized Computation of Reciprocal Square Root

Figure 21A:
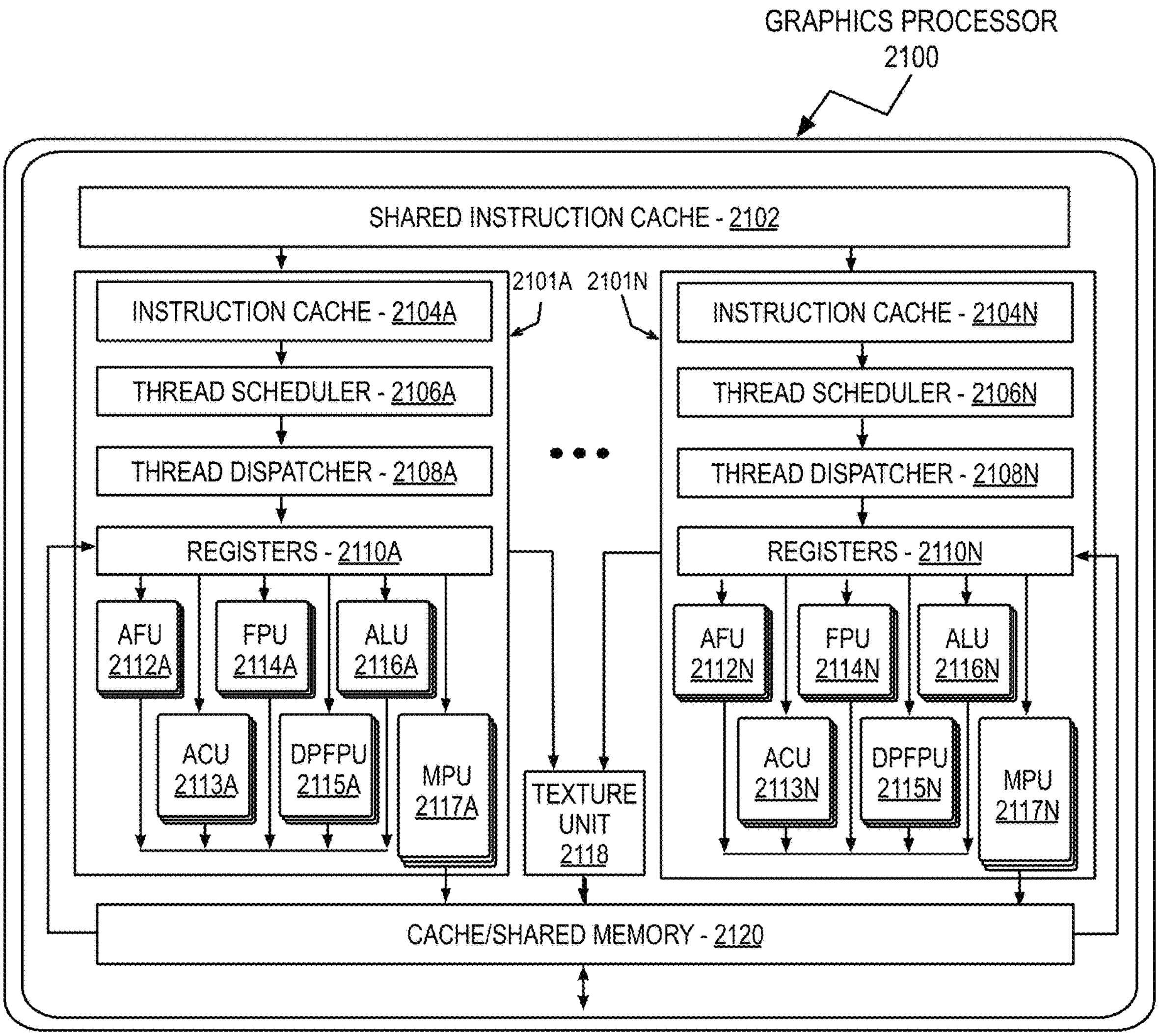
FIGS. 21A and 21B is a block diagram illustrating an additional exemplary graphics processor of a system on a chip integrated circuit according to an embodiment.
Figure 21B:
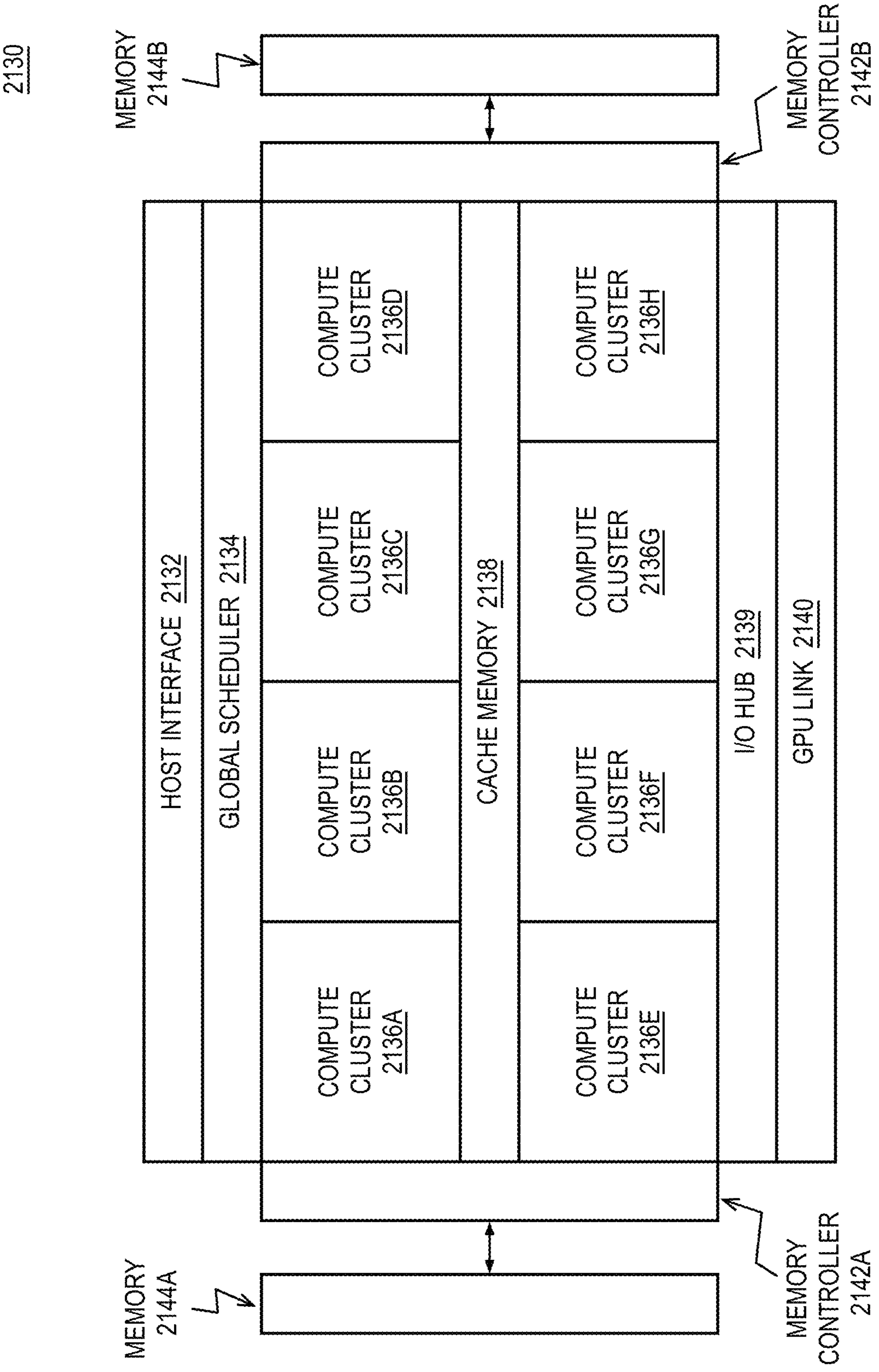

FIGS. 21A-21B illustrate additional exemplary graphics processor logic according to embodiments described herein. FIG. 21A illustrates a graphics core 2100 that may be included within the graphics processor 1210 of FIG. 12, and may be a unified shader core 1355A-1355N as in FIG. 13B. FIG. 21B illustrates a highly-parallel general-purpose graphics processing unit 2130 suitable for deployment on a multi-chip module.

As shown in FIG. 21A, the graphics core 2100 includes a shared instruction cache 2102, a texture unit 2118, and a cache/shared memory 2120 that are common to the execution resources within the graphics core 2100. The graphics core 2100 can include multiple slices 2101A-1401N or partition for each core, and a graphics processor can include multiple instances of the graphics core 2100. The slices 2101A-1401N can include support logic including a local instruction cache 2104A-2104N, a thread scheduler 2106A-2106N, a thread dispatcher 2108A-2108N, and a set of registers 2110A. To perform logic operations, the slices

2101A-2101N can include a set of additional function units (AFUs 2112A-2112N), floating-point units (FPU 2114A-2114N), integer arithmetic logic units (ALUs 2116-2116N), address computational units (ACU 2113A-2113N), double-precision floating-point units (DPFPU 2115A-2115N), and matrix processing units (MPU 2117A-2117N).

Some of the computational units operate at a specific precision. For example, the FPUs 2114A-2114N can perform single-precision (32-bit) and half-precision (16-bit) floating point operations, while the DPFPUs 2115A-2115N perform double precision (64-bit) floating point operations. The ALUs 2116A-2116N can perform variable precision integer operations at 8-bit, 16-bit, and 32-bit precision, and can be configured for mixed precision operations. The MPUs 2117A-2117N can also be configured for mixed precision matrix operations, including half-precision floating point and 8-bit integer operations. The MPUs 2117-2117N can perform a variety of matrix operations to accelerate machine learning application frameworks, including enabling support for accelerated general matrix to matrix multiplication (GEMM). The AFUs 2112A-2112N can perform additional logic operations not supported by the floating-point or integer units, including trigonometric operations (e.g., Sine, Cosine, etc.).

As shown in FIG. 21B, a general-purpose processing unit (GPGPU) 2130 can be configured to enable highly-parallel compute operations to be performed by an array of graphics processing units. Additionally, the GPGPU 2130 can be linked directly to other instances of the GPGPU to create a multi-GPU cluster to improve training speed for particularly deep neural networks. The GPGPU 2130 includes a host interface 2132 to enable a connection with a host processor. In one embodiment the host interface 2132 is a PCI Express interface. However, the host interface can also be a vendor specific communications interface or communications fabric. The GPGPU 2130 receives commands from the host processor and uses a global scheduler 2134 to distribute execution threads associated with those commands to a set of compute clusters 2136A-2136H. The compute clusters 2136A-2136H share a cache memory 2138. The cache memory 2138 can serve as a higher-level cache for cache memories within the compute clusters 2136A-2136H.

The GPGPU 2130 includes memory 2134A-2134B coupled with the compute clusters 2136A-2136H via a set of memory controllers 2142A-2142B. In various embodiments, the memory 2134A-2134B can include various types of memory devices including dynamic random access memory (DRAM) or graphics random access memory, such as synchronous graphics random access memory (SGRAM), including graphics double data rate (GDDR) memory.

In one embodiment the compute clusters 2136A-2136H each include a set of graphics cores, such as the graphics core 2100 of FIG. 21A, which can include multiple types of integer and floating point logic units that can perform computational operations at a range of precisions including suited for machine learning computations. For example and in one embodiment at least a subset of the floating point units in each of the compute clusters 2136A-2136H can be configured to perform 16-bit or 32-bit floating point operations, while a different subset of the floating point units can be configured to perform 64-bit floating point operations.

Multiple instances of the GPGPU 2130 can be configured to operate as a compute cluster. The communication mechanism used by the compute cluster for synchronization and data exchange varies across embodiments. In one embodiment the multiple instances of the GPGPU 2130 communicate over the host interface 2132. In one embodiment the GPGPU 2130 includes an I/O hub 2139 that couples the GPGPU 2130 with a GPU link 2140 that enables a direct connection to other instances of the GPGPU. In one embodiment the GPU link 2140 is coupled to a dedicated GPU-to-GPU bridge that enables communication and synchronization between multiple instances of the GPGPU 2130. In one embodiment the GPU link 2140 couples with a high speed interconnect to transmit and receive data to other GPGPUs or parallel processors. In one embodiment the multiple instances of the GPGPU 2130 are located in separate data processing systems and communicate via a network device that is accessible via the host interface 2132. In one embodiment the GPU link 2140 can be configured to enable a connection to a host processor in addition to or as an alternative to the host interface 2132.

While the illustrated configuration of the GPGPU 2130 can be configured to train neural networks, one embodiment provides alternate configuration of the GPGPU 2130 that can be configured for deployment within a high performance or low power inferencing platform. In an inferencing configuration the GPGPU 2130 includes fewer of the compute clusters 2136A-2136H relative to the training configuration. Additionally, the memory technology associated with the memory 2134A-2134B may differ between inferencing and training configurations, with higher bandwidth memory technologies devoted to training configurations. In one embodiment the inferencing configuration of the GPGPU 2130 can support inferencing specific instructions. For example, an inferencing configuration can provide support for one or more 8-bit integer dot product instructions, which are commonly used during inferencing operations for deployed neural networks.

Figure 22:
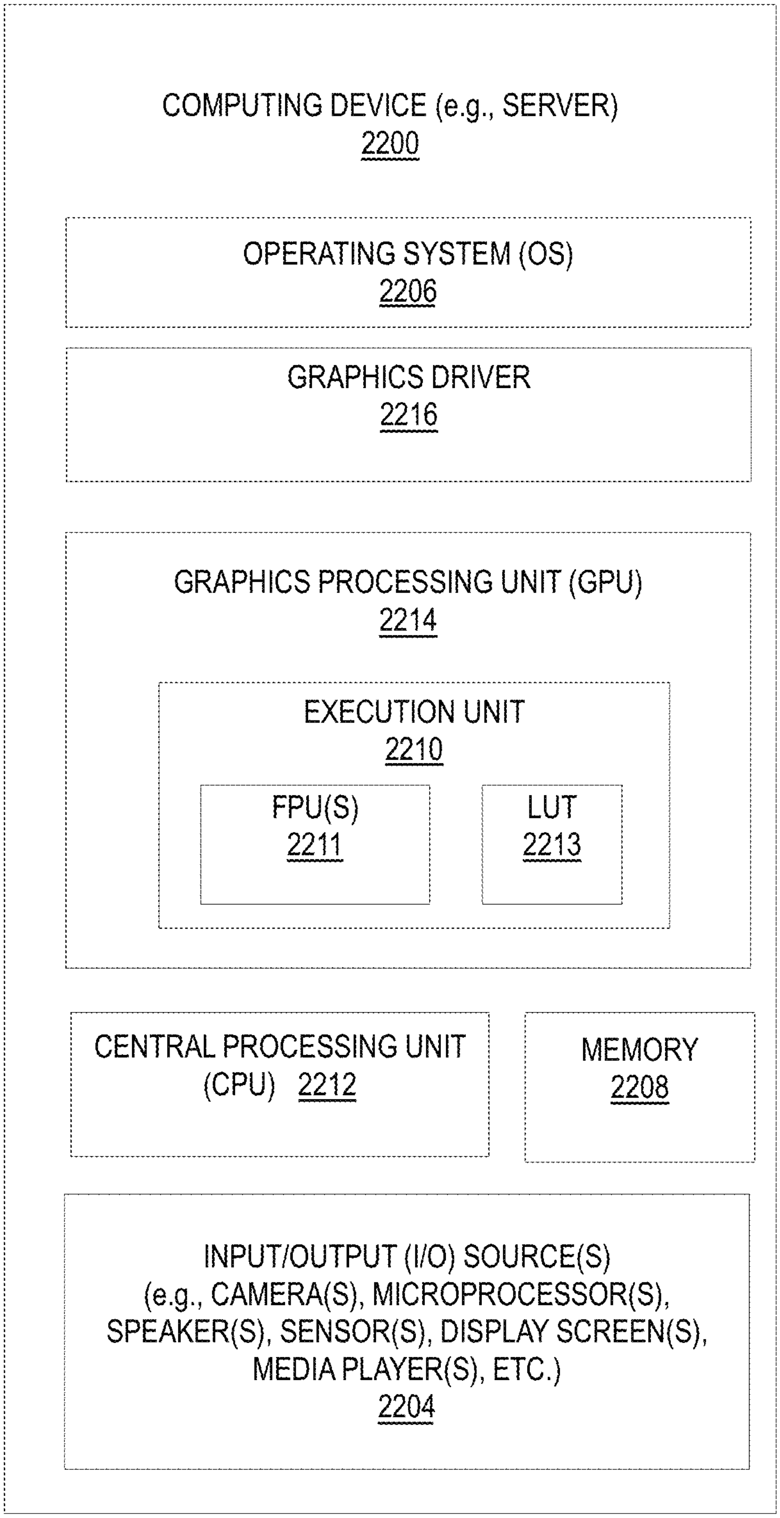
FIG. 22 illustrates one embodiment of a computing device.

FIG. 22 illustrates a computing device 2200 employing an execution unit 2210 to perform floating point extended math operations. Computing device 2200 (e.g., smart wearable devices, virtual reality (VR) devices, head-mounted display (HMDs), mobile computers, Internet of Things (IoT) devices, laptop computers, desktop computers, server computers, etc.) may be the same as processing system 100 of FIG. 1 and accordingly, for brevity, clarity, and ease of understanding, many of the details stated above with reference to FIGS. 1-13B are not further discussed or repeated hereafter. As illustrated, in one embodiment, computing device 2200 is shown as hosting execution unit 2210.

As illustrated, in one embodiment, execution unit 2210 is hosted by graphics processing unit ("GPU" or "graphics processor") 2214. In yet other embodiments, execution unit 2210 may be hosted by or part of firmware of central processing unit ("CPU" or "application processor") 2212. For brevity, clarity, and ease of understanding, throughout the rest of this document, execution unit 2210 may be discussed as part of GPU 2214; however, embodiments are not limited as such.

Computing device 2200 may include any number and type of communication devices, such as large computing systems, such as server computers, desktop computers, etc., and may further include set-top boxes (e.g., Internet-based cable television set-top boxes, etc.), global positioning system (GPS)-based devices, etc. Computing device 2200 may include mobile computing devices serving as communication devices, such as cellular phones including smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, computing device 2200 may include a mobile computing device employing a computer platform hosting an integrated circuit ("IC"), such as system on a chip ("SoC" or "SOC"), integrating various hardware and/or software components of computing device 2200 on a single chip.

As illustrated, in one embodiment, computing device 2200 may include any number and type of hardware and/or software components, such as (without limitation) GPU 2214, graphics driver (also referred to as "GPU driver", "graphics driver logic", "driver logic", user-mode driver (UMD), UMD, user-mode driver framework (UMDF), UMDF, or simply "driver") 2216, CPU 2212, memory 2208, network devices, drivers, or the like, as well as input/output (I/O) sources 2204, such as touchscreens, touch panels, touch pads, virtual or regular keyboards, virtual or regular mice, ports, connectors, etc.

Computing device 2200 may include operating system (OS) 2206 serving as an interface between hardware and/or physical resources of the computer device 2200 and a user. It is contemplated that CPU 2212 may include one or more processors, while GPU 2214 may include one or more graphics processors.

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

A graphics pipeline may be implemented in a graphics coprocessor design, where CPU 2212 is designed to work with GPU 2214 which may be included in or co-located with CPU 2212. In one embodiment, GPU 2214 may employ any number and type of conventional software and hardware logic to perform the conventional functions relating to graphics rendering as well as novel software and hardware logic to execute any number and type of instructions.

As aforementioned, memory 2208 may include a random access memory (RAM) comprising application database having object information. A memory controller hub, may access data in the RAM and forward it to GPU 2214 for graphics pipeline processing. RAM may include double data rate RAM (DDR RAM), extended data output RAM (EDO RAM), etc. CPU 2212 interacts with a hardware graphics pipeline to share graphics pipelining functionality.

Processed data is stored in a buffer in the hardware graphics pipeline, and state information is stored in memory 2208. The resulting image is then transferred to I/O sources 2204, such as a display component for displaying of the image. It is contemplated that the display device may be of various types, such as Cathode Ray Tube (CRT), Thin Film Transistor (TFT), Liquid Crystal Display (LCD), Organic Light Emitting Diode (OLED) array, etc., to display information to a user.

Memory 2208 may comprise a pre-allocated region of a buffer (e.g., frame buffer); however, it should be understood by one of ordinary skill in the art that the embodiments are not so limited, and that any memory accessible to the lower graphics pipeline may be used. Computing device 2200 may further include platform controller hub (PCH) 130 as referenced in FIG. 1, as one or more I/O sources 2204, etc.

CPU 2212 may include one or more processors to execute instructions in order to perform whatever software routines the computing system implements. The instructions frequently involve some sort of operation performed upon data. Both data and instructions may be stored in system memory 2208 and any associated cache. Cache is typically designed to have shorter latency times than system memory 2208; for example, cache might be integrated onto the same silicon chip(s) as the processor(s) and/or constructed with faster static RAM (SRAM) cells whilst the system memory 2208 might be constructed with slower dynamic RAM (DRAM) cells. By tending to store more frequently used instructions and data in the cache as opposed to the system memory 2208, the overall performance efficiency of computing device 2200 improves. It is contemplated that in some embodiments, GPU 2214 may exist as part of CPU 2212 (such as part of a physical CPU package) in which case, memory 2208 may be shared by CPU 2212 and GPU 2214 or kept separated.

System memory 2208 may be made available to other components within the computing device 2200. For example, any data (e.g., input graphics data) received from various interfaces to the computing device 2200 (e.g., keyboard and mouse, printer port, Local Area Network (LAN) port, modem port, etc.) or retrieved from an internal storage element of the computer device 2200 (e.g., hard disk drive) are often temporarily queued into system memory 2208 prior to their being operated upon by the one or more processor(s) in the implementation of a software program. Similarly, data that a software program determines should be sent from the computing device 2200 to an outside entity through one of the computing system interfaces, or stored into an internal storage element, is often temporarily queued in system memory 2208 prior to its being transmitted or stored.

Further, for example, a PCH may be used for ensuring that such data is properly passed between the system memory 2208 and its appropriate corresponding computing system interface (and internal storage device if the computing system is so designed) and may have bi-directional point-to-point links between itself and the observed I/O sources/devices 2204. Similarly, an MCH may be used for managing the various contending requests for system memory 2208 accesses amongst CPU 2212 and GPU 2214, interfaces and internal storage elements that may proximately arise in time with respect to one another.

I/O sources 2204 may include one or more I/O devices that are implemented for transferring data to and/or from computing device 2200 (e.g., a networking adapter); or, for a large scale non-volatile storage within computing device 2200 (e.g., hard disk drive). User input device, including alphanumeric and other keys, may be used to communicate information and command selections to GPU 2214. Another type of user input device is cursor control, such as a mouse, a trackball, a touchscreen, a touchpad, or cursor direction keys to communicate direction information and command selections to GPU 2214 and to control cursor movement on the display device. Camera and microphone arrays of computer device 2200 may be employed to observe gestures, record audio and video and to receive and transmit visual and audio commands.

Computing device 2200 may further include network interface(s) to provide access to a network, such as a LAN, a wide area network (WAN), a metropolitan area network (MAN), a personal area network (PAN), Bluetooth, a cloud network, a mobile network (e.g., 3rd Generation (3G), 4th Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing device 2200 may vary from implementation to implementation depending upon numerous factors, such as price constraints, performance requirements, technological improvements, or other circumstances. Examples of the electronic device or computer system 2200 may include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

According to one embodiment, execution unit 2210 includes one or more FPUs to perform single point floating point extended math operations. In most single point floating point mathematical operations, implementation of the operation on the exponent is relatively trivial. However, performing the operations on mantissa is comparatively difficult.

Figure 23:
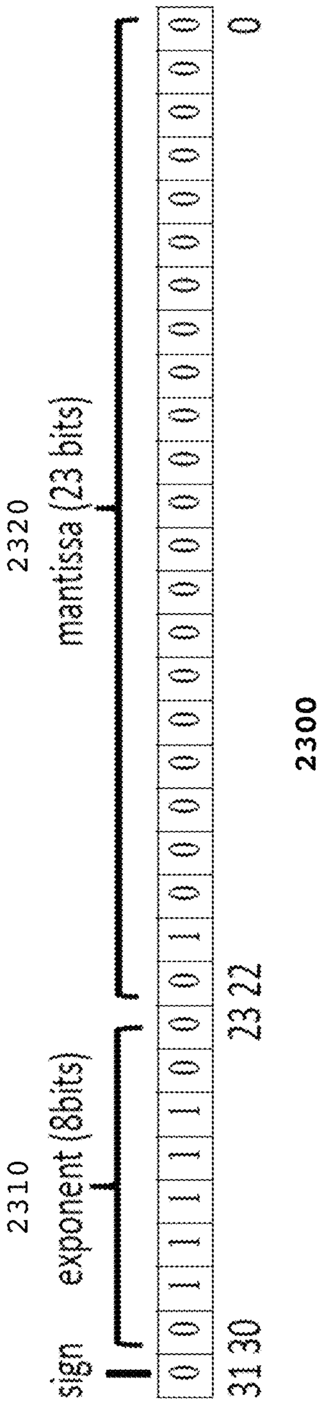
FIG. 23 illustrates one embodiment of a single precision floating point format.

FIG. 23 illustrates one embodiment of a single precision floating point format. As shown in FIG. 23, single precision (SP) floating point (FP) includes 32 bits, where bit 31 represents a sign component 2305; bits 30 to 23 represent an exponent component 2310; and bits 22 to 0 represent a mantissa component 2320. In one embodiment, the real value represented by this format can be given as:

$$(-1)^{b31}\times 2^{(b30b29 \ldots b23)2-127}\times(1\cdot b_{22}b_{21} \ldots b_0)_2,$$

where $b_n$ represents the bit in $n^{th}$ bit location in the SP FP format.

For example, the real value of the SP FP number shown in FIG. 23 is $(1^\circ)\times 2^{(01111100)_2-127}\times(1.01000000000000000000000)_2=1\times 2^{124-127}\times(1+1\times 2^{-2})=2^{-3}\times 1.25=0.15625$. According to one embodiment, an optimization of FP mathematical operations is implemented. In such an embodiment, an optimization is performed on the mantissa component 2320, hereafter referenced by Y=f(X), where X is the input mantissa and Y is the output mantissa).

Figure 24:
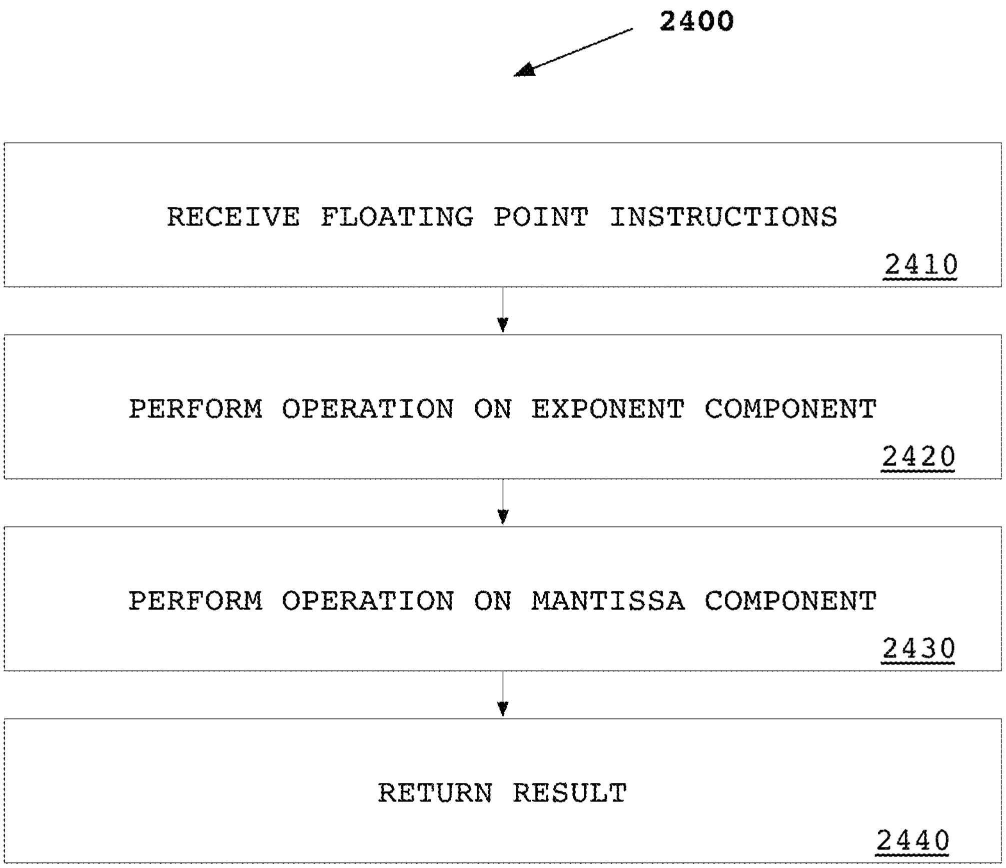
FIG. 24 is a flow diagram illustrating one embodiment of a process for performing a floating point extended math operation.

FIG. 24 is a flow diagram illustrating one embodiment of a process 2400 for performing a floating point extended math operation. Process 2400 may be performed by processing logic that may comprise hardware (e.g., circuitry, dedicated logic, programmable logic, etc.), software (such as instructions run on a processing device), or a combination thereof. In one embodiment, process 2400 may be performed by one or more instructions executed at FPUs 2211. The process 2400 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-23 are not discussed or repeated here.

To simplify the description, process 2400 will be discussed with reference to an implementation of the square root operation. However, the remaining operations (e.g., reciprocal square root, division, inverse, sine/cosine, exponent and logarithm) will be discussed below based on the square root implementation. Process 2400 begins at processing block 2410 where one or more instructions are received to perform a FP operation on an operand. At processing block 2420, the FP operation is performed on the exponent component 2310 of an operand. For instance, the square root of the exponent can be represented as:

$$e_{sq}=(e-127)/2,$$

where e is the 8 bit exponent (bits 30 to 23) in the input SP FP number (hereafter called as X).

Upon a determination that (e− 127) is even, $e_{sq}$ computation involves $e_{sq}$=(e− 127)/2. However upon a determination that (e− 127) is odd, $e_{sq}$=(e− 128)/2, and the input mantissa is multiplied by 2. Provided an input SP FP number (X) representation as $X=(-1)^s \times 2^{(e-127)} \times 1.m$, the result of square root operation (hereafter called as Y) may be given (e.g., assuming X is a positive SP FP number) as:

$$Y=\sqrt{X}=(-1)^s\times 2^{(e-127)/2} x\sqrt{(1.m)}=(-1)^s\times 2^{(e-128)/2}\times\sqrt{(2\times 1.m)},$$

$$\text{if } (e-127) \text{ is odd}$$

Thus, the square root of the mantissa can be represented as:

$$1.m_{sq}=\sqrt{(1.m)},$$

where $m_{sq}$ is the 23-bit mantissa part (bits 22 to 0) of resulting square root SP FP number (Y) and m is the 23-bit mantissa part (bits 22 to 0) of the input SP FP number (X).

As a result, the $m_{sq}$ computation involves $1.m_{sq}$=V(1.m) if (e− 127) is even, and $1.m_{sq}=\sqrt{(2\times 1.m)}$ if (e− 127) is odd (e.g., since the input mantissa is multiplied by 2 in order to make the resultant exponent ($e_{sq}$) as a non-fractional binary number).

At processing block 2430, the FP operation is performed on the mantissa component 2320 of the operand. To obtain the SP FP square root of input SP FP number's mantissa, the input mantissa is considered as an unsigned integer with 24bits (X), having a range of $[2^{23}, 2^{24}-1]$; instead of the decimal representation of mantissa as 1.m (which is a 24 bit fractional binary number).

Figure 25:
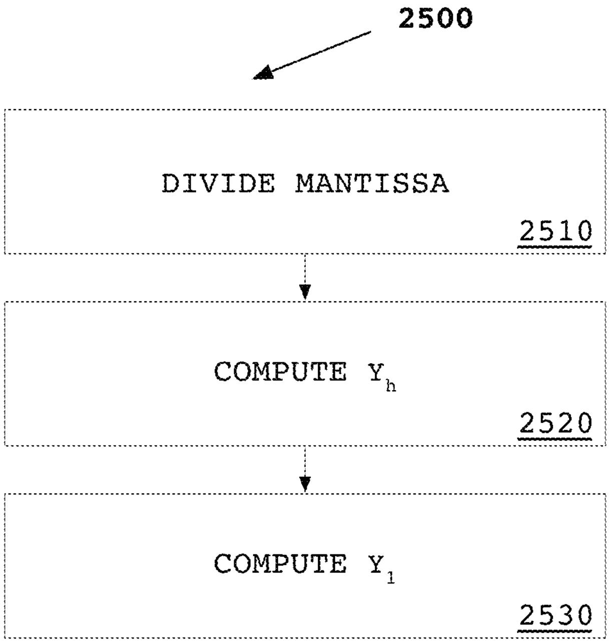
FIG. 25 is a flow diagram illustrating one embodiment of a process for performing a floating point extended math operation on a mantissa.

FIG. 25 is a flow diagram illustrating one embodiment of a process 2500 for performing a floating point extended math operation on a mantissa component. Process 2500 may be performed by processing logic that may comprise hardware (e.g., circuitry, dedicated logic, programmable logic, etc.), software (such as instructions run on a processing device), or a combination thereof. In one embodiment, process 2500 may be performed by one or more instructions executed at FPUs 2211. The process 2500 is illustrated in linear sequences for brevity and clarity in presentation; however, it is contemplated that any number of them can be performed in parallel, asynchronously, or in different orders. For brevity, clarity, and ease of understanding, many of the details discussed with reference to FIG. 1-17 are not discussed or repeated here.

Process 2500 begins at processing block 2510, where the mantissa component 2320 is divided into two sub-components. In one embodiment, the 24 bits of the SP FP mantissa of the expected output result of the FP mathematical operation is divided into two components: a first component with N bits (e.g., 12 most significant bits (MSBs)) (referenced as $Y_h$); and a second component with M bits (e.g. 12 least significant bits (LSBs)) (referenced as $Y_l$), where N+M=24. At processing block 2520, a result of the square root operation is computed for $Y_h$. According to one embodiment, $Y_h$ is computed by dividing the computation into two parts, including: determining an initial estimate for $Y_h$ (or $Y_{hi}$); and determining a difference between actual $Y_h$ and estimated $Y_{hi}$ (or $Y_{he}=Y_h-Y_{hi}$).

Figure 26:
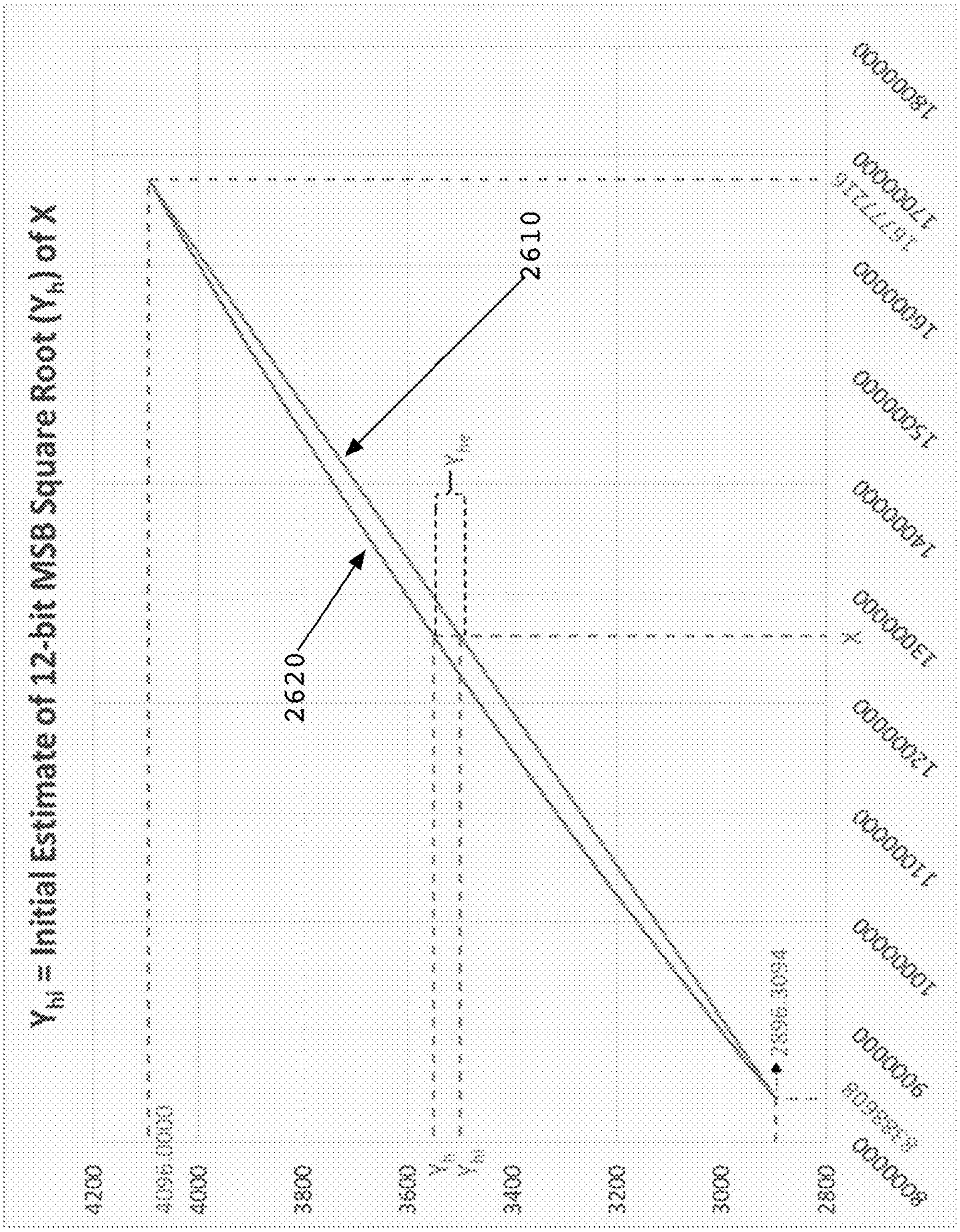
FIG. 26 illustrates a graph of an initial estimate of a square root.

According to one embodiment, $Y_{hi}$ is determined by performing a linear interpolation (LERP) (e.g., the straight line between ($X_0$, $Y_0$) and ($X_1$, $Y_1$), where $X_0=2^{23}$, $X_1=2^{24}$, $Y_0=\sqrt{X_0}$, $Y_1=\sqrt{X_1}$), as shown by line 2610 in FIG. 26. For the value X in the interval ($X_0$, $X_1$), the value $Y_{hi}$ along the straight line is given from the equation of slopes:

$$(Y_{hi}-Y_0)/(X-X0)=(Y_1-Y_0)/(X_1-X_0), \text{ such that:}$$

$$Y_{hi}=Y_0+(X-X0)\times(Y_1-Y_0)/(X_1-X_0)=$$

$$\sqrt{2^{24}}+(X-2^{24})\times(\sqrt{2^{24}}-\sqrt{2^{23}})/(2^{24}-2^{23})=$$

$$2^{12}+(X-2^{24})\times(2^{12}-2^{11}\times\sqrt{2})/2^{23}=$$

$$(2^{35}+(X-2^{24})\times(2^{12}-2^{11}\times\sqrt{2}))/2^{23}$$

In one embodiment, this result may be computed via one subtraction operation, one multiplication operation, one shift operation and one addition operation. In another embodiment, the result may also be computed via one subtraction operation, one multiply and accumulate (MAD) operation and one shift operation. In some embodiments, the intermediate FP multiplication/subtraction/addition/shifting operations may require more precision in the mantissa than SP in order to ensure a zero unit of least precision (ULP) error in the resultant 12-bit MSB square root $Y_h$.

Figure 27:
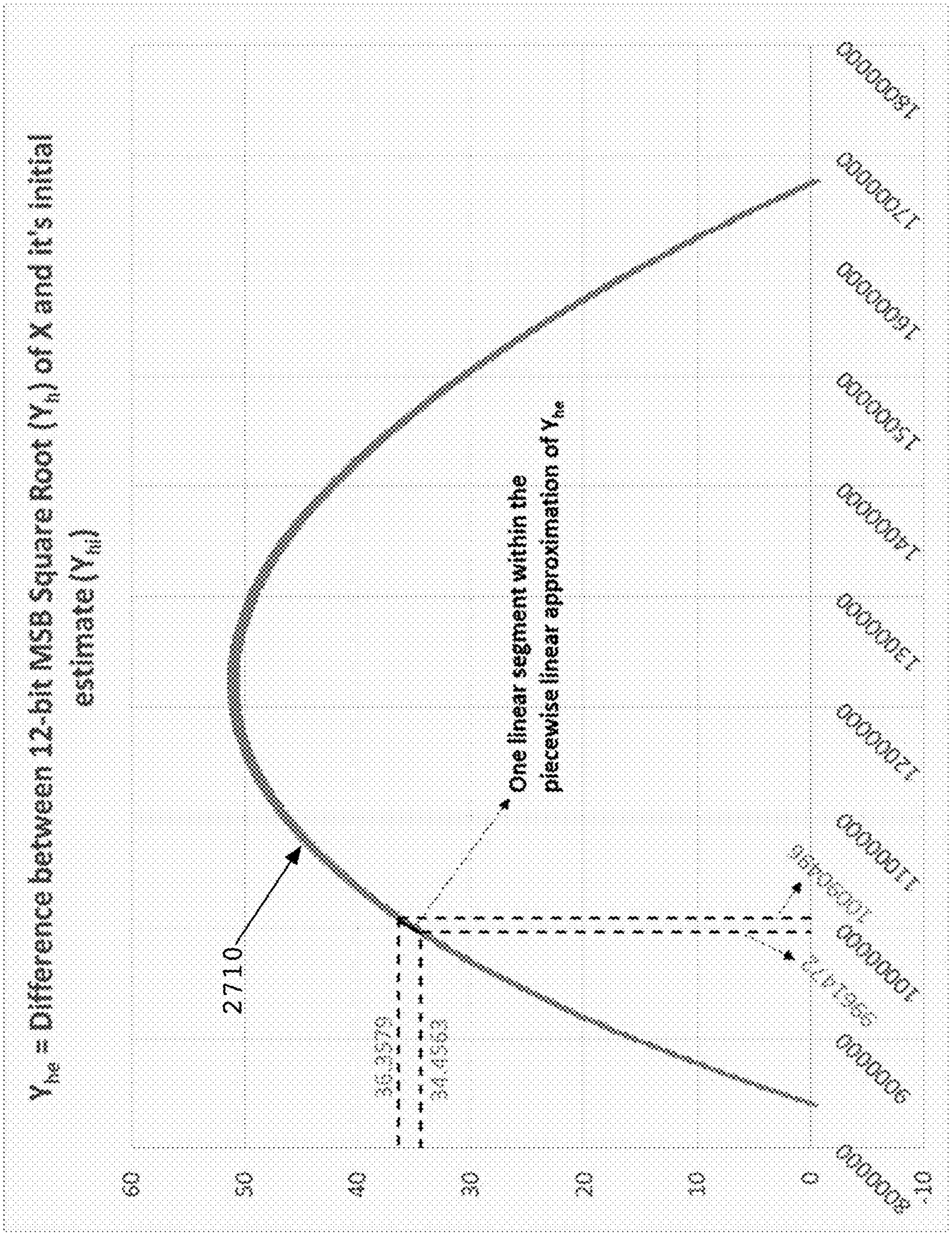
FIG. 27 illustrates a graph of a difference between a most significant bit square root and an initial estimate.
Figure 28:
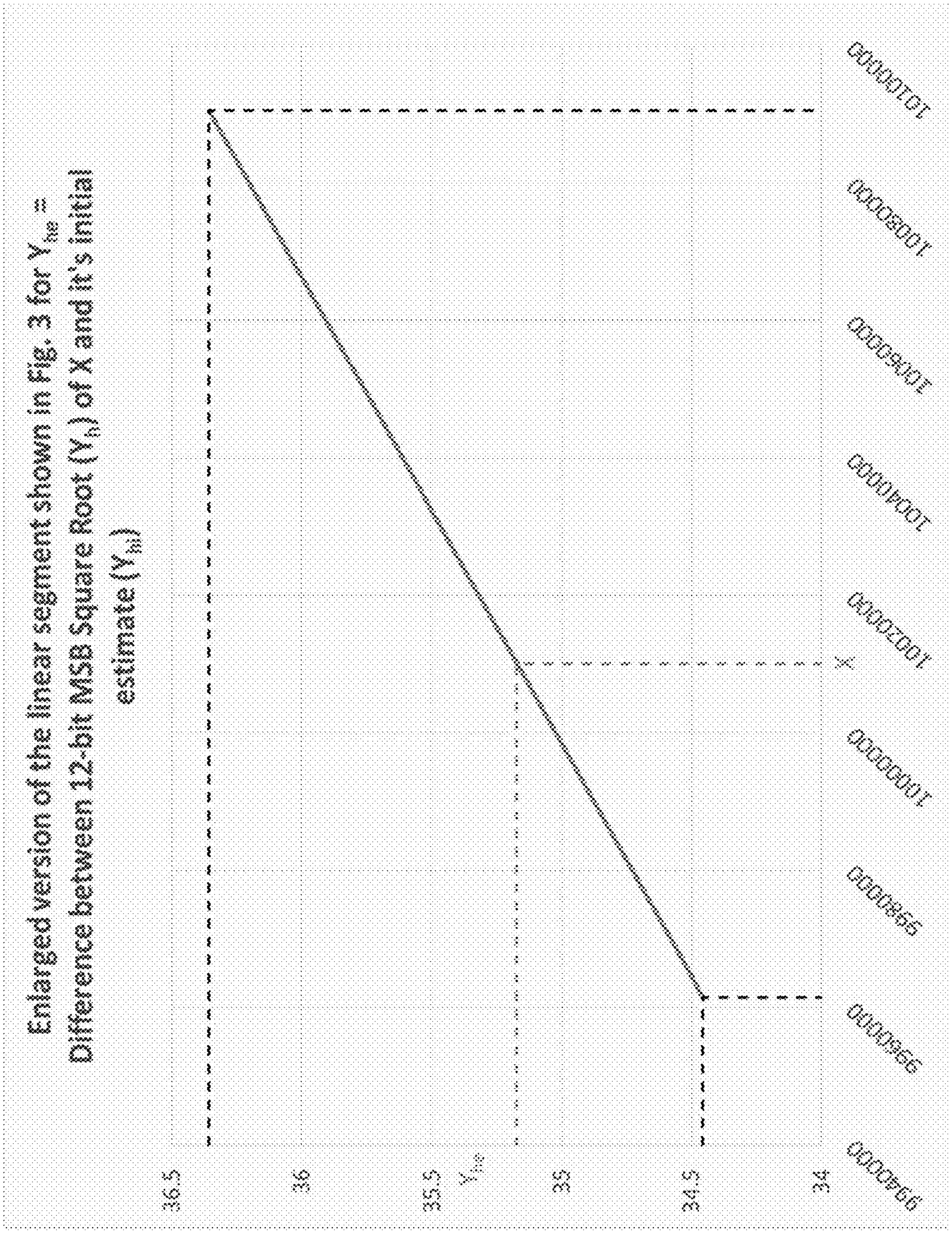
FIG. 28 illustrates an enlarged linear segment from the graph in FIG. 27.

The difference of the actual $Y_h$ and the estimated $Y_{hi}$ is shown in FIG. 27. As shown in FIG. 27, the plot of this difference $Y_{he}$ may be represented as the difference in value between line 2620 and line 2610 in FIG. 26 (also shown in FIG. 27 for detailed explanation). According to one embodiment, the difference value $Y_{he}$ may be estimated using a piecewise linear approximation (PLA) of the curve 2710 shown in FIG. 27. FIG. 28 illustrates an enlarged version of one of the linear segments shown in FIG. 27 to provide details of the linear segment that is a component of the PLA for the $Y_{he}$ curve 2710.

According to one embodiment, the PLA of $Y_{he}$ implements sixty-one line segments to compute 0 bit ULP relative error in the 12-bit MSB component of the resultant square root ($Y_h$). In such an embodiment, the slope and y-intercept of each of the line segments are stored in a lookup table (LUT) (e.g., LUT 2213 in FIG. 22) that is indexed using MSB bits of the input. FIG. 28 shows one embodiment of such line segments ($LS_i$) whose slope ($m_i$) and y-intercept ($c_i$) are stored in the LUT at index i. Using the input mantissa (X), slope ($m_i$) and y-intercept ($c_i$), $Y_{he}$ can be calculated using a MAD operation as:

$$Y_{he}=m_i X+c_i$$

Since the real value of the slope ($m_i$) is a very small decimal number, the result may implement shifting upon a determination that the slope used in the multiplication in the MAD operation is a SP FP value. In one embodiment, the intermediate FP MAD/shifting operations may implement more precision in the mantissa than SP in order to ensure 0 ULP error in the resultant 12-bit MSB square root $Y_h$. In a further embodiment, some line segments used in PLA may be longer (e.g., which cover larger input mantissa ranges), while others may be shorter (e.g., which cover shorter input mantissa ranges).

In such embodiments, indexing logic is simplified by taking 128 equidistant input mantissa ranges (e.g., with corresponding locations for slopes and y-intercepts in the LUT) due to a complexity in indexing variable size line segments. Moreover, adjacent LUT locations may be populated with duplicate values of slopes and y-intercepts to represent longer line segments in order to make each linear segment in the PLA represent equal input mantissa ranges, which simplify the LUT indexing logic using 7 MSB bits of input mantissa (X).

The 12-bit MSB part ($Y_h$) of the resultant square root Y may be computed as:

$$Y_h=Y_{hi}+Y_{he}$$

In one embodiment, the resultant $Y_h$ is rounded to 12 bits to compute a 12-bit MSB resultant square root ($Y_h$) with 0 ULP relative error since intermediate results $Y_{hi}$ and $Y_{he}$ can have up to 25 bits mantissa.

Referring back to FIG. 25, a result of the square root operation is computed for the second component (e.g., 12-bit LSB part of resultant square root SP FP number $Y(Y_l)$) at processing block 2530. In one embodiment the operations on $Y_h$ and $Y_l$ may be performed in parallel.

For the square root embodiment, the equation connecting Y, X, $Y_h$ and $Y_l$ is expanded to:

$$Y=Y_h+Y_l=\sqrt{X}$$

By taking square on both sides, $$Y^2=(Y_h+Y_l)^2=X$$

$$Y_h^2+Y_1^2+2Y_hY_l=X$$

$$\text{Let } Z=X-Y_h^2=Y_l^2+2Y_hY_l$$

Here, $Y_l^2$ can be ignored if $Y_l<<Y_h$, which implies $2Y_hY_l>>Y_l^2$ $$\text{So } Z\approx 2Y_hY_l$$

Since $Y_l$ is 12 LSB bits of resultant square root Y and $Y_h$ is 12 MSB bits of Y, and MSB ($12^{th}$ MSB bit) of $Y_h$ is always 1 (as per SP FP mantissa format):

$$Y_1<Y_h/2^{12}$$

$$Y_h>2^{12}Y_l$$

$$2Y_hY_l>2^{13}Y_l^2$$

$$Y_l^2<2Y_hY_l/2^{13}$$

As a result, MSB bit location of $Y_l^2$ is at least 13 bits lower than MSB bit location of $2Y_hY_l$, as MSB ($12^{th}$ MSB bit) of $Y_h$ is always 1 (as per SP FP mantissa format).

$$\text{So } 2Y_hY_l>>Y_l^2$$

$$\text{So } Y_l<<Y_h$$

Accordingly, $Z\approx 2Y_hY_l$.

Based on the approximation $Z\approx 2Y_hY_l$, $$Y_l=Z/(2Y_h)=(X-Y_h^2)/(2Y_h)$$

Accordingly, the computation of $Y_l$ is divided into finding $Y_h^2$, subtracting $Y_h^2$ from input mantissa X and dividing $X-Y_h^2$ by 2×4096 and then multiplying it by $4096/Y_h$. In one embodiment, $4096/Y_h$ is calculated via the PLA of $4096/Y_h$. This embodiment avoids the division by $2Y_l$, and converts the division into a shifting operation by dividing by 2×4096 which is a power of 2.

In one embodiment, there are 1200 possible values of $Y_h^2$ since there are 1200 perfect squares between $2^{23}$ and $2^{24}$ (e.g., $[2^{23}, 2^{24}]$ is the range represented by $Y^2=X$). To compute $Y_h^2$, the range of 1200 perfect squares is divided into 10 intervals, with each interval having 128 perfect squares; however the first range will have 80 extra perfect squares as 128×10=1280. As a result the input mantissa range is also divided into 10 intervals.

In a further embodiment, the input mantissa interval at which X is located may be identified using a $1^{st}$ level LUT stored with the largest perfect square in each interval of 128 perfect squares. In such an embodiment, X is compared to each entry in this 10-entry LUT table to determine whether X≤the entry in LUT. The comparison yields X as greater than a perfect square and less than or equal to the immediate next entry in the LUT, where the next entry's index ($Entry_i$) represents the interval X falls into. $Entry_i$ may be used as an index to identify the next level LUT of 128 perfect squares that fall between the perfect square entries in the $1^{st}$ level LUT where $Entry_{i-1}<X<Entry_i$. In one embodiment, there are a total of 10 such $2^{nd}$ LUTs, one each for each interval of 128 perfect squares. In an alternative embodiment, 129 perfect square entries are implemented in each $2^{nd}$ level LUT, which includes $Entry_{i-1}$ and $Entry_i$. Table 1 illustrates one embodiment of a LUT.

TABLE 1

| LUT index | LUT entries | X ≤ LUT entry (comparison result) | Input mantissa X (represented as 24 bit number |
|---|---|---|---|
| 0 | 8667136 | No | 12345678 |
| 1 | 9437184 | No | |
| 2 | 10240000 | No | |
| 3 | 11075584 | No | |
| 4 | 11943936 | No | |
| 5 | 12845056 | Yes | |
| 6 | 13778944 | Yes | |
| 7 | 14745600 | Yes | |
| 8 | 15745024 | Yes | |
| 9 | 16777216 | Yes | |

Table 1 shows the LUT indices and LUT entries (e.g., the largest perfect squares in every interval of 128 perfect squares within the total range of 1280 perfect squares representing $Y_h^2$). Using a sample value on input mantissa X=12345678, the comparison check X≤11943936 ($4^{th}$ indexed entry in the LUT) fails, whereas the comparison check X≤12845056 ($5^{th}$ indexed entry in the LUT) succeeds, as shown in Table 1. As shown, the comparisons return the index 5 ($Entry_i$), which points to the $5^{th}$ $2^{nd}$ level LUT with 129 perfect squares ranging from 11943936 to 12845056.

Figure 29:
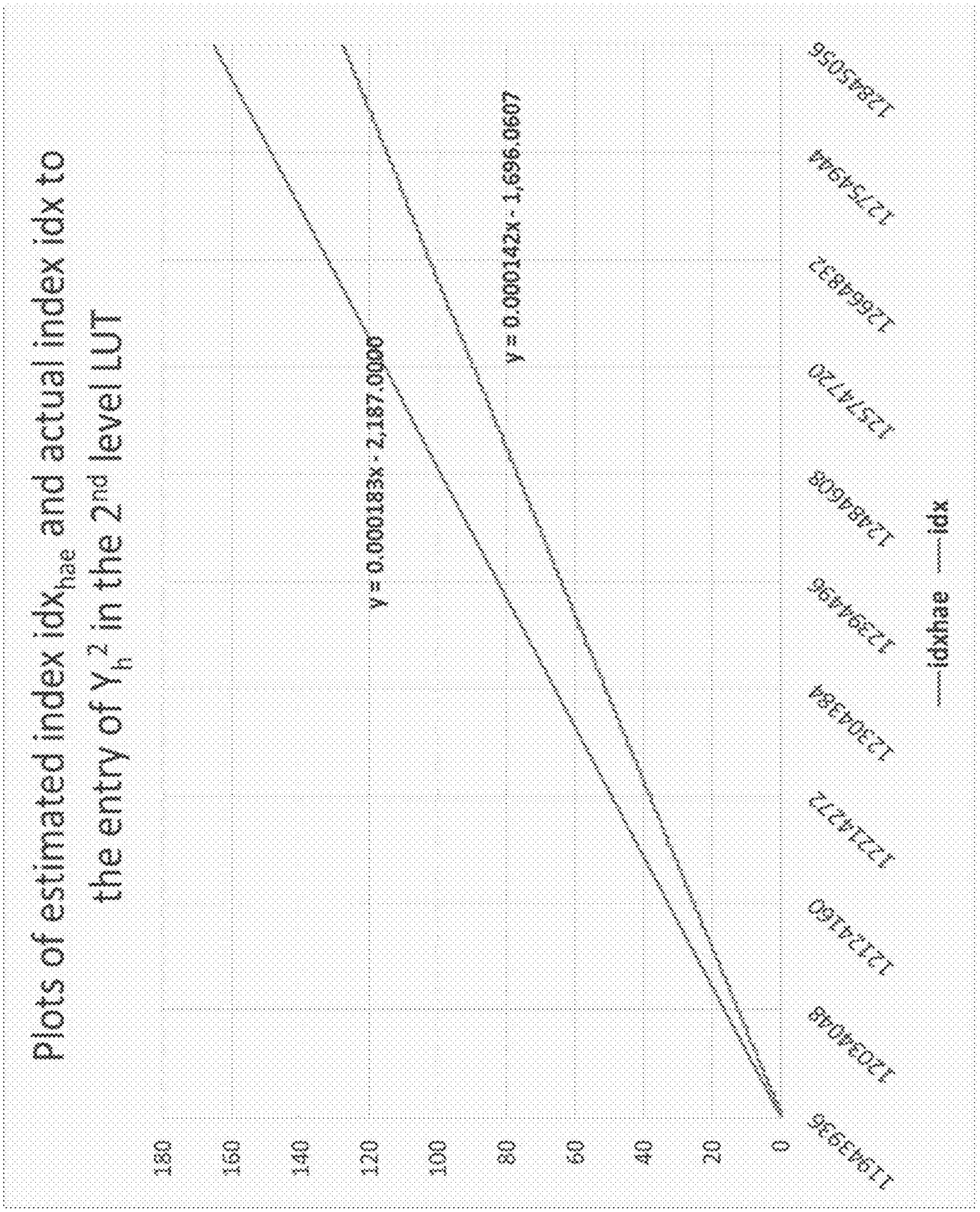
FIG. 29 illustrates a graph of indexes to lookup table entries.

To identify the closest perfect square $Y_h^2$ to input mantissa X, the lowest perfect square ($Y_{ha}^2$) is stored in each interval of 129 perfect squares. The difference between $X-Y_{ha}^2$ ($Z_{ha}$) is determined using $Y_{ha}^2$ from the $2^{nd}$ level LUT identified corresponding to X. Subsequently, $Z_{ha}$ is divided by 2×2048 and by 2×4096 using shift operations, resulting in $idx_{hal}$ and $idx_{hah}$. This is based on the property that there are 2n integers between adjacent perfect squares $n^2$ and $(n+1)^2$. Thus, the range of $Y_h$ extends from 2896 to 4095, and the nearest power of 2 close to 2896 is 2048 and to 4095 is 4096. The average of $idx_{hae}=(idx_{hal}+idx_{hah})/2$, which is the estimated index to the entry of $Y_h^2$ in the $2^{nd}$ level LUT), is then computed. FIG. 29 illustrates one embodiment of a graph of $idx_{hae}$ vs idx, which is the actual index to the entry of $Y_h^2$ in the $2^{nd}$ level LUT).

As shown in FIG. 29, both lines are scaled versions of each other. Based on line equations for $idx_{hae}$ as $y_2=m_2x+c_2$ and for idx is $y_1=m_1x+c_1$, $y_2=y_1+(m_2-m_1)x+(c_2-c_1)$. Both the equations $y_2=m_2x+c_2$ and $y_1=m_1x+c_1$ are shown with their respective slopes and y-intercept values in FIG. 29 $y_2$ represents the actual index (idx) to the entry of $Y_h^2$ in the $2^{nd}$ level LUT, and has been obtained based on scaling the equation for $idx_{hae}$ (represented by $y_1$). Accordingly $Y_h^2$ has been computed. In one embodiment, this computation is performed using 1 MAD operation and 1 addition operation.

Figure 30:
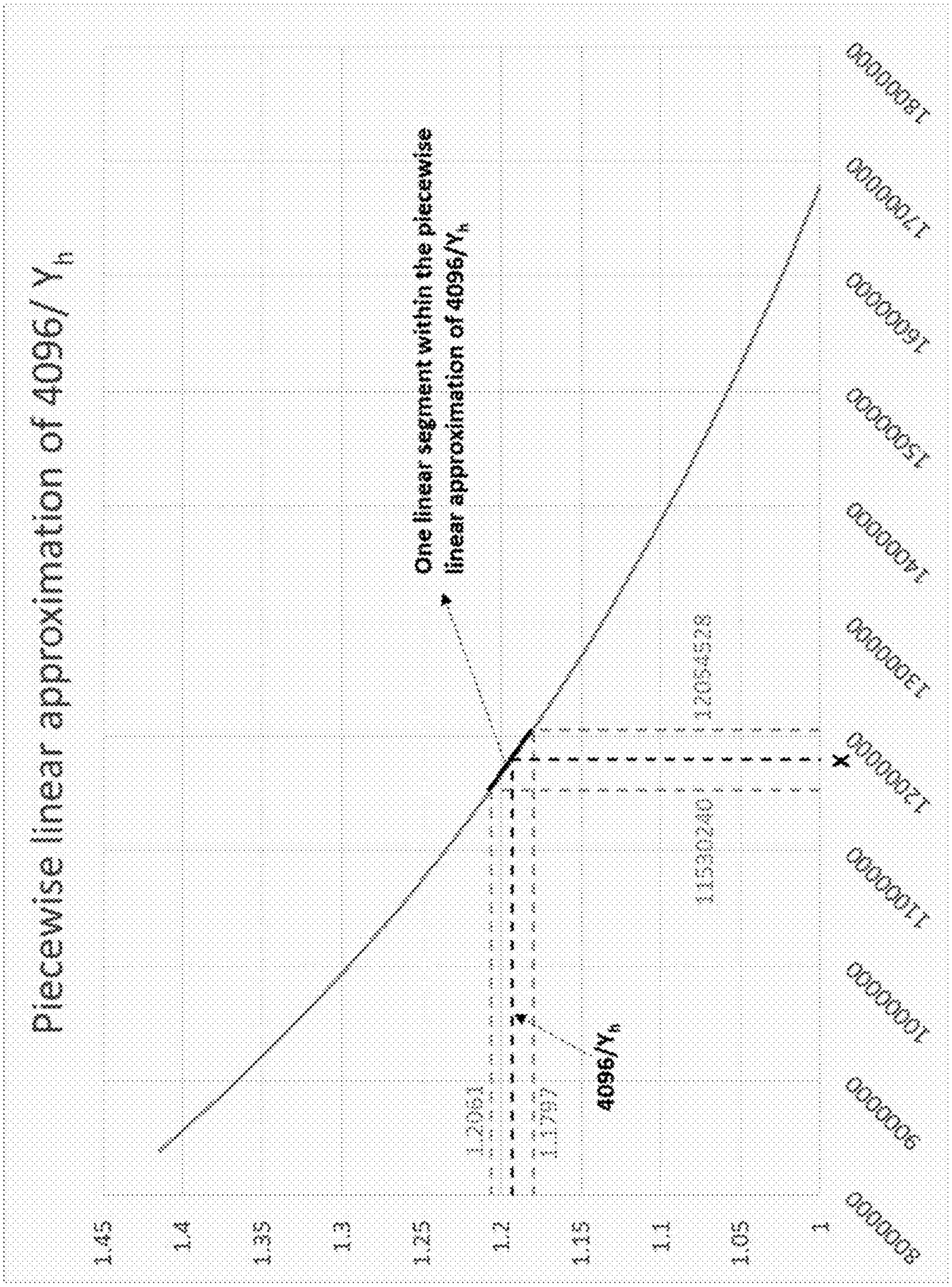
FIG. 30 illustrates a graph of a piecewise linear approximation.

Once $Y_h^2$ has been computed, $X-Y_h^2$ may be computed via 1 subtraction operation and divided by 2×4096 by 1 shift operation to generate an intermediate result. The intermediate result is subsequently multiplied by $4096/Y_h$. In one embodiment, $4096/Y_h$ is computed via piecewise linear approximation with 16 linear segments, as shown in FIG. 30. FIG. 30 further shows the x-axis represented by input mantissa X. The PLA of $4096/Y_h$ may be computed using 1 MAD operation. As discussed above, the intermediate results $(X-Y_h^2)/(2\times4096)$ is multiplied with $4096/Y_h$ to obtain the 12-bit LSB part of resultant square root Y, given as:

$$Y_1=(X-Y_h^2)/(2Y_h)$$

Referring back to FIG. 24, the result of the floating computation performed on $Y_h$ and $Y_l$ are combined with the results of the exponent component as a result (or output) of the floating point operation, processing block 2440. The execution latency of the above-described process depends upon the computation of the mantissa of square root (Y). Exponent ($e_{sq}$) computation involves checking the LSB bit of input exponent (e) whether it is even or odd, accordingly subtracting 128 or 127 (to shift exponent by bias), 1-bit shift operation to divide by 2 and further adding 127 (to shift exponent by bias) to put it back into SP FP exponent format. The multiplication, addition, subtraction and shifting operations involved in the computation of Y (mantissa of square root) require more execution cycles than the exponent $e_{sq}$ of square root.

In one embodiment, four computations are involved in computing the mantissa of square root Y, which may be performed in parallel because each operation is based on input mantissa X (e.g., they are not dependent on each other). In such an embodiment, computing the initial estimate ($Y_{hi}$) of the 12-bit MSB part of resultant square root Y, computing the difference of actual $Y_h$ and estimated $Y_{hi}$ as $Y_{he}=Y_h-Y_{hi}$, computing $Y_h^2$ as part of computing $Y_l$ and computing $4096/Y_h$ as part of computing In one embodiment, computing $Y_{hi}$ includes 1 subtraction operation, 1 MAD operation and 1 shift operation. Computing the difference of actual $Y_h$ and estimated $Y_{hi}$ as $Y_{he}=Y_h-Y_{hi}$ implements 1 LUT lookup to obtain the slope and y-intercept, and 1 MAD operation as part of PLA and 1 rounding operation, which involves checking the LSB bit and adding 1 to the rest of the bits if LSB bit is 1.

Computing $Y_h^2$ as a component of computing $Y_l$ (12-bit LSB part of resultant square root Y) involves 2 LUT lookups, 10 parallel comparison operations, 3 parallel shifting operations (e.g., dividing $X-Y_{ha}^2$ by 2×2048 to obtain $idx_{hal}$ and dividing $X-Y_{ha}^2$ by 2×4096 to obtain $idx_{hah}$ and divide by 2 in averaging of indices $idx_{hal}$ and $idx_{hah}$ to obtain $idx_{hae}$), 1 addition operation (e.g., for the averaging of indices $idx_{hal}$ and $idx_{hah}$ to obtain $idx_{hae}$), 1 subtraction ($X-Y_{ha}^2$), 1 MAD operation and 1 addition operation (e.g., to compute actual index idx for the entry into 2nd level LUT, from $idx_{hae}$ by rescaling the equation of $idx_{hae}$).

$X-Y_h^2$ can be computed by 1 subtraction and 1 shift operation for dividing by 2×4096. 1 multiplication operation is required to multiply the intermediate results $(X-Y_h^2)/(2\times4096)$ with $4096/Y_h$ to obtain $Y_l$. In one embodiment, computing $4096/Y_h$ involves 1 LUT lookup to obtain the slope and y-intercept, and 1 MAD operation as part of PLA. 1 multiplication operation is required to multiply the intermediate results $(X-Y_h^2)/(2\times4096)$ with $4096/Y_h$ to obtain $Y_l$.

Reciprocal Square Root (RSQ)

RSQ of the exponent can be represented as:

$$e_{rsq}=-(e-127)/2,$$

where e is the 8 bit exponent (bits 30 to 23) in the input SP FP number X.

Upon a determation that (e− 127) is even, $e_{rsq}$ computation only involves, $e_{rsq}=-(e-127)/2$; where a determination (e− 127) is odd, results in $e_{rsq}=-(e-128)/2$ and the input mantissa is multiplied by 2. Given X is represented as $X=(-1)^s\times2^{(e-127)}\times1.m$, the result of RSQ (Y) can be given (assuming X is a positive SP FP number) as:

$$Y=1/\sqrt{X}=(-1)^s\times2^{-(e-127)/2}\times(1/\sqrt{(1.m)})=$$
$$(-1)^s\times2^{-(e-128)/2}\times(1/\sqrt{(2\times1.m)}),\text{ if }(e-127)\text{ is odd}$$

The calculation of RSQ of the mantissa is divided into 12 MSB bits ($Y_h$) and 12 LSB bits ($Y_l$) of the resultant RSQ Y. Thus, for input X, let RSQ(X)=Y.

$$Y=1/\sqrt{X}=Y_h+Y_l$$

$$1/X=(Y_h+Y_l)^2=Y_h^2+Y_l^2+2Y_hY_l$$

As discussed above, $Y_l^2$ can be ignored as $Y_l \ll Y_h$, resulting in:

$$X=1/(Y_h+Y_l)^2=1/(Y_h^2*(1+Y_l/Y_h)^2)\approx1/Y_h^2*(1-2Y_l/Y_h)$$

since $Y_l/Y_h \ll 1$ and by applying approximation of binomial series for $(1+Y_l/Y_h)^2$:

$$X*Y_h^2=1-2Y_l/Y_h$$

$$2Y_l/Y_h=1-X*Y_h^2$$

$$Y_l=(Y_h-X*Y_h^3)/2$$

As discussed above with reference to the SP FP square root, $Y_h$ and $Y_h^3$ may be obtained by LERP and PLA, similar to the explanation provided in proposal. Multiply $Y_h^3$ by X and obtain $Y_l$ from the above formula by subtraction from $Y_h$ and division by 2 by shifting.

Inverse/Reciprocal (INV)

INV of the exponent can be represented as:

$$e_{inv}=-(e-127),$$

where e is the 8 bit exponent (bits 30 to 23) in the input SP FP number X.

The calculation of INV again begins with dividing the mantissa into 12 MSB bits ($Y_h$) and 12 LSB bits ($Y_l$) of the resultant INV Y. Thus, for input X, let INV(X)=Y:

$$Y=1/X=Y_h+Y_1$$

$$Y_1=1/X-Y_h=1/X*(1-X*Y_h)=Y_h*(1-X*Y_h),$$
$$\text{by approx. }1/X\approx Y_h=Y_h-X*Y_h^2$$

$Y_h$ and $Y_h^2$ can be obtained by LERP and PLA, similar to the above SP FP square root proposal description. From the above formula $Y_h^2$ is multiplied by X and $Y_l$ is computed by subtraction from $Y_h$.

Sine/Cosine (SIN/COS)

SIN of SP FP input is computed by a range reduction method since SIN is a periodic function. Thus, the SIN of input is computed in the range −π/2 to π/2 (e.g., the result ranging from −1 to 1 for input range [−π/2: π/2]) and outside the range, where the function remains periodic. Since the SIN output of the range reduced input can vary from −1 to 1, the exponent component of SIN can be computed after renormalization of the output:

$$\mathrm{SIN}(2^{(e-127)}\times 1.m)=\mathrm{SIN}(RR(2^{(e-127)}\times 1.m)),$$

where RR(X) applies range reduction on the input value X and reduces it to within 0 and π/2.

Given the output of RR(X)=intRR+frcRR, where intRR and frcRR are integer and fractional components of the result upon range reduction:

$$intRR=\mathrm{int}((2^{(e-127)}\times 1.m)/(\pi/2))=\mathrm{int}(2^{(e-127)}\times 1.m\times 2/\pi)$$

$$frcRR=(2^{(e-127)}\times 1.m)-(intRR\times\pi/2)\mathrm{SIN}(2^{(e-127)}\times 1.m)=\mathrm{SIN}(frcRR)$$

In one embodiment, the multiplication by 2/π and π/2 can be achieved by approximation and rounding of π. Based on different values of intRR, the resultant $frcRR_i$ for SIN computation can be obtained from the following Table 2.

TABLE 2

| intRR mod 4 (2 LSBs of intRR) | Range | Sign of output SIN | $frcRR_i$ input for $SIN(frcRR_i)$ |
|---|---|---|---|
| 00 | [0, π/2) | 0 | frcRR |
| 01 | [π/2, n) | 0 | π/2 − frcRR |
| 10 | [π, 3π/2) | 1 | frcRR |
| 11 | [3π/2, 2π) | 1 | π/2 − frcRR |

After range reduction of the input, $SIN(frcRR_i)$ can be computed using 1 level of PLA. In one embodiment, the PLA implements 16 linear segments of variable size input ranges or 26 equal size linear segments with corresponding values of slope and y-intercept stored in a LUT. Computation of COS is similar to the SIN computation, except for the order of different row entries of the sign and frcRRi columns in Table 2.

Logarithm to base−2 (LOG)

Base−2 LOG (Y) of the SP FP number X can be represented as (LOG is applicable only for positive SP FP numbers):

$$Y=\mathrm{LOG}(X)=\mathrm{LOG}(2^{e-127}\times 1.m)=e-127+\mathrm{LOG}(1.m).$$

where e is the 8 bit exponent (bits 30 to 23) in the input SP FP number and m is the mantissa bits 22 to 0. e−127 is added to the result of LOG(1.m) (appended as e−127 is integer and LOG (1.m) is fraction), and the resultant value is renormalized (shifting result to align to SP FP format) to obtain the exponent ($e_{log}$) of the resultant LOG.

According to one embodiment, three operations are implemented in calculating the SP FP mantissa of LOG(X)=Y (where X=1.m). In such an embodiment, an initial estimate is computed via a LERP and 2 levels of PLA to estimate the difference between the initial estimate and Y. First, a LERP is performed for the entire range of input mantissa X and output mantissa range Y (operation 1) to obtain $Y_{ini}$. Given an error in the LERP be $Y_{err}=Y-Y_{ini}$. 2 levels of PLA are implemented to compute $Y_{err}$.

The level 1 PLA approximates $Y_{err}$ occurring from the LERP in the operation 1 above. In one embodiment, the full input/output mantissa range is divided into 64 linear segments as part of level 1 PLA. Thus, a 64×2 entry LUT for slope and y-intercept are implemented for line equations of the linear segments. The result of the level 1 PLA may be referenced as $Y_{err\_l1}$. The level 2 PLA approximates $Y_{err\_l1err}$ occurring from the level 1 PLA described above. Each of the 64 level 1 PLA ranges are divided into 32 linear segments in the level 2 PLA. Since there is similarity for $Y_{err\_l1err}$ in each of the 64 ranges in the level 1 PLA, the same 32 line equations may be applied in the level 2 PLA to each of the 64 ranges in the level 1 PLA. This reduces the LUT size from 32×64×2 to 32×2.

Exponent—Base 2 (EXP)

Base−2 EXP (Y) of the SP FP number X can be represented as:

$$Y=\mathrm{EXP}(X)=2^{((-1)\wedge s\times 2\wedge(e-127)\times 1.m)}=2^{int((-1)\wedge s\times 2\wedge(e-127)\times 1.m)+frc((-1)\wedge s\times 2\wedge(e-127)\times 1.m)},$$

where e is the 8 bit exponent (bits 30 to 23) in the input SP FP number and m is the mantissa bits 22 to 0, int(x) stands for the integer portion of x and frc(x) stands for fractional part of x.

Upon a determination that the input SP FP number is positive:

$$Y=2^{int(2\wedge(e-127)\times 1.m)+frc(2\wedge(e-127)\times 1.m)},$$

where $int(2^{(e-127)}\times 1.m)$ is the exponent of the resultant EXP Y and $2^{frc(2\wedge(e-127)\times 1.m)}$ is the mantissa of the resultant EXP Y.

Upon a determination that the input SP FP number is negative, $$Y=2^{-int(2^\wedge(e-127)\times 1.m)-frc(2^\wedge(e-127)\times 1.m)}=2^{-int(2^\wedge(e-127)\times 1.m)}\times 2^{-frc(2^\wedge(e-127)\times 1.m)}=2^{-int(2^\wedge(e-127)\times 1.m)}\times 2^{1-frc(2^\wedge(e-127)\times 1.m)}$$

where $-int(2^{(e-127)}\times 1.m)-1$ is the exponent of the resultant EXP Y and $2^{1-frc(2(e-127)\times 1.m)}$ will be the mantissa of the resultant EXP Y.

In one embodiment, EXP can overflow or underflow easily and the valid range for the input is [428, +127]. Thus, input $X=1.m*2^{e-127}$, where e−127 can vary only from 0 to 6, since 1.m can range from [1, 2). For e−127>0, frc calculation will put (shift left) e−127 MSB bits of 1.m into $2^{int(2A(e-127)\times 1.m)}$. Effectively, only $2^{\cdot m}$ needs to be calculated assuming e−127=0. For other cases of e−127 (where e−127 can vary from 1 to 6), the m in in $2^{\cdot m}$ may have a smaller number of bits than 23 and hence the resultant calculation requires lesser precision.

In one embodiment, the mantissa of input X is divided into 8 MSB bits ($X_h$) and 15 LSB bits ($X_l$) to compute $2^{\cdot m}$. In such an embodiment, the final resultant EXP can be computed by multiplying $2^{Xh}$ and $2^{Xl}$. To compute $2^{Xl}$, a LERP is performed over the entire range of mantissa of input X and the relative error is $<2^{-21}$. Thus, one level of LERP meets the precision requirements and let the result of LERP be $Y_{lerp}$. To compute $2^{Xh}$, a PLA is implemented by dividing the entire range of mantissa of input X into 8 linear segments.

Given the result of the PLA be $Y_{ini\_Xh}$, the difference between the actual $2^{Xh}$ and $Y_{ini\_Xh}$ may be computed by rounding $Y_{ini\_Xh}$ to the nearest decimal binary point; with a result of rounding be $Y_{ini\_Xh\_rnd}$. As discussed above, the resultant EXP can be computed as:

$$2^{\cdot m}=2^{Xh}\times 2^{Xl}=Y_{ini\_Xh\_rnd}\times Y_{lerp}$$

Floating Point Division (FPDIV)

The result of FPDIV can be represented as:

$$Z=Y/X,$$

where Y is the dividend and X is a divisor.

In one embodiment, the result can be computed by an INV operation (1/X) and a MUL operation (Y×1/X). In such an embodiment, the execution latency is same as an INV operation since the FPDIV operation is optimized to complete in same number of cycles as INV since it is integrated into the INV operation. According to one embodiment, the FPDIV operation is optimized to complete in same number of cycles as INV, since it is integrated into the INV operation. For example, it can be easily seen that the exponent part of the FPDIV operation is a simple subtraction operation. If the exponent of dividend Y is $e_y$ and that of divisor X is $e_x$, the resultant exponent $e_{fpdiv}=e_y-e_x$ and the result is re-normalized after calculating the mantissa part of resultant FPDIV. With the result of INV being:

$$W=1/X=W_h+W_l \text{ and } W_l=W_h-X\times W_h^2.$$

(e.g., as per the resultant equation of INV operation given above); this implies:

$$Z=Y/X=Y\times(W_h-X\times W_h^2)=Y\times W_h-Y\times X\times W_h^2$$

While estimating $W_h$, V=Y×X may be calculated in parallel. While computing $V\times X_h^2=Y\times X\times W_h^2$, $Y\times W_h$ may be calculated in parallel. Thus, FPDIV may be calculated in same number of cycles as INV. As a result, the disclosed FPDIV computation does not require multiple passes (at least 2) through the pipeline as required in current solutions, which makes the execution latency of the disclosed FPDIV significantly less compared to existing solutions.

Combining Reciprocal Square Root and Vector Scaling

In addition to the computation of reciprocal square root R as described above, the computation of $\overrightarrow{N_A}$, $\overrightarrow{N_B}$, $\overrightarrow{N_C}$ can be further optimized by combining the computation of R and the multiplication of R with $\vec{A}$, $\vec{B}$, $\vec{C}$ during the calculation of $Y_h$, $Y_l$ for R, such that the whole bunched operation doesn't take any additional cycles compared to the computation of reciprocal square root R.

According to one embodiment, the first stage of computation of R involves calculation of $Y_h$ and $Y_h^3$ using linear interpolation (LERP) and piecewise linear approximation (PLA); and the second stage of computation of $\overrightarrow{N_A}=\vec{A}\times R$ involves $\overrightarrow{N_A}=\vec{A}\times(Y_h+Y_l)$ $$\overrightarrow{N_A}=\vec{A}\times(Y_h+Y_l)=\vec{A}\times Y_h+\vec{A}\times Y_l=$$

$$\vec{A}\times Y_h+\vec{A}\times\frac{(Y_h-X\times Y_h^3)}{2}=\vec{A}\times Y_h+\frac{\left(\vec{A}\times Y_h-\vec{A}\times X\times Y_h^3\right)}{2}$$

$P_A=\vec{A}\times Y_h$ can be computed in the second stage.

$Q_A=\vec{A}\times X$ can be computed in the first stage in parallel with computations of $Y_h$ and $Y_h^3$.

$T_A=Q_A\times Y_h^3$ can be computed in the second stage in parallel with computation of $P_A$.

Finally $$\overrightarrow{N_A}=\vec{A}\times Y_h+\frac{\left(\vec{A}\times Y_h-\vec{A}\times X\times Y_h^3\right)}{2}=P_A+\frac{(P_A-T_A)}{2}$$

can be obtained by 1 subtraction, 1 shift right operation and 1 addition, in the third stage. While calculating $P_A$, $Q_A$, $T_A$ and $\overrightarrow{N_A}$, we can calculate $P_B$, $Q_B$, $T_B$, $\overrightarrow{N_B}$, $P_C$, $Q_C$, $T_C$, $\overrightarrow{N_C}$ in parallel. This optimized combined computation of R and $\overrightarrow{N_A}$, $\overrightarrow{N_B}$, $\overrightarrow{N_C}$ is referred to above as $R\overrightarrow{N_A}\overrightarrow{N_B}\overrightarrow{N_C}$ or RSQVS.

While various embodiments described herein contemplate exposing an instruction (e.g., VNM), specifying a vector normalization operation that is to be performed on V vectors. Additionally or alternatively, individual ISA instructions can be exposed for one or more of: (i) a 3-component dot product operation (e.g., SIMD8 DP3); (ii) a 3-component reciprocal square root operation (e.g., SIMD8 RSQ); and a 3-component operation that combines both a reciprocal square root function and a vector scaling function (e.g., SIMD8 RSQVS).

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes a method comprising: responsive to receipt by a graphics processing unit (GPU) of a single instruction specifying a vector normalization operation to be performed on each vector of a set of V vectors: generating, by a first processing unit of the GPU, V squared length values, each representing a squared length of one of the set of V vectors, N squared length values at a time, by, for each N sets of inputs, each representing a plurality of component vectors for N of the set of V vectors and stored in respective registers of a first set of V/N registers, performing N parallel dot product operations on the N sets of inputs; and generating, by a second processing unit of the GPU, V sets of outputs, each representing a plurality of normalized component vectors of one of the set of V vectors, N sets of outputs at a time, by, for each N squared length values of the V squared length values, performing N parallel operations on the N squared length values, wherein each of the N parallel operations implement a combination of a reciprocal square root function and a vector scaling function.

Example 2 includes the subject matter of Example 1, wherein said generating, by a second processing unit of the GPU, V sets of outputs stores the V sets of outputs, N sets of outputs at a time, in respective registers of a second set of V/N registers.

Example 3 includes the subject matter of Examples 1-2, wherein V is eight and wherein N is two.

Example 4 includes the subject matter of Examples 1-3, wherein the first set of V/N registers comprises four 256-bit registers, and wherein the plurality of component vectors comprises three 32-bit component vectors.

Example 5 includes the subject matter of Examples 1-4, wherein the second set of V/N registers comprises four 256-bit registers, and wherein the plurality of normalized component vectors comprises three 32-bit normalized component vectors.

Example 6 includes the subject matter of Examples 1-5, wherein the first processing unit comprises a floating point unit (FPU) and wherein the second processing unit comprises a co-processor.

Example 7 includes the subject matter of Examples 1-6, wherein the N parallel dot product operations result from a 2-wide Single Instruction Multiple Data (SIMD) dot product instruction.

Example 8 includes the subject matter of Examples 1-7, wherein the N parallel operations result from a 2-wide Single Instruction Multiple Data (SIMD) instruction.

Example 9 includes the subject matter of Examples 1-8, wherein the reciprocal square root function comprises performing a single-precision reciprocal square root operation on an operand, including: performing a reciprocal square root operation on an exponent component of the operand; performing a reciprocal square root operation on a mantissa component of the operand, comprising: dividing the mantissa component into a first sub-component and a second sub-component; determining a result of the reciprocal square root operation for the first sub-component; and determining a result of the reciprocal square root operation for the second sub-component; and returning a result of the reciprocal square root operation.

Some embodiments pertain to Example 10 that includes a graphics processing unit (GPU) comprising: a first set of V/N registers; a first processing unit coupled to the first set of V/N registers; a second processing unit coupled to the first set of V/N registers; a execution unit operable to, responsive to receipt of a single instruction specifying a vector normalization operation to be performed on each vector of a set of V vectors, (i) issue V/N N-wide Single Instruction Multiple Data (SIMD) dot product operations to be performed by the first processing unit; and (ii) issue V/N N-wide Single Instruction Multiple Data (SIMD) operations that implement a combination of a reciprocal square root function and a vector scaling function to be performed by the second processing unit; wherein the first processing unit is operable to generate V squared length values, each representing a squared length of one of the set of V vectors, N squared length values at a time, by, for each N sets of inputs, each representing a plurality of component vectors for N of the set of V vectors and stored in respective registers of the first set of V/N registers, executing one of the V/N N-wide SIMD dot product operations; and wherein the second processing unit is operable to generate V sets of outputs, each representing a plurality of normalized component vectors of one of the set of V vectors, N sets of outputs at a time, by for each N squared length values of the V squared length values, executing one of the V/N N-wide SIMD operations.

Example 11 includes the subject matter of Example 10, wherein the GPU further comprises a first set of V/N registers and wherein the V sets of outputs are stored, N sets of outputs at a time, in respective registers of the second set of V/N registers.

Example 12 includes the subject matter of Examples 10-11, wherein V is eight and wherein N is two.

Example 13 includes the subject matter of Examples 10-12, wherein the first set of V/N registers comprises four 256-bit registers, and wherein the plurality of component vectors comprises three 32-bit component vectors.

Example 14 includes the subject matter of Examples 10-13, wherein the second set of V/N registers comprises four 256-bit registers, and wherein the plurality of normalized component vectors comprises three 32-bit normalized component vectors.

Example 15 includes the subject matter of Examples 10-14, wherein the first processing unit comprises a floating point unit (FPU) and wherein the second processing unit comprises a co-processor.

Example 16 includes the subject matter of Examples 10-15, wherein the reciprocal square root function comprises performing a single-precision reciprocal square root operation on an operand, including: performing a reciprocal square root operation on an exponent component of the operand; performing a reciprocal square root operation on a mantissa component of the operand, comprising: dividing the mantissa component into a first sub-component and a second sub-component; determining a result of the reciprocal square root operation for the first sub-component; and determining a result of the reciprocal square root operation for the second sub-component; and returning a result of reciprocal square root operation.

Example 17 includes the subject matter of Examples 10-16, wherein determining the value of the first sub-component comprises determining an initial estimate for the first sub-component and determining a difference between an actual value of the first sub-component and the initial estimate for the first sub-component.

Example 18 includes the subject matter of Examples 10-17, wherein determining the initial estimate comprises performing a linear interpolation.

Example 19 includes the subject matter of Examples 10-18, wherein the difference between the actual value of the first sub-component and the initial estimate for the first sub-component is determined via a piecewise linear approximation.

Example 20 includes the subject matter of Examples 10-19, wherein determining the result of the reciprocal square root operation for the first and second sub-components is performed in parallel.

Some embodiments pertain to Example 21 that includes a system comprising: a means, responsive to receipt of a single instruction specifying a vector normalization operation to be performed on each vector of a set of V vectors, for generating V squared length values, each representing a squared length of one of the set of V vectors, N squared length values at a time, by, for each N sets of inputs, each representing a plurality of component vectors for N of the set of V vectors and stored in respective registers of a first set of V/N registers, performing N parallel dot product operations on the N sets of inputs; and a means for generating V sets of outputs, each representing a plurality of normalized component vectors of one of the set of V vectors, N sets of outputs at a time, by, for each N squared length values of the V squared length values, performing N parallel operations on the N squared length values, wherein each of the N parallel operations implement a combination of a reciprocal square root function and a vector scaling function.

Some embodiments pertain to Example 22 that includes an apparatus that implements or performs a method of any of Examples 1-10.

Example 23 includes at least one machine-readable medium comprising a plurality of instructions, when executed on a computing device, to implement or perform a method or realize an apparatus as described in any preceding Example.

The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A method comprising:

responsive to receipt by a graphics processing unit (GPU) of a single instruction specifying a vector normalization operation to be performed on each vector of a set of V vectors:

generating, by a first processing unit of the GPU, V squared length values, each representing a squared length of one of the set of V vectors, N squared length values at a time, by, for each N sets of inputs, each representing a plurality of component vectors for N of the set of V vectors and stored in respective registers of a first set of V/N registers, performing N parallel dot product operations on the N sets of inputs, wherein V and N are integers >0 and V >N; and generating, by a second processing unit of the GPU, V sets of outputs, each representing a plurality of normalized component vectors of one of the set of V vectors, N sets of outputs at a time, by, for each N squared length values of the V squared length values, performing N parallel operations on the N squared length values, wherein each of the N parallel operations implement a combination of a reciprocal square root function and a vector scaling function.

2. The method of claim 1, wherein said generating, by a second processing unit of the GPU, V sets of outputs stores the V sets of outputs, N sets of outputs at a time, in respective registers of a second set of V/N registers.

3. The method of claim 2, wherein V is eight and wherein N is two.

4. The method of claim 3, wherein the first set of V/N registers comprises four 256-bit registers, and wherein the plurality of component vectors comprises three 32-bit component vectors.

5. The method of claim 4, wherein the second set of V/N registers comprises four 256-bit registers, and wherein the plurality of normalized component vectors comprises three 32-bit normalized component vectors.

6. The method of claim 3, wherein the first processing unit comprises a floating point unit (FPU) and wherein the second processing unit comprises a co-processor.

7. The method of claim 3, wherein the N parallel dot product operations result from a 2-wide Single Instruction Multiple Data (SIMD) dot product instruction.

8. The method of claim 3, wherein the N parallel operations result from a 2-wide Single Instruction Multiple Data (SIMD) instruction.

9. The method of claim 1, wherein the reciprocal square root function comprises performing a single-precision reciprocal square root operation on an operand, including:

performing a reciprocal square root operation on an exponent component of the operand;

performing a reciprocal square root operation on a mantissa component of the operand, comprising:

dividing the mantissa component into a first sub-component and a second sub-component;

determining a result of the reciprocal square root operation for the first sub-component; and determining a result of the reciprocal square root operation for the second sub-component; and returning a result of the reciprocal square root operation.

10. A graphics processing unit (GPU) comprising:

a first set of V/N registers, wherein V and N are integers >0 and V >N;

a first processing unit coupled to the first set of V/N registers;

a second processing unit coupled to the first set of V/N registers;

an execution unit operable to, responsive to receipt of a single instruction specifying a vector normalization operation to be performed on each vector of a set of V vectors, (i) issue V/N N-wide Single Instruction Multiple Data (SIMD) dot product operations to be performed by the first processing unit; and (ii) issue V/N N-wide Single Instruction Multiple Data (SIMD) operations that implement a combination of a reciprocal square root function and a vector scaling function to be performed by the second processing unit;

wherein the first processing unit is operable to generate V squared length values, each representing a squared length of one of the set of V vectors, N squared length values at a time, by, for each N sets of inputs, each representing a plurality of component vectors for N of the set of V vectors and stored in respective registers of the first set of V/N registers, executing one of the V/N N-wide SIMD dot product operations; and wherein the second processing unit is operable to generate V sets of outputs, each representing a plurality of normalized component vectors of one of the set of V vectors, N sets of outputs at a time, by for each N squared length values of the V squared length values, executing one of the V/N N-wide SIMD operations.

11. The GPU of claim 10, further comprising a first set of V/N registers and wherein the V sets of outputs are stored, N sets of outputs at a time, in respective registers of the second set of V/N registers.

12. The GPU of claim 11, wherein V is eight and wherein N is two.

13. The GPU of claim 12, wherein the first set of V/N registers comprises four 256-bit registers, and wherein the plurality of component vectors comprises three 32-bit component vectors.

14. The GPU of claim 13, wherein the second set of V/N registers comprises four 256-bit registers, and wherein the plurality of normalized component vectors comprises three 32-bit normalized component vectors.

15. The GPU of claim 12, wherein the first processing unit comprises a floating point unit (FPU) and wherein the second processing unit comprises a co-processor.

16. The GPU of claim 10, wherein the reciprocal square root function comprises performing a single-precision reciprocal square root operation on an operand, including:

performing a reciprocal square root operation on an exponent component of the operand;

performing a reciprocal square root operation on a mantissa component of the operand, comprising:

dividing the mantissa component into a first sub-component and a second sub-component;

determining a result of the reciprocal square root operation for the first sub-component; and determining a result of the reciprocal square root operation for the second sub-component; and returning a result of reciprocal square root operation.

17. The GPU of claim 16, wherein determining the value of the first sub-component comprises determining an initial estimate for the first sub-component and determining a difference between an actual value of the first sub-component and the initial estimate for the first sub-component.

18. The GPU of claim 17, wherein determining the initial estimate comprises performing a linear interpolation.

19. The GPU of claim 18, wherein the difference between the actual value of the first sub-component and the initial estimate for the first sub-component is determined via a piecewise linear approximation.

20. The GPU of claim 16, wherein determining the result of the reciprocal square root operation for the first and second sub-components is performed in parallel.

* * * * *